(12) United States Patent
Ikeda et al.

(10) Patent No.: US 9,969,288 B2
(45) Date of Patent: May 15, 2018

(54) POWER CONTROL SYSTEM, POWER CONTROL METHOD, POWER CONTROL DEVICE AND POWER CONTROL PROGRAM

(71) Applicant: PANASONIC INTELLECTUAL PROPERTY MANAGEMENT CO., LTD., Osaka-shi, Osaka (JP)

(72) Inventors: Toshihisa Ikeda, Kyoto (JP); Yasuo Yoshimura, Shiga (JP); Satoshi Tsujimura, Hyogo (JP); Naofumi Nakatani, Shiga (JP); Kazunori Kurimoto, Hyogo (JP); Tetsuya Kouda

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 14/971,389

(22) Filed: Dec. 16, 2015

(65) Prior Publication Data

US 2016/0107534 A1    Apr. 21, 2016

Related U.S. Application Data

(63) Continuation of application No. 13/383,370, filed as application No. PCT/JP2010/004593 on Jul. 15, 2010, now abandoned.

(30) Foreign Application Priority Data

Jul. 15, 2009   (JP) .................................. 2009-166556
Jul. 31, 2009   (JP) .................................. 2009-178602
Aug. 18, 2009   (JP) .................................. 2009-188882

(51) Int. Cl.
*H02J 7/00*     (2006.01)
*B60L 11/18*    (2006.01)
(Continued)

(52) U.S. Cl.
CPC ......... *B60L 11/1844* (2013.01); *B60L 11/184* (2013.01); *B60L 11/185* (2013.01); (Continued)

(58) Field of Classification Search
CPC .. B60L 11/184; B60L 11/1844; B60L 11/1838
(Continued)

(56) References Cited

U.S. PATENT DOCUMENTS 5,006,689 A    4/1991   Kurachi et al.
5,892,346 A    4/1999   Moroto et al.
(Continued)

FOREIGN PATENT DOCUMENTS

CN    101085601 A    12/2007
EP    2 056 420 A1    5/2009
(Continued)

OTHER PUBLICATIONS

International Search Report for International Application No. PCT/JP2010/004593, dated Oct. 19, 2010, 2 pages.
(Continued)

*Primary Examiner* — Drew A Dunn
*Assistant Examiner* — Zixuan Zhou
(74) *Attorney, Agent, or Firm* — Brinks Gilson & Lione

(57) ABSTRACT

A power control system, a power control method, a power control device and a power control program supplies power to an electric device and charge an electric vehicle. A control device and method includes a receiver that receives charge information pertaining to the charging of the rechargeable battery prior to an arrival of the electric vehicle at a location where power is supplied to the electric vehicle, and a control determination unit that determines an operation start time of starting the operation of the electric device on the basis of the charge information received by the receiver. A non-transitory computer readable recording medium stores a
(Continued)

control program that controls the charging of a rechargeable battery of an electric vehicle and controls operation of the electric device.

15 Claims, 38 Drawing Sheets

(51) Int. Cl.
*H01M 10/44* (2006.01)
*H01M 10/48* (2006.01)
*H02J 3/14* (2006.01)

(52) U.S. Cl.
CPC ....... *B60L 11/1816* (2013.01); *B60L 11/1838* (2013.01); *B60L 11/1846* (2013.01); *B60L 11/1848* (2013.01); *H01M 10/44* (2013.01); *H01M 10/48* (2013.01); *H02J 3/14* (2013.01); *H02J 7/007* (2013.01); *B60L 2240/62* (2013.01); *B60L 2240/622* (2013.01); *B60L 2240/70* (2013.01); *B60L 2250/14* (2013.01); *B60L 2260/50* (2013.01); *B60L 2260/54* (2013.01); *H02J 2003/143* (2013.01); *H02J 2003/146* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/168* (2013.01); *Y02T 90/169* (2013.01); *Y04S 30/12* (2013.01); *Y04S 30/14* (2013.01)

(58) Field of Classification Search
USPC ............. 320/109; 701/22; 700/295, 296
See application file for complete search history.

(56) References Cited

U.S. PATENT DOCUMENTS

| | | | |
|---|---|---|---|
| 7,693,609 | B2 | 4/2010 | Kressner et al. |
| 2007/0283713 | A1 | 12/2007 | Masselus |
| 2010/0017045 | A1* | 1/2010 | Nesler .............. B60L 11/1824 700/296 |
| 2010/0017249 | A1* | 1/2010 | Fincham .................. B60L 3/12 705/412 |
| 2010/0217485 | A1 | 8/2010 | Ichishi |
| 2011/0032110 | A1 | 2/2011 | Taguchi |

FOREIGN PATENT DOCUMENTS

| | | |
|---|---|---|
| JP | 04-351428 A | 12/1992 |
| JP | 2000-209707 A | 7/2000 |
| JP | 2007-295717 A | 11/2007 |
| JP | 2007-336796 A | 12/2007 |
| JP | 2008-067418 A | 3/2008 |
| JP | 2008-136291 A | 6/2008 |
| JP | 2008-141924 A | 6/2008 |
| JP | 2009-118652 A | 5/2009 |
| JP | 2009-136109 A | 6/2009 |
| JP | 2010-142025 A | 6/2010 |
| JP | 2010-145072 A | 7/2010 |

OTHER PUBLICATIONS

Search Report from counterpart Chinese Application No. 201080031969.5, dated Sep. 22, 2013, 3 pages.
Supplementary European Search Report in corresponding European Application No. 10 79 9637, dated Jan. 2, 2014, 6 pages.
Office Action in corresponding U.S. Appl. No. 13/383,370 dated Mar. 19, 2014, 27 pages.
Office Action in corresponding U.S. Appl. No. 13/383,370 dated Aug. 14, 2014, 28 pages.
Office Action in corresponding U.S. Appl. No. 13/383,370 dated Jan. 13, 2015, 29 pages.
Office Action in corresponding U.S. Appl. No. 13/383,370 dated Jun. 10, 2015, 32 pages.

\* cited by examiner

FIG.19

| ELECTRIC WATER HEATER | 1160 W WHEN HEATING DURING SUMMER, 2000 W WHEN HEATING AT HIGH TEMPERATURE DURING WINTER |
|---|---|
| AIR CONDITIONER | 85 TO 1150 W FOR COOLING, 80 TO 1980 W FOR HEATING |
| LIGHTING EQUIPMENT | 36W |

FIG.20

| TIME SLOT | 11 P.M. TO 7 A.M. | 7 A.M. TO 10 A.M. | 10 A.M. TO 5 P.M. | 5 P.M. TO 11 P.M. |
|---|---|---|---|---|
| ELECTRICITY RATE (1 KWh) | 9 YEN | 23 YEN | 33 YEN DURING SUMMER (JULY TO SEPTEMBER), 28 YEN IN OTHER SEASONS | 23 YEN |

FIG.23

| CHARGING STATUS OF RECHARGEABLE BATTERY | TIME-SLOT DIFFERENTIATED ELECTRICITY RATE INFORMATION OF AC POWER SUPPLY | PRIORITY INFORMATION | REMARKS |
|---|---|---|---|
| CONSTANT CURRENT CHARGING MODE (HIGH POWER USAGE) | LOWEST ELECTRICITY RATE TIME SLOT | (a) PRIORITIZE CHARGING | CHARGING OF RECHARGEABLE BATTERY AND OPERATION OF ELECTRIC DEVICE ARE ADJUSTED SUCH THAT TOTAL AMOUNT OF POWER USED FOR OPERATING ELECTRIC DEVICE AND CHARGING RECHARGEABLE BATTERY BECOMES EQUAL TO OR LOWER THAN ALLOWABLE POWER OF BRANCH BREAKER |
| CONSTANT CURRENT CHARGING MODE (HIGH POWER USAGE) | TIME SLOT OUTSIDE LOWEST ELECTRICITY RATE TIME SLOT | (b) PRIORITIZE ELECTRIC DEVICE | |
| CONSTANT VOLTAGE CHARGING MODE OR PULSE CHARGING MODE (LOW POWER USAGE) | LOWEST ELECTRICITY RATE TIME SLOT | (c) PRIORITIZE ELECTRIC DEVICE | |
| CONSTANT VOLTAGE CHARGING MODE OR PULSE CHARGING MODE (LOW POWER USAGE) | TIME SLOT OUTSIDE LOWEST ELECTRICITY RATE TIME SLOT | (d) PRIORITIZE ELECTRIC DEVICE | |

ESTIMATED RETURN TIME

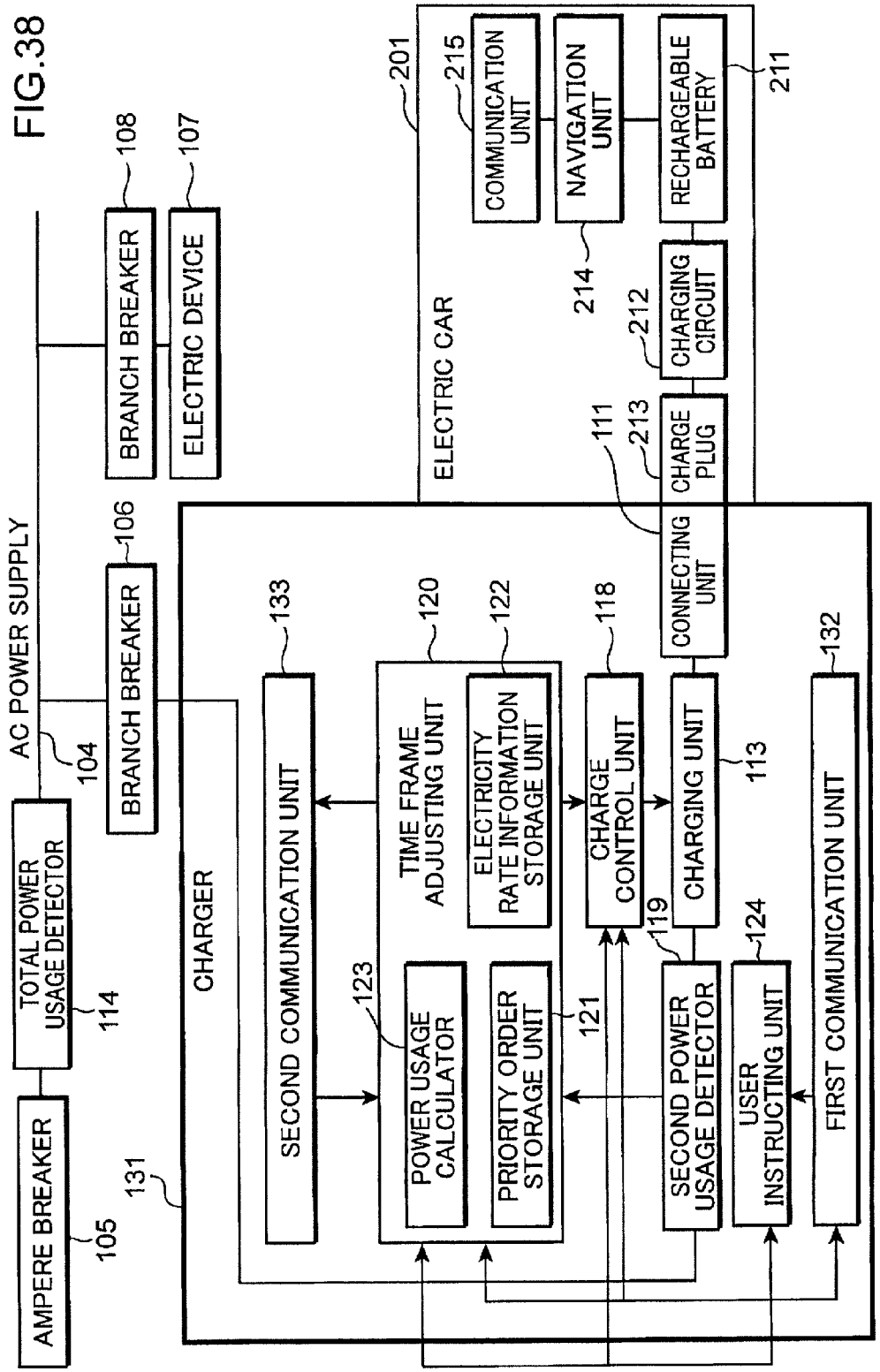

POWER CONTROL SYSTEM, POWER CONTROL METHOD, POWER CONTROL DEVICE AND POWER CONTROL PROGRAM

This application is a continuation application of application Ser. No. 13/383,370, filed Jan. 10, 2013, which is a 371 application of PCT/JP2010/004593 having an international filing date of Jul. 15, 2010, which claims priority to JP2009-166556 filed Jul. 15, 2009, JP2009-178602 filed Jul. 31, 2009 and JP2009-188882 filed Aug. 18, 2009, the entire contents of which are incorporated herein by reference

TECHNICAL FIELD

The present invention relates to a power control system, a power control method, a power control device and a power control program for controlling charging of a rechargeable battery equipped in an electric vehicle and controlling supply of power to an electric device.

BACKGROUND ART

The use of a time-slot differentiated electricity rate system for leveling the power demanded of a power supplier can lower an electricity rate of a general household. For example, when the time-slot differentiated electricity rate system is used, the electricity rate is approximately 9 yen/kWh between 11 p.m. and 7 a.m., approximately 23 yen/kWh between 5 p.m. and 11 p.m. and between 7 a.m. and 10 a.m., and approximately 28 to 33 yen/kWh between 10 a.m. and 5 p.m.

The lowest electricity rate between 11 p.m. and 7 a.m. is approximately ⅓ of the electricity rate obtained between 10 a.m. and 5 p.m. In the present specification, information pertaining to these power usage time slots and the electricity rates is referred to as "time-slot differentiated electricity rate information".

Hereinafter, the time-slot differentiated electricity rate information indicating the time slot between 11 p.m. and 7 a.m. is described as a lowest electricity rate time slot.

Examples of an electric device that is operated in a programmed manner in accordance with the lowest electricity rate time slot (between 11 p.m. and 7 a.m.) include a storage type electric water heater such as a heat pump water heater or an electric boiler. The electric water heater boils water and stores the boiled water during the lowest electricity rate time slot, and allows the hot water to be consumed during daytime when the electricity rate is the highest. The all-electric houses equipped with this kind of storage type water heater have been increasing in recent years.

Furthermore, in addition to the electric water heater, examples of an electric device requiring a large amount of electricity include heating and cooling equipment such as an air conditioner, cooking equipment such as a rice cooker, and household equipment such as a clothes washer, a clothes dryer and a dish washer/dryer. A user of such an electric device operates the equipment while being conscience of the lowest electricity rate time slot or sets timers of the equipment so that the equipment operate during the lowest electricity rate time slot.

Not only these electric devices but also energy storage devices have been increasing. For example, a rechargeable battery of an electric vehicle, a plug-in vehicle or a two-wheeled electric vehicle can be charged at home. If there is a rechargeable battery at home, excess power can be charged into the rechargeable battery, and the rechargeable battery is discharged when power is needed. The recent technical innovation and the rise of the oil prices indicate that electric vehicles and two-wheeled electric vehicles are becoming more popular. In most cases, on-board batteries of electric vehicles and two-wheeled electric vehicles need to be charged at home, which implies a definite increase in the number of users who drive or wish to drive these vehicles in accordance with the lowest electricity rate time slot.

On the other hand, an upper limit of a household power usage is specified in a contract. Use of power exceeding the contract power (allowable power) throws an ampere breaker serving the whole house. Therefore, when the household equipment described above are operated intensively during the period between 11 p.m. and 7 a.m. producing the lowest electricity rate, the ampere breaker is likely to be thrown in the middle of the night. If the user does not notice that the ampere breaker is off, in the morning the user not only sees the water not boiling or the rice not cooked in the programmed rice cooker, but also cannot use his/her electric vehicle because the rechargeable battery thereof is not charged.

In other words, when intensively operating the household equipment at night after setting the timers thereof, the user needs to make sure that the amount of electricity consumed does not exceed the allowable power.

The above has described examples of the use of electricity in a general household. However, not only general households but also business offices, factories and commercial facilities such as stores that use various electric devices and electric transporting vehicles have contract powers, which are the upper limits of electricity usages, and are demanding to use the electric device efficiently at low electricity rates within the range of the contract powers.

There exists a conventional invention (see Patent Literature 1 and Patent Literature 2, for example) that performs control to reduce the amount of power consumed in a charger in consideration of the amount of power consumed in a house, so that the amount of power consumed does not exceed a contract power or allowable power when operating an electric device and charging a rechargeable battery of an electric vehicle at the same time at night.

Patent Literature 1 describes an on-board battery charger that reduces the amount of charging current used for charging a home battery or an on-board battery, when the current exceeds a contract current as a result of using a microwave. This on-board battery charger controls the current immediately before the contract power is exceeded, but does not systematically control the current based on the current used by the microwave and the current used for charging the batteries.

Patent Literature 2 describes a charging power management system that creates a residential estimated power load map to adjust the amount of power consumed between the beginning of charging of an on-board battery and the end of the charging, so as not to exceed a contract power.

Patent Literature 3 describes a charge control device and method that are not for performing the control to prevent a breaker from being thrown when electric devices are operated at the same time as when a rechargeable battery of an electric vehicle is charged, but for creating, in a car rental office where a plurality of electric vehicles are charged, for example, a charging plan based on a start time for using each vehicle and a necessary charge amount required for each vehicle to reach its destination. This technology uses a car navigation device for computing the start time and the necessary charge amount required for each vehicle to reach its destination.

However, according to the conventional methods, the microwave or other electric devices that a user wishes to use immediately is operated at the same time as when an electric device such as a charger of an on-board battery is operated, which can be used by the user any time. For this reason, during a period in which the microwave is preferentially used, the amount of power consumed for charging the on-board battery can be controlled to be lower than the contract power. Because the abovementioned cooking equipment is normally used in a relatively short period of time (approximately several minutes to a little over ten minutes at the longest), the amount of power consumed during this period can be given up temporarily without causing any major adverse effects where, for example, water is not boiled when needed or the electric car does not move due to its weak battery. However, when using, at home, an electric water heater that needs continuous supply of power for a relatively long period of time and an electric car that needs to be charged for a relatively long period of time, a time period during which the power is supplied to the electric water heater should not overlap with a time period during which an on-board battery of the electric car is charged, so that these equipment do not compete over the electricity.

It is obvious that the best way is to end the boiling performed by the electric water heater and the charging of the on-board battery within the lowest electricity rate time slot, but this might cause a tremendous trouble when either one of the equipment needs to be used preferentially to reduce the amount of power consumed in the other. In other words, what is expected is that the water in the electric water heater is not boiled when needed, and therefore hot water is not available, or that the battery of the electric car is not charged enough to be able to drive it to the destination.

Moreover, the distance that the electric car travels varies so significantly from day to day that the remaining level of the on-board battery fluctuates at a charging start time point.

Needless to say, there are no problems if the remaining level of the on-board battery is high. However, when the electric car travels a significantly long distance and the remaining level of the on-board battery is extremely low, uncertain situations occur where a long charging time is required or larger current charging needs to be performed, making a power control operation extremely difficult. Particularly, even when the on-board battery is charged after the electric water heater finishes boiling water, the charging might not be ended fully by the next morning.

In the conventional power control operation that combines the electric car and the microwave or other electric devices used for a short period of time, there is a problem that cannot be solved when combining an electric water heater and an electric car that uses large current for a long period of time.

Because a rechargeable battery of an electric vehicle basically cannot be charged while in use outside, except when the rechargeable battery is charged quickly using a charging station, it is preferred that the rechargeable battery be charged as much as possible while the electric vehicle is at home or at work. Although the conventional methods are effective in this case, there remains a basic problem where the charging plan cannot be created until the electric vehicle is connected to the charger at home.

In other words, the electric device is operated during the lowest electricity rate time slot, not knowing when the electric vehicle returns home. When the electric vehicle returns home during the operation of the electric device, the charging plan that gives the highest priority to charging of the electric vehicle needs to be created, which in turn requires readjustment of the operation for supplying power to the operating electric device or to electric device planning to be operated.

For example, suppose that the electric vehicle returns home around 11:30 p.m. when a clothes washer/dryer is used after 11 p.m. during the lowest electricity rate time slot (11 p.m. to 7 a.m.).

When the operation of the clothes washer/dryer is stopped until the electric vehicle is charged completely in order to prioritize charging of the electric vehicle, the clothes are immersed in detergent in the washer for several hours, which can damage the clothes. Thus, the electric vehicle needs to be charged after the operation of the clothes washer/dryer is ended.

Another example is an electric water heater that boils water during the lowest electricity rate time slot. The boiled water is stored in a storage tank. The storage tank is made to retain heat. It is preferred that the electric water heater boil water immediately before the obtained hot water is used. Therefore, the water is boiled immediately before 7 a.m. so that the obtained hot water can be used when setting the table for breakfast or washing the dishes after the breakfast. Suppose that the electric water heater is programmed to boil water around, for example, 5 a.m.

At this moment, suppose that the electric vehicle returns home around 5 a.m. In order to use the electric vehicle at 8 a.m., charging of the electric vehicle is preferentially performed immediately after the electric vehicle returns home. Meanwhile, the boiling of the electric water heater is stopped until the charging of the electric vehicle is ended. Then, the electric water heater starts boiling the water as soon as the charging of the electric vehicle is ended.

However, when the charging takes too much time and the boiling does not end past 7 a.m., the hot water cannot be used for setting the table for breakfast. In addition, there is a possibility that a large amount of power is supplied to the electric water heater after the lowest electricity rate time slot.

In the prior arts, therefore, the charging plan that prioritizes charging of the electric vehicle is created after the electric vehicle returns home, and thus cannot be coordinated with the operation of other electric devices, depending on when the electric vehicle returns home.

CITATION LIST

Patent Literature

Patent Literature 1: Japanese Patent Application Publication No. 2008-141924 (paragraphs 0015, 0028, FIG. 12)
Patent Literature 2: Japanese Patent Application Publication No. 2008-136291 (FIG. 5)
Patent Literature 3: Japanese Patent Application Publication No. 2009-136109 (paragraph 0050)

SUMMARY OF INVENTION

The present invention was contrived in order to solve the problems described above. An object of the present invention is to provide a power control system, a power control method, a power control device and a power control program, which can efficiently supply power to an electric device and charge an electric vehicle.

A power control system according to one aspect of the present invention is a power control system that has an electric vehicle and a power control device that controls charging of a rechargeable battery of the electric vehicle and controls supply of power to an electric device, wherein the electric vehicle includes: the rechargeable battery; a charge information acquiring unit that acquires charge information pertaining to the charging of the rechargeable battery; and a transmitter that transmits the charge information acquired by the charge information acquiring unit, prior to the arrival of the electric vehicle at a location where power is supplied to the electric vehicle, and wherein the power control device includes: a receiver that receives the charge information transmitted by the transmitter, prior to the arrival of the electric vehicle at the location where power is supplied to the electric vehicle; and a power control unit that determines a power supply start time of supplying power to the electric device and a charging start time of charging the rechargeable battery, on the basis of the charge information received by the receiver, such that the supply of power to the electric device and the charging of the rechargeable battery are completed by a predetermined time.

According to this configuration, the power control system has an electric vehicle and a power control device that controls charging of a rechargeable battery of the electric vehicle and supply of power to an electric device. In the electric vehicle, charge information pertaining to the charging of the rechargeable battery is acquired, and the acquired charge information is transmitted prior to the arrival of the electric vehicle at a location where power is supplied to the electric vehicle. In the power control device, the charge information transmitted by the transmitter is received prior to the arrival of the electric vehicle at the location where power is supplied to the electric vehicle. On the basis of the received charge information, a power supply start time of supplying power to the electric device and a charging start time of charging the rechargeable battery are determined such that the supply of power to the electric device and the charging of the rechargeable battery are completed by a predetermined time.

According to the present invention, because the power supply start time of supplying power to the electric device and the charging start time of charging the rechargeable battery are determined such that the supply of power to the electric device and the charging of the rechargeable battery are completed by the predetermined time prior to the arrival of the electric vehicle at the location where power is supplied to the electric vehicle, the supply of power to the electric device and the charging of the electric vehicle can be performed efficiently.

The above object, features and advantages of the present invention will become clear from the following detailed descriptions and accompanying drawings.

BRIEF DESCRIPTION OF DRAWINGS

FIG. 19 is a diagram showing an example of power usage of an electric device according to Embodiment 5 of the present invention.

FIG. 20 is a diagram showing an example of time-slot differentiated electricity rate information according to Embodiment 5 of the present invention.

FIG. 23 is a diagram showing an example of priority orders according to Embodiment 5 of the present invention.

FIG. 38 is a block diagram showing an example of a configuration of a power control system according to Embodiment 6 of the present invention.

DESCRIPTION OF EMBODIMENTS

Embodiments of the present invention are described hereinafter with reference to the accompanying drawings. Note that the following embodiments are merely illustrative and are not intended to limit the technical scope of the present invention.

Embodiment 1

Figure 1:
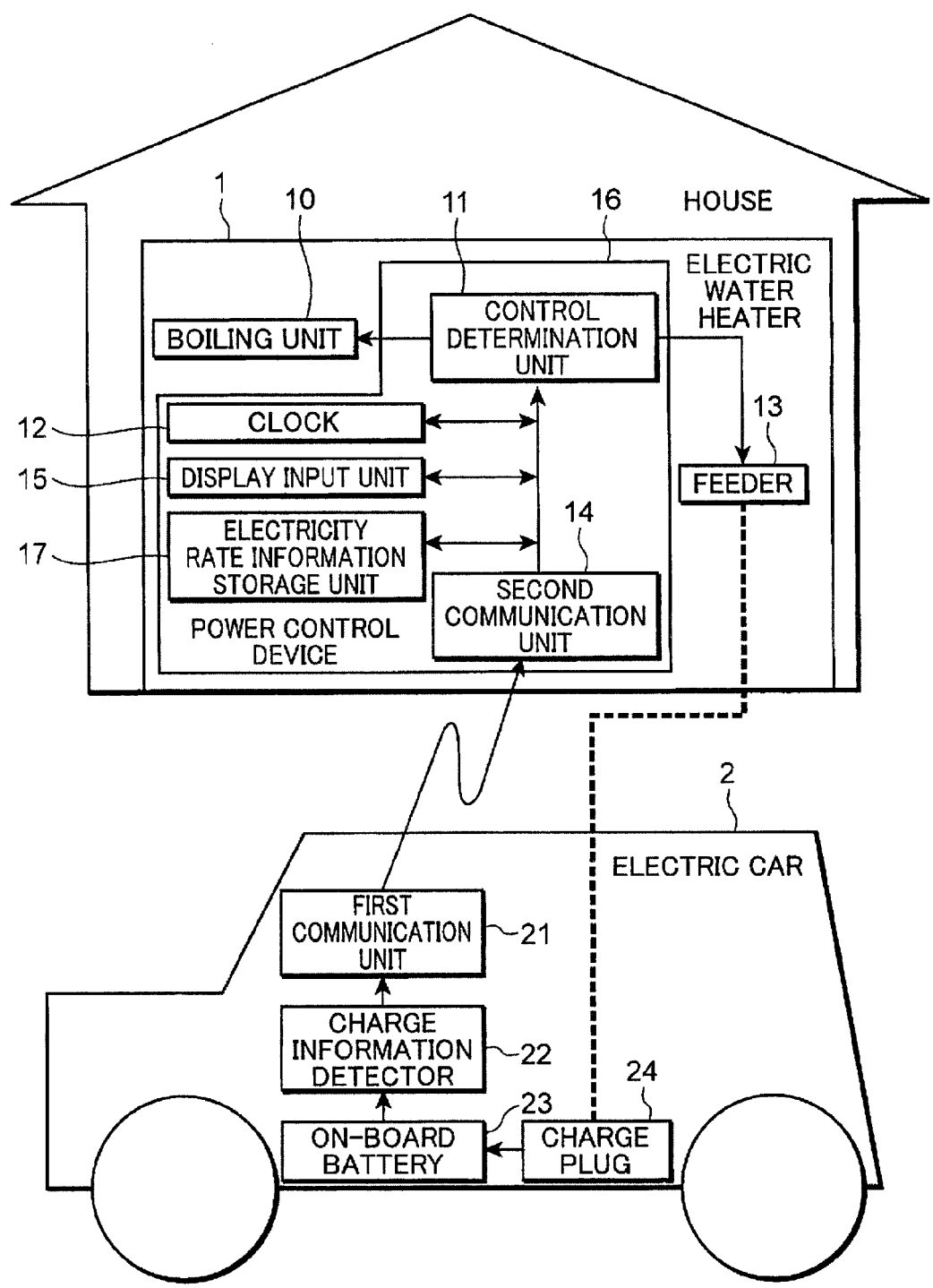
FIG. 1 is a diagram showing an example of a configuration of a power control system according to Embodiment 1 of the present invention.

FIG. 1 is a diagram showing an example of a configuration of a power control system according to Embodiment 1 of the present invention. Embodiment 1 is described hereinafter with reference to FIG. 1.

The power control system shown in FIG. 1 has an electric water heater 1 and an electric car 2. The electric car 2 is an example of the electric vehicle, which is moved by receiving supply of power from a rechargeable battery equipped therein.

The electric car 2 is equipped with an on-board battery 23 for running a driving motor and an on-board electrical component, a charge plug 24, a charge information detector 22, and a first communication unit 21. The on-board battery 23 is charged by a feeder 13 (described later) via the charge plug 24. The charge information detector 22 acquires charge information pertaining to charging of a rechargeable battery. The charge information detector 22 detects charge information including a current remaining level of the on-board battery 23. The first communication unit 21 transmits the charge information acquired by the charge information detector 22, prior to the arrival of the electric car 2 at a location where power is supplied to the electric car 2. The first communication unit 21 transmits at any time the charge information detected by the charge information detector 22.

It is most preferred that a communication path of the first communication unit 21 always or periodically communicate the charge information pertaining to the remaining level of the on-board battery 23 that changes every minute while the electric car 2 travels. The communication path is configured by, for example, a mobile communication network (cell phone communication network, PHS (Personal Handyphone System) communication network, WiFi, WiMax, etc.) capable of communication at all times or on a regular basis. The charge information is eventually received by a second communication unit 14 that is equipped in the electric water heater 1 installed inside a house, and imported to a control determination unit 11.

The electric water heater 1 has a boiling unit 10, the feeder 13, and a power control device 16. The boiling unit 10 boils water and stores the boiled water in a hot water tank (not shown). The feeder 13 supplies power to the on-board battery 23 via the charge plug 24 to charge the on-board battery 23.

The power control device 16 has the control determination unit 11, a clock 12, the second communication unit 14, a display input unit 15, and an electricity rate information storage unit 17. The clock 12 measures a time frame and outputs a current time. The second communication unit 14 receives the charge information transmitted by the first communication unit 21, prior to the arrival of the electric car 2 at the location where power is supplied to the electric car 2. The display input unit 15 displays various information and accepts input from a user.

Based on the charge information received by the second communication unit 14, the control determination unit 11 determines a power supply start time of supplying power to the electric water heater 1 and a charging start time of charging the on-board battery 23, such that the supply of power to the electric water heater 1 and the charging of the on-board battery 23 are completed by a predetermined time.

The control determination unit 11 plays a primary role in this power control system and carries out a data computation process and a determination process and controls each unit. The charge information includes the current remaining level of the on-board battery 23. In accordance with the remaining level of the on-board battery 23, the control determination unit 11 computes a time frame required to charge the on-board battery 23, and then determines, on the basis of the computed time frame required to charge the on-board battery 23, the power supply start time of supplying power to the electric water heater 1 and the charging start time of charging the on-board battery 23.

Specifically, the control determination unit 11 reads the clock 12 and sends a boiling instruction to the boiling unit 10. After sending a boiling discontinuation instruction to the boiling unit 10, the control determination unit 11 controls the charging of the on-board battery 23 by means of the feeder 13 and the charge plug 24. Furthermore, the control determination unit 11 computes a time frame required to charge the on-board battery 23, in accordance with the remaining level thereof, computes a time frame required for the electric water heater 1 to boil water (boiling time frame), computes the amount of water that can be boiled per fixed time frame, and computes an electricity rate for boiling the water.

The electricity rate information storage unit 17 stores time-slot differentiated electricity rate information pertaining to an electricity rate that varies according to time slots. Based on the time-slot differentiated electricity rate information, the control determination unit 11 performs control such that the boiling of water in the boiling unit 10 and the charging of the on-board battery 23 are performed efficiently. The term "efficiently" here implies not only that the control is performed based on the time-slot differentiated electricity rate information in order to obtain the lowest electricity rate, but also that convenience is chosen over electricity rates in consideration of the user's intention of accomplishing energy saving.

The time-slot differentiated electricity rate information, which changes in accordance with the time slots and seasons, may include time slots and rates that vary by contractors (households or business offices). The time-slot differentiated electricity rate information may also include time slots and rates that vary by types of the electric device using the power (household electric devices or industrial electric devices).

In addition, the control determination unit 11 starts charging the on-board battery 23 after the supply of power to the electric water heater 1 is ended. When the power supply start time of supplying power to the electric water heater 1 does not fall within a time slot in which an electricity rate becomes equal to or lower than a predetermined rate, the control determination unit 11 supplies power to the electric water heater 1 only during the time slot in which the electricity rate becomes equal to or lower than the predetermined rate.

The control determination unit 11 also starts charging the on-board battery 23 after the end of the supply of power to the electric water heater 1. When the power supply start time of supplying power to the electric water heater 1 does not fall within the time slot in which the electricity rate becomes equal to or lower than the predetermined rate, the control determination unit 11 supplies power to the electric water heater 1, starting from a time slot prior to the time slot in which the electricity rate becomes equal to or lower than the predetermined rate.

It should be noted in the present embodiment that the electric car 2 corresponds to an example of the electric vehicle, the on-board battery 23 to an example of the rechargeable battery, the electric water heater 1 to an example of the electric device, the power control device 16 to an example of the power control device, the charge information detector 22 to an example of the charge information acquiring unit, the first communication unit 21 to an example of the transmitter, the second communication unit 14 to an example of the receiver, the control determination unit 11 to an example of the power control unit, and the electricity rate information storage unit 17 to an example of the electricity rate information storage unit.

Complicated processes performed by the control determination unit 11 are described with reference to FIGS. 2 to 6.

Figure 2:
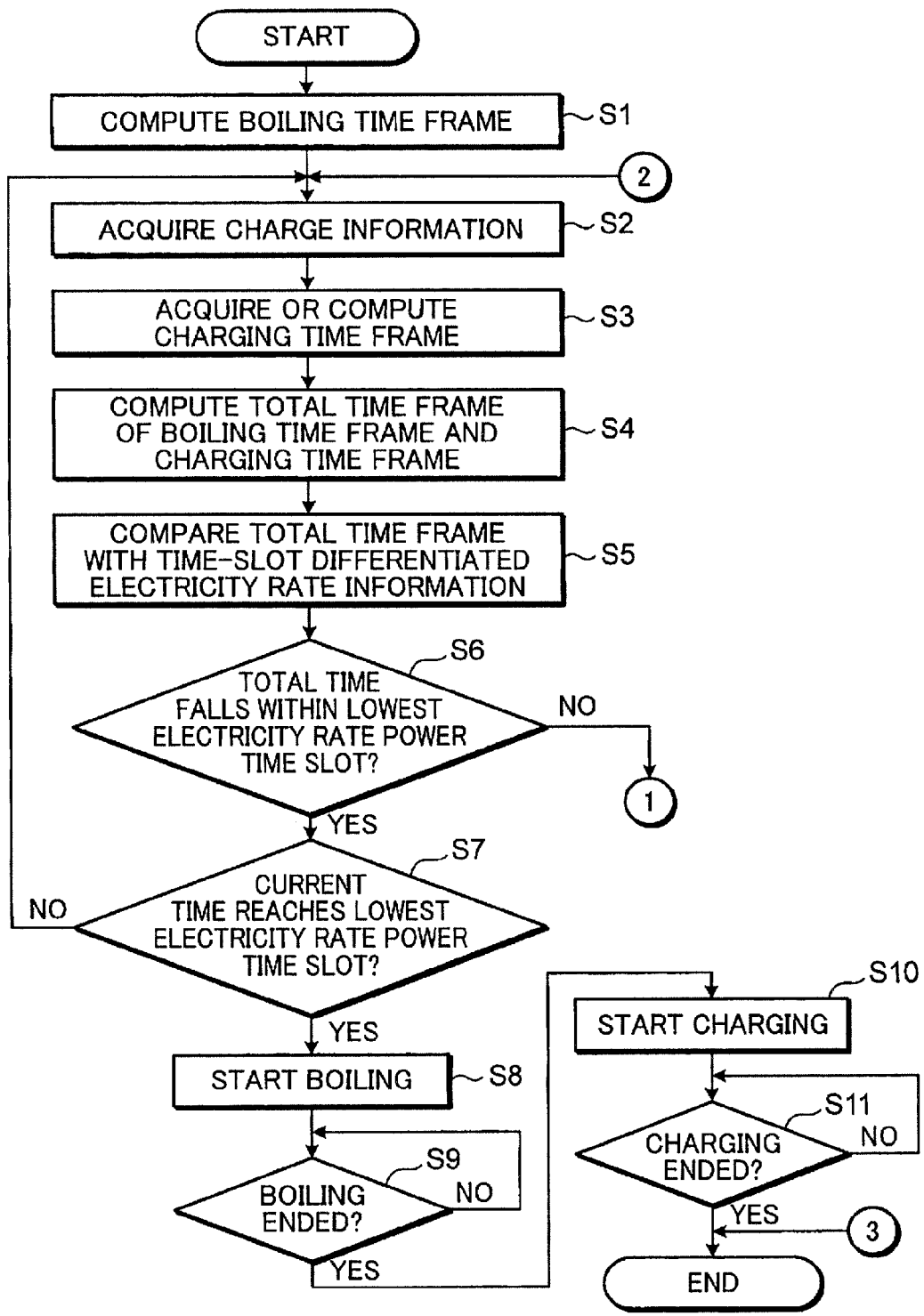
FIG. 2 is a first flowchart showing processes performed by a control determination unit according to Embodiment 1 of the present invention.
Figure 3:
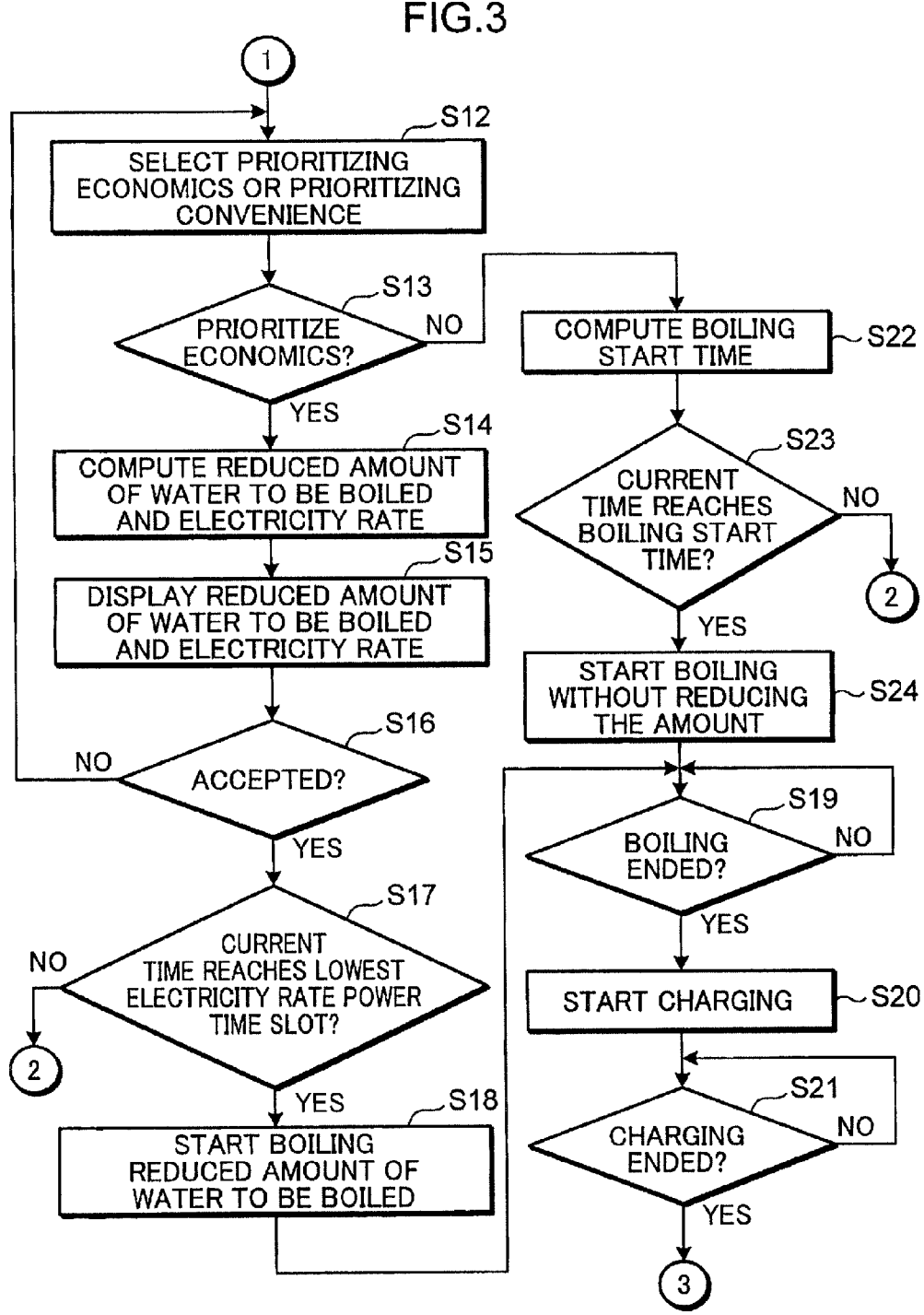
FIG. 3 is a second flowchart showing processes performed by the control determination unit according to Embodiment 1 of the present invention.
Figure 4:
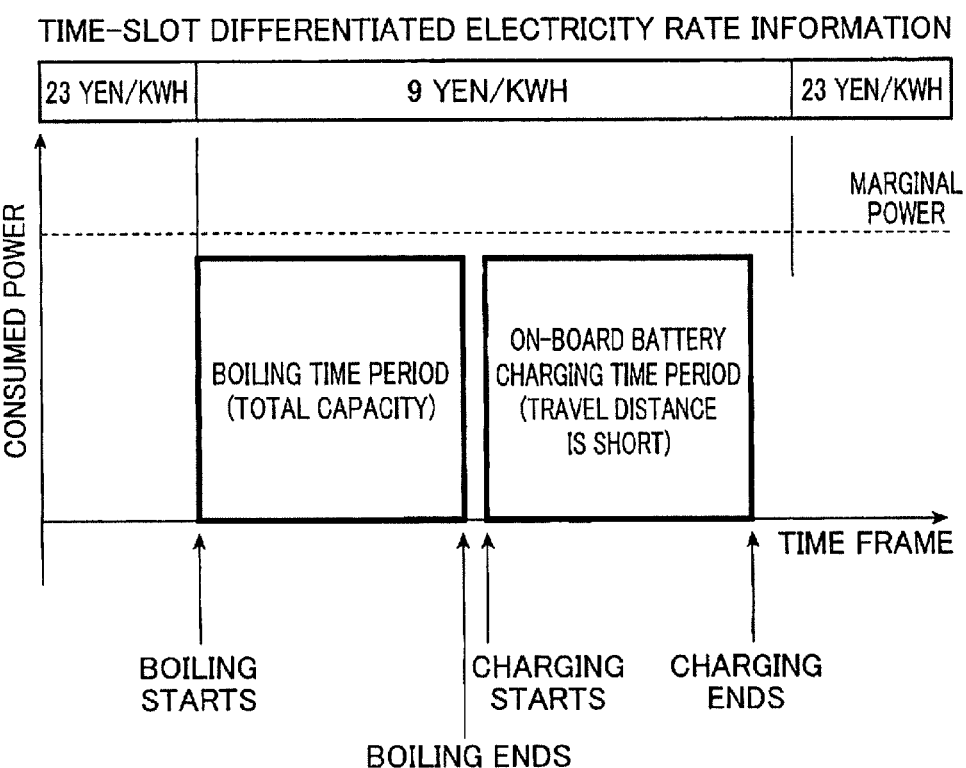
FIG. 4 is a diagram showing a relationship among time-slot differentiated electricity rate information, consumed power, and time frame, the relationship being obtained when a boiling time slot of an electric water heater and a charging time slot of an on-board battery fall within a lowest electricity rate power time slot.

FIGS. 2 and 3 are flowcharts showing the processes performed by the control determination unit 11 in Embodiment 1 of the present invention. FIG. 2 shows the processes performed when a boiling time slot of the electric water heater 1 and a charging time slot of the on-board battery 23 fall especially within a lowest electricity rate power time slot that is shown in the time-slot differentiated electricity rate information. FIG. 4 is a diagram showing a relationship among the time-slot differentiated electricity rate information, consumed power, and time frame, which is obtained when the boiling time slot of the electric water heater 1 and the charging time slot of the on-board battery 23 fall within the lowest electricity rate power time slot.

First, the control determination unit 11 computes a time frame required for the electric water heater 1 to boil water (boiling time frame) (step S1). For example, the control determination unit 11 previously stores a table in which the amount of hot water to be stored and the boiling time frame are correlated to each other, and computes the boiling time frame by acquiring the amount of hot water to be stored, and extracting from the table the boiling time frame corresponding to the acquired amount of hot water to be stored.

Subsequently, the control determination unit 11 acquires information (the charge information) pertaining to charging of the on-board battery 23, via the second communication unit 14 (step S2). The control determination unit 11 then acquires or computes a time frame (charging time frame) required to charge the on-board battery 23, on the basis of the acquired charge information (step S3).

When the charge information includes the information pertaining to the charging time frame, the control determination unit 11 acquires the information pertaining to the charging time frame from the second communication unit 14. When, on the other hand, the charge information does not include the information pertaining to the charging time frame but includes the information pertaining to the remaining level of the on-board battery 23, the control determination unit 11 computes the charging time frame based on the remaining level of the battery. For example, the control determination unit 11 previously stores a table in which the remaining level of the battery and the charging time frame are correlated to each other, and computes the charging time frame by extracting from the table the charging time frame corresponding to the acquired remaining level of the battery. In Embodiment 1, the control determination unit 11 computes the charging time frame on the basis of the current remaining level of the on-board battery 23.

Next, the control determination unit 11 computes a total time frame by adding up the boiling time frame and the charging time frame (step S4). The control determination unit 11 then compares the obtained total time frame with the time-slot differentiated electricity rate information (step S5).

Thereafter, the control determination unit 11 determines whether the total time frame falls within the lowest electricity rate power time slot (step S6). When it is determined that the total time frame falls within the lowest electricity rate power time slot (YES in step S6), the control determination unit 11 determines whether a current time acquired from the clock 12 reaches the lowest electricity rate time slot described in the time-slot differentiated electricity rate information (step S7).

When it is determined that the current time has not yet reached the lowest electricity rate time slot (NO in step S7), the control determination unit 11 returns to step S2 and carries out the steps subsequent to step S2. In other words, the control determination unit 11 repeats the steps S2 to S7 until the current time reaches the lowest electricity rate time slot. Repeating the steps subsequent to step S2 allows the control determination unit 11 to constantly deal with the latest information on the on-board battery 23.

On the other hand, when it is determined that the current time acquired from the clock 12 reaches the lowest electricity rate time slot described in the time-slot differentiated electricity rate information (YES in step S7), the control determination unit 11 instructs the boiling unit 10 to start boiling water (step S8). Next, the control determination unit 11 determines whether the boiling of the boiling unit 10 is ended or not (step S9). When it is determined that the boiling is not yet ended (NO in step S9), the boiling is continued until the end thereof.

When, on the other hand, it is determined that the boiling is ended (YES in step S9), the control determination unit 11 instructs the feeder 13 to start charging the on-board battery 23 (step S10). Subsequently, the control determination unit 11 determines whether the charging of the on-board battery 23 is ended or not (step S11). When it is determined that the charging of the on-board battery 23 is not yet ended (NO in step S11), the feeder 13 continues to charge the on-board battery 23 until the end thereof. When it is determined that the charging of the on-board battery 23 is ended (YES in step S11), the control determination unit 11 ends the series of boiling and battery charging processes.

The above description has focused on the case in which the total time frame, obtained by adding up the boiling time frame and the charging time frame, is compared with the time-slot differentiated electricity rate information and then certainly falls within the lowest electricity rate power time slot. FIG. 4 shows the relationship among a boiling time period, an on-board battery charging time period, and the time-slot differentiated electricity rate information, which is obtained when the total time frame of the boiling time frame and the charging time frame falls within the lowest electricity rate power time slot. In FIG. 4, both the boiling time period and the charging time period fall within the power time slot producing the lowest electricity rate of 9 yen/KWH, which means that the boiling and the charging are completed successfully without having the consumed electricity exceed a marginal power or without having the breaker off.

In actuality, however, when the electric car 2 travels a longer distance and the total time frame obtained by adding up the boiling time frame and the charging frame is compared with the time-slot differentiated electricity rate information, the total time frame might not fall within the lowest electricity rate power time slot. In this case, step S12 shown in FIG. 3 is performed subsequent to the determination condition of step S6.

FIG. 3 shows details of processes that are performed when it is determined that the total time frame obtained in step S6 of FIG. 2 does not fall within the lowest electricity rate power time slot. FIG. 3 shows a flow of processes performed when the boiling time frame and the charging time frame for charging the on-board battery do not fall especially within the lowest electricity rate power time slot described in the time-slot differentiated electricity rate information.

Figure 5:
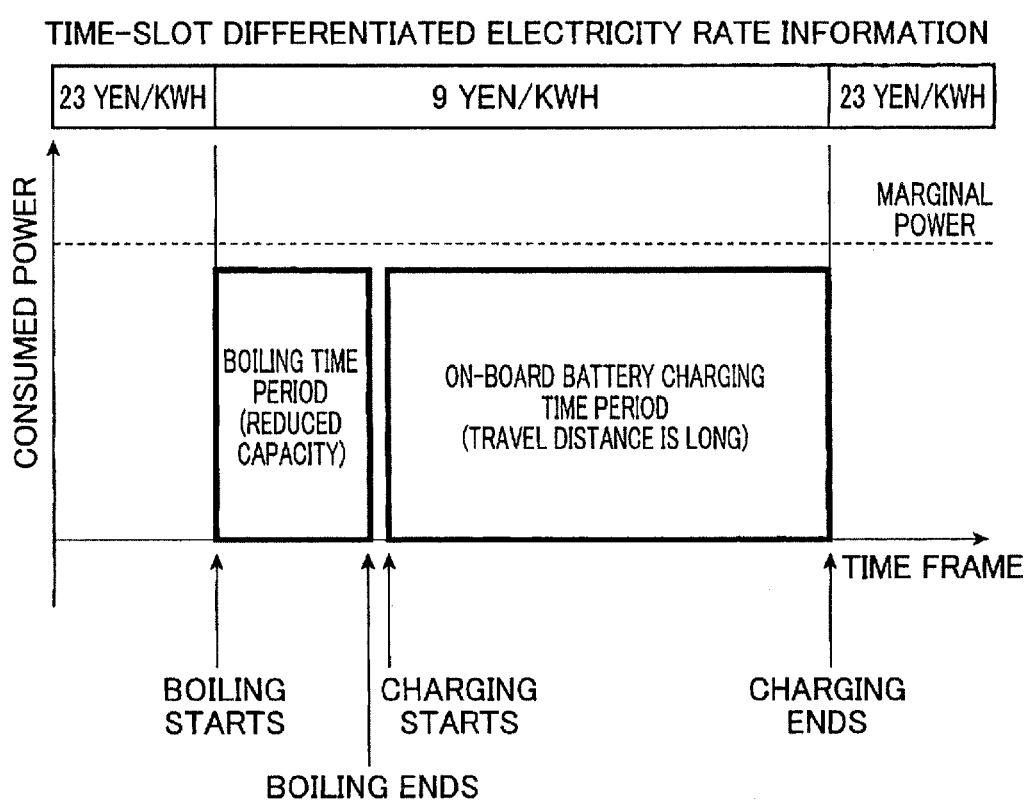
FIG. 5 is a diagram showing a relationship among the time-slot differentiated electricity rate information, the consumed power, and the time frame, which is obtained when economics are given priority.
Figure 6:
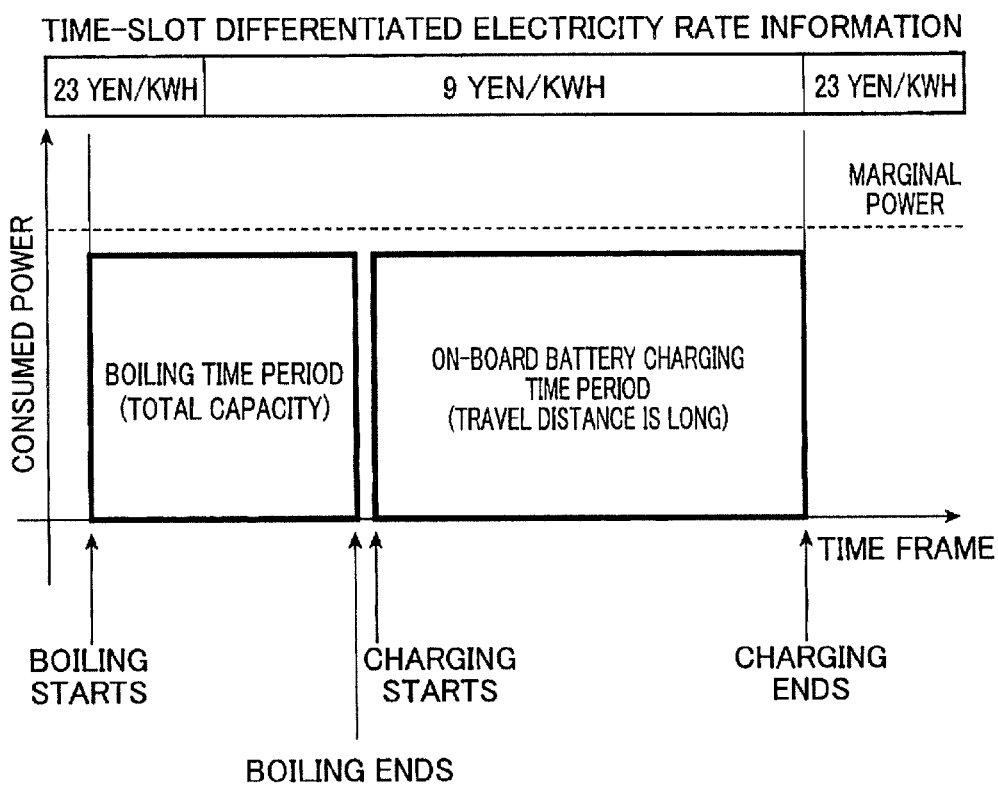
FIG. 6 is a diagram showing a relationship among the time-slot differentiated electricity rate information, the consumed power, and the time frame, which is obtained when convenience is given priority.

FIG. 5 is a diagram showing a relationship among the time-slot differentiated electricity rate information, the consumed power, and the time frame, which is obtained when economics are given priority. FIG. 6 is a diagram showing a relationship among the time-slot differentiated electricity rate information, the consumed power, and the time frame, which is obtained when convenience is given priority.

When, in step S6 shown in FIG. 2, it is determined that the total time frame does not fall within the lowest electricity rate power time slot (NO in step S6), the control determination unit 11 causes the user to use the display input unit 15 to choose either to give priority to economics or to give priority to convenience over economics (step S12 in FIG. 3). However, when performing display input, the user is not necessarily present in the vicinity of the electric water heater 1. Thus, the user can choose to give priority to either economics or convenience in advance. In this case, no operation is performed to prompt the user to display or input using the display input unit 15, and therefore step S12 is skipped. At this moment, the control determination unit 11 previously causes the user to use the display input unit 15 to prioritize either economics or convenience, and stores information indicating the selected priority.

Next, the control determination unit 11 determines whether economics are given priority or not (step S13). FIGS. 3 and 5 are now used to describe a case in which the user chooses to prioritize economics over convenience in step S13.

When it is determined that the user gives priority to economics, or when the user chooses to give priority to economics (YES in step S13), the control determination unit 11 reduces the amount of water to be boiled and computes the reduced amount of water to be boiled and the electricity rate incurred to boil the reduced amount of water to be boiled, so that the total time frame falls within the lowest electricity rate power time slot (step S14). In other words, the control determination unit 11 computes the amount of water that can be boiled within a remaining time frame that is obtained by subtracting the charging time frame of the on-board battery 23 from the lowest electricity rate power time slot.

Subsequently, the control determination unit 11 displays, on the display input unit 15, the reduced amount of water to be boiled and the electricity rate incurred to boil the reduced amount of water to be boiled, and asks the user to accept these displayed inputs (step S15). However, because the user is not necessarily present in the vicinity of the electric water heater 1 in this case as well, the user can accept these inputs in advance. In such a case, no operation is performed to prompt the user to display or input using the display input unit 15, and therefore step S15 is skipped. At this moment, when the reduced amount of water to be boiled and the electricity rate incurred to boil the reduced amount of water to be boiled are computed, the control determination unit 11 causes the user to use the display input unit 15 to previously choose whether or not to accept the reduced amount of water to be boiled and the electricity rate incurred to boil the reduced amount of water to be boiled, and then stores information indicating the resultant acceptance or rejection.

The control determination unit 11 then determines whether the current time acquired from the clock 12 reaches the lowest electricity rate time slot described in the time-slot differentiated electricity rate information (step S17). Here, when it is determined that the current time has not yet reached the lowest electricity rate time slot (NO in step S17), the control determination unit 11 returns to step S2 and carries out the steps subsequent to step S2.

When, on the other hand, it is determined that the current time reaches the lowest electricity rate time slot (YES in step S17), the control determination unit 11 instructs the boiling unit 10 to start boiling the reduced amount of water to be boiled (step S18). The control determination unit 11 then determines whether the boiling is ended or not (step S19). When it is determined that the boiling is not yet ended (NO in step S19), the boiling is continued until the end thereof.

When it is determined that the boiling is ended (YES in step S19), the control determination unit 11 instructs the feeder 13 to start charging the on-board battery 23 (step S20). Subsequently, the control determination unit 11 determines whether the charging of the on-board battery 23 is ended or not (step S21). When it is determined that the charging of the on-board battery 23 is not yet ended (NO in step S21), the feeder 13 continues to charge the on-board battery 23 until the end thereof. When it is determined that the charging of the on-board battery 23 is ended (YES in step S21), the control determination unit 11 ends the series of boiling and battery charging processes.

FIG. 5 is a diagram showing the relationship among the time-slot differentiated electricity rate information, the boiling time period, and the charging time period for charging the on-board battery 23, the relationship being obtained when economics are given priority. In this case, because the reduced amount of water is boiled, both the boiling time period and the charging time period fall within the lowest electricity rate time slot described in the time-slot differentiated electricity rate information.

Next, FIGS. 3 and 6 are used for describing a case in which the user chooses to prioritize convenience over economics in step S13.

When it is determined that the user chooses not to prioritize economics, or when the user chooses to give priority to convenience (NO in step S13), the control determination unit 11 computes a boiling start time for boiling the entire amount of water, instead of keeping the total time frame of the boiling time frame and the charging time frame within the lowest electricity rate power time slot (step S22). At this moment, the control determination unit 11 computes the boiling start time as a time at which the boiling time frame starts, which is obtained when the end of the charging time frame in which the charging is performed subsequent to the boiling, matches an ending time of the lowest electricity rate power time slot.

Next, the control determination unit 11 determines whether the current time acquired from the clock 12 reaches the boiling start time or not (step S23). When it is determined that the current time has not yet reached the boiling start time (NO in step S23), the control determination unit 11 returns to step S2 and carries out the steps subsequent to step S2. As described above, repeating the steps subsequent to step S2 of FIG. 2 allows the control determination unit 11 to constantly deal with the latest information on the on-board battery 23.

When it is determined that the current time reaches the boiling start time (YES in step S23), the control determination unit 11 instructs the boiling unit 10 to start boiling the entire amount of water that is not reduced in amount (step S24). Thereafter, steps S19 to S21 are performed.

FIG. 6 shows the relationship among the time-slot differentiated electricity rate information, the boiling time period, and the charging time period for charging the on-board battery, the relationship being obtained when convenience is given priority and the entire amount of water is boiled outside the lowest electricity rate power time slot. In this case, as shown in the diagram, the boiling is started before the start of the lowest electricity rate time slot described in the time-slot differentiated electricity rate information, in order to boil the entire amount of water without reducing it, and then boiling the entire amount of water and charging the on-board battery 23 are ended.

As described above, because the boiling start time of the electric water heater 1 is brought forward in accordance with the remaining level of the on-board battery 23, it is possible to avoid the inconvenience in which the water in the electric water heater 1 is not yet boiled even after the lowest electricity rate time slot. It is also possible to avoid the inconvenience in which the on-board battery 23 is not charged enough that the electric car 2 cannot be moved or reach a destination.

The control determination unit 11 can perform control to allow the user to prioritize reduction of the electric rate or to prioritize convenience over reduction of the electric rate. This can clearly reflect the user's intentions of accomplishing energy saving.

The above has described the control performed so as to always keep the charging of the on-board battery 23 within the lowest electricity rate time slot described in the time-slot differentiated electricity rate information. However, in actuality, this control might not be enough. For instance, when the electric car 2 is used before the lowest electricity rate time slot described in the time-slot differentiated electricity rate information ends, the on-board battery 23 might not be charged enough that the electric car 2 cannot be used. In this case, a time at which the charging should be ended is input through the display input unit 15, and then the control determination unit 11 performs the above-described operations using the time at which the charging should be ended, instead of using the ending time of the lowest electricity rate time slot described in the time-slot differentiated electricity rate information. Accordingly, the control determination unit 11 can be caused to perform the same operations as those described above, achieving the effects same as or better than those described above.

Moreover, the above has described the basic conditions where the on-board battery 23 is charged fully due to its characteristics, but this charging method is not necessarily preferred in terms of energy saving. For example, the user may predict a distance that the electric car 2 travels the following day (or a charge amount corresponding to the travel distance), input the following day's travel distance (or the charge amount corresponding to the travel distance) by using the display input unit 15, and then charge the on-board battery 23 to a required level without charging it fully every time. This can reduce the amount of time required to charge the battery, and both the boiling and the charging can be ended within the lowest electricity rate time slot described in the time-slot differentiated electricity rate information.

Moreover, in the present embodiment, it is most preferred that the first communication unit 21 communicate, at all times or on a regular basis, the information pertaining to the remaining level of the on-board battery 23 that changes every minute while the electric car 2 travels. The electric car 2 does not have to be in a travelling state to perform the communication and no problem arises to communicate the information while the electric car 2 is parked. The first communication unit 21 may also communicate the information when the electric car 2 is started up (when getting on the car) or when the electric car 2 is stopped (when getting off the car).

Needless to say, it is assumed that the electric car 2 has a car navigation device. In this case, the first communication unit 21 transmits, to the electric water heater 1 at home, the charge information including positional information acquired by a GPS (Global Positioning System) equipped in the car navigation device. The control determination unit 11 may compute a distance between the house (the electric water heater 1) and the electric car 2 to estimate a charge amount to be consumed by the on-board battery 23 until the electric car 2 returns home, and a time frame required to charge the on-board battery 23, and then adjust the boiling start time of the electric water heater 1 in consideration of the estimated charging time frame.

The above has described the competition between the electric water heater 1 and the on-board battery 23 over the power. However, the same control operations as those described above can be performed to achieve the same effects, not only in this competition but also in a competition between the on-board battery 23 and the electric device (e.g., a washer/dryer, a dish washer, etc.) that can be operated during the lowest electricity rate time slot described in the time-slot differentiated electricity rate information.

The above has also described the example in which the electric water heater 1 is used as the electric device, but the electric device may be an electric boiler that boils water by using electric heat only.

Embodiment 2

Figure 7:
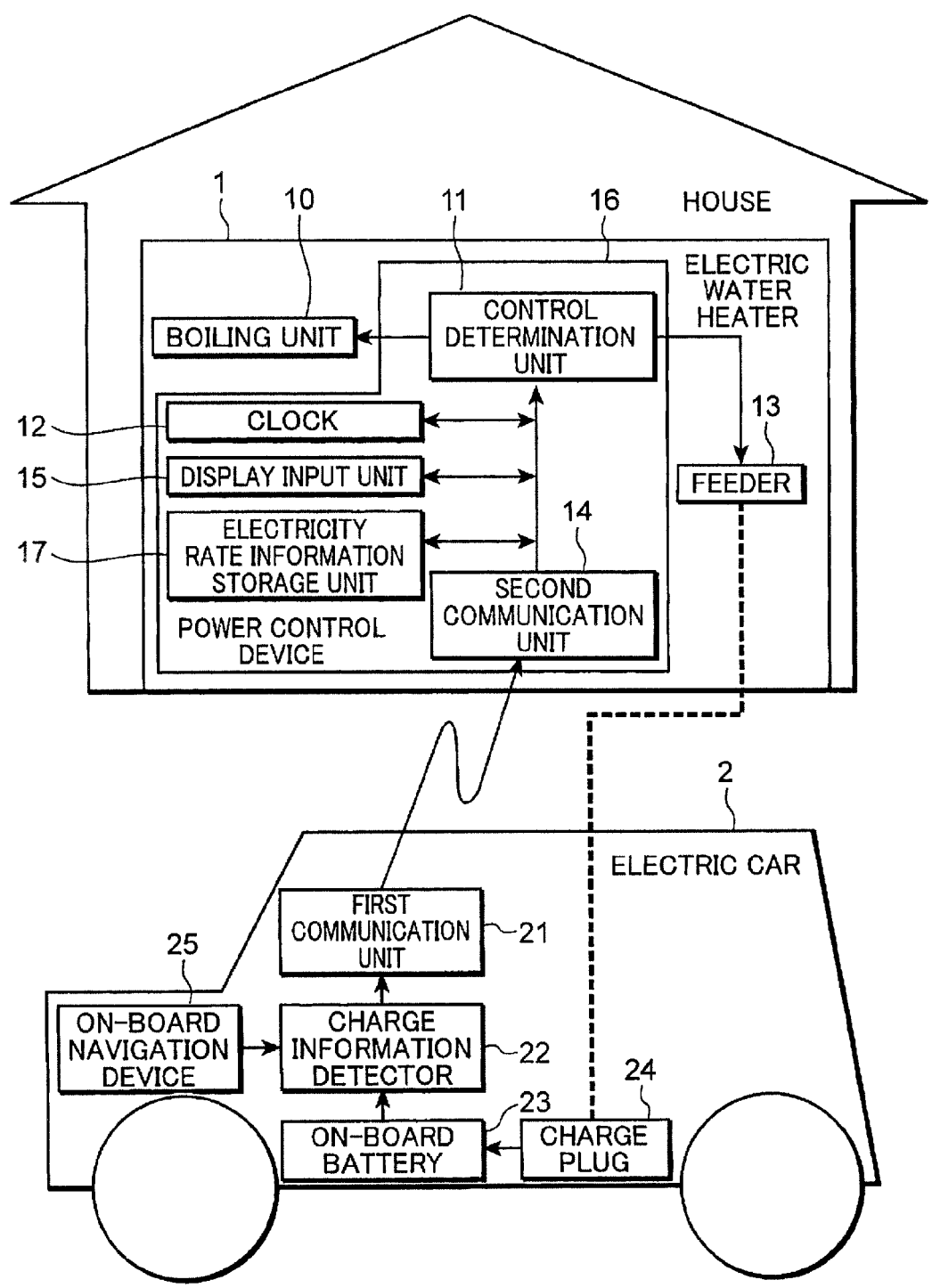
FIG. 7 is a diagram showing an example of a configuration of a power control system according to Embodiment 2 of the present invention.

FIG. 7 is a diagram showing an example of a configuration of a power control system according to Embodiment 2 of the present invention. Embodiment 2 is described hereinafter with reference to FIG. 7.

The power control system shown in FIG. 7 has the electric water heater 1 and the electric car 2. The descriptions of the configurations according to Embodiment 2 that are the same as those of Embodiment 1 are omitted.

The electric car 2 is equipped with the on-board battery 23 for running a driving motor and an on-board electrical component, the charge plug 24, the charge information detector 22, the first communication unit 21, and an on-board navigation device 25. The on-board battery 23 is charged by the feeder 13 (described later) via the charge plug 24. The on-board navigation device 25 acquires information on a current position of the electric car 2 and provides information pertaining to a distance between the current position and the house. Note that the house is an example of a location where the electric water heater 1 (the power control device 16) is installed.

The charge information detector 22 acquires charge information pertaining to charging of the rechargeable battery. The charge information detector 22 also acquires, from the on-board navigation device 25, information pertaining to a current remaining level of the on-board battery 23 and the information pertaining to the distance between the current position of the electric car 2 and the house.

Based on the acquired information pertaining to the current remaining level of the on-board battery 23 and the acquired information pertaining to the distance between the current position and the house, the charge information detector 22 computes the remaining level of the on-board battery 23 that is obtained at the time of arrival at the house.

More specifically, based on the acquired information pertaining to the distance between the current position and the house, the charge information detector 22 computes the amount of power that is consumed by the on-board battery 23 until the time of arrival at the house. The charge information detector 22 computes the remaining level of the on-board battery 23 obtained at the time of arrival at the house, by subtracting the computed amount of power that is consumed by the on-board battery 23 until the time of arrival at the house, from the acquired current remaining level of the on-board battery 23.

The first communication unit 21 transmits the charge information acquired by the charge information detector 22, prior to the arrival of the electric car 2 at a location where power is supplied to the electric car 2. The first communication unit 21 transmits at any time the charge information that includes the remaining level of the on-board battery 23 that is obtained at the time of arrival at the house, the charge information being detected by the charge information detector 22.

It is assumed that the communication path of the first communication unit 21 is configured by a mobile communication network such as a cell phone communication network, PHS communication network, WiFi, and WiMax. The charge information is eventually received by the second communication unit 14 that is equipped in the electric water heater 1 installed inside the house, and imported to the control determination unit 11.

Several methods are considered to compute the amount of power that is consumed by the on-board battery 23 at the time of arrival at the house. For example, the charge information detector 22 may register an average amount of power consumption per kilometer in advance required for the electric car 2 and later compute the amount of power consumed by the on-board battery 23 by the time the electric car 2 arrives home by multiplying the distance between the current position and the house by the above average amount of power consumption per kilometer. The charge information detector 22 may also compute an amount of power consumed per kilometer, based on a travel status of that day, and then compute the amount of power that is consumed by the on-board battery 23 until the time of arrival at the house, by multiplying the distance between the current position and the house by the computed amount of power consumed per kilometer.

The power control device 16 has the control determination unit 11, the clock 12, the second communication unit 14, the display input unit 15, and the electricity rate information storage unit 17. The control determination unit 11 plays a primary role in this power control system and carries out a data computation process and a determination process and controls each unit. The charge information includes the information on the remaining level of the on-board battery 23 that is obtained at the time of arrival at the house, the remaining level being obtained based on the distance between the current position of the electric car 2 and the location where the power control device 16 is installed (e.g., the house). The control determination unit 11 computes a time frame required to charge the on-board battery 23, in accordance with the remaining level of on-board battery 23 that is obtained at the time of arrival at the house, and determines the power supply start time of supplying power to the electric water heater 1 and the charging start time of charging the on-board battery 23, on the basis of the computed time frame required to charge the on-board battery 23.

More specifically, the control determination unit 11 reads the clock 12 and sends a boiling instruction to the boiling unit 10. After sending a boiling discontinuation instruction to the boiling unit 10, the control determination unit 11 controls the charging of the on-board battery 23 by means of the feeder 13 and the charge plug 24. Furthermore, the control determination unit 11 computes a time frame required to charge the on-board battery 23, in accordance with the remaining level thereof, computes a time frame required for the electric water heater 1 to boil water (the boiling time frame), computes the amount of water that can be boiled per fixed time frame, and computes an electricity rate for boiling the water.

The electricity rate information storage unit 17 stores time-slot differentiated electricity rate information pertaining to electricity rates that vary according to time slots. Based on the time-slot differentiated electricity rate information, the control determination unit 11 performs control such that the boiling of water in the boiling unit 10 and the charging of the on-board battery 23 are performed efficiently. The term "efficiently" here implies not only that the control is performed based on the time-slot differentiated electricity rate information in order to obtain the lowest electricity rate, but also that convenience is chosen over electricity rates in consideration of the user's intention of accomplishing energy saving.

Moreover, the control determination unit 11 refers to the time-slot differentiated electricity rate information stored in the electricity rate information storage unit 17, to determine the power supply start time of supplying power to the electric water heater 1 and the charging start time of charging the on-board battery 23, such that the charging of the on-board battery 23 is ended during a time slot in which an electricity rate becomes equal to or lower than a predetermined rate.

It should be noted in the present embodiment that the electric car 2 corresponds to an example of the electric vehicle, the on-board battery 23 to an example of the rechargeable battery, the electric water heater 1 to an example of the electric device, the power control device 16 to an example of the power control device, the charge information detector 22 to an example of the charge information acquiring unit, the first communication unit 21 to an example of the transmitter, the second communication unit 14 to an example of the receiver, the control determination unit 11 to an example of the power control unit, and the electricity rate information storage unit 17 to an example of the electricity rate information storage unit.

Complicated processes performed by the control determination unit 11 are described with reference to FIGS. 2 to 6. The processes performed by the control determination unit 11 in Embodiment 2 are described with reference to FIGS. 2 to 6 of Embodiment 1.

First, the control determination unit 11 computes a time frame required for the electric water heater 1 to boil water (boiling time frame) (step S1). Subsequently, the control determination unit 11 acquires information (the charge information) pertaining to charging of the on-board battery 23, via the second communication unit 14 (step S2). The control determination unit 11 then acquires or computes a time frame (charging time frame) required to charge the on-board battery 23, on the basis of the acquired charge information (step S3).

When the charge information includes the information pertaining to the charging time frame, the control determination unit 11 acquires the information pertaining to the charging time frame from the second communication unit 14. When, on the other hand, the charge information does not include the information pertaining to the charging time frame but includes the information pertaining to the remaining level of the on-board battery 23, the control determination unit 11 computes the charging time frame based on the remaining level of the battery 23. For example, the control determination unit 11 previously stores a table in which the remaining level of the battery and the charging time frame are correlated to each other, and computes the charging time frame by extracting from the table the charging time frame corresponding to the acquired remaining level of the battery. In Embodiment 2, the control determination unit 11 computes the charging time frame on the basis of the remaining level of the on-board battery 23 that is obtained at the time of arrival at the house.

Next, the control determination unit 11 computes a total time frame by adding up the boiling time frame and the charging time frame (step S4). The control determination unit 11 then compares the obtained total time frame with the time-slot differentiated electricity rate information (step S5).

Thereafter, the control determination unit 11 determines whether the total time frame falls within the lowest electricity rate power time slot (step S6). When it is determined that the total time frame falls within the lowest electricity rate power time slot (YES in step S6), the control determination unit 11 determines whether a current time acquired from the clock 12 reaches the lowest electricity rate time slot described in the time-slot differentiated electricity rate information (step S7).

When it is determined that the current time has not yet reached the lowest electricity rate time slot (NO in step S7), the control determination unit 11 returns to step S2 and carries out the steps subsequent to step S2. In other words, the control determination unit 11 repeats the steps S2 to S7 until the current time reaches the lowest electricity rate time slot. Repeating the steps subsequent to step S2 allows the control determination unit 11 to constantly deal with the latest information on the on-board battery 23.

On the other hand, when it is determined that the current time acquired from the clock 12 reaches the lowest electricity rate time slot described in the time-slot differentiated electricity rate information (YES in step S7), the control determination unit 11 instructs the boiling unit 10 to start boiling water (step S8). Next, the control determination unit 11 determines whether the boiling of the boiling unit 10 is ended or not (step S9). When it is determined that the boiling is not yet ended (NO in step S9), the boiling is continued until the end thereof.

When, on the other hand, it is determined that the boiling is ended (YES in step S9), the control determination unit 11 instructs the feeder 13 to start charging the on-board battery 23 (step S10). Subsequently, the control determination unit 11 determines whether the charging of the on-board battery 23 is ended or not (step S11). When it is determined that the charging of the on-board battery 23 is not yet ended (NO in step S11), the feeder 13 continues to charge the on-board battery 23 until the end thereof. When it is determined that the charging of the on-board battery 23 is ended (YES in step S11), the control determination unit 11 ends the series of boiling and battery charging processes.

The above description has focused on the case in which the total time frame, obtained by adding up the boiling time frame and the charging time frame, is compared with the time-slot differentiated electricity rate information and then certainly falls within the lowest electricity rate power time slot. FIG. 4 shows the relationship among the boiling time period, the on-board battery charging time period, and the time-slot differentiated electricity rate information, which is obtained when the total time frame of the boiling time frame and the charging time frame falls within the lowest electricity rate power time slot. In FIG. 4, both the boiling time period and the charging time period fall within the power time slot producing the lowest electricity rate of 9 yen/KWH, which means that the boiling and the charging are completed successfully without having the consumed electricity exceed the marginal power or without having the breaker off.

In actuality, however, when the electric car 2 travels a longer distance and the total time frame obtained by adding up the boiling time frame and the charging frame is compared with the time-slot differentiated electricity rate information, the total time frame might not fall within the lowest electricity rate power time slot. In this case, step S12 shown in FIG. 3 is performed subsequent to the determination condition of step S6.

When, in step S6 shown in FIG. 2, it is determined that the total time frame does not fall within the lowest electricity rate power time slot (NO in step S6), the control determination unit 11 causes the user to use the display input unit 15 to choose either to give priority to economics or to give priority to convenience over economics (step S12 in FIG. 3). However, when performing display input, the user is not necessarily present in the vicinity of the electric water heater 1. Thus, the user can choose to give priority to either economics or convenience in advance. In this case, no operation is performed to prompt the user to display or input using the display input unit 15, and therefore step S12 is skipped. At this moment, the control determination unit 11 previously causes the user to use the display input unit 15 to prioritize either economics or convenience, and stores information indicating the selected priority.

Next, the control determination unit 11 determines whether economics are given priority or not (step S13). FIGS. 3 and 5 are now used to describe a case in which the user chooses to give priority to economics over convenience in step S13.

When it is determined that the user gives priority to economics, or when the user chooses to give priority to economics (YES in step S13), the control determination unit 11 reduces the amount of water to be boiled and computes the reduced amount of water to be boiled and the electricity rate incurred to boil the reduced amount of water to be boiled, so that the total time frame falls within the lowest electricity rate power time slot (step S14). In other words, the control determination unit 11 computes the amount of water that can be boiled within a remaining time frame that is obtained by subtracting the charging time frame of the on-board battery 23 from the lowest electricity rate power time slot.

Subsequently, the control determination unit 11 displays, on the display input unit 15, the reduced amount of water to be boiled and the electricity rate incurred to boil the reduced amount of water to be boiled, and asks the user to accept these displayed inputs (step S15). However, because the user is not necessarily present in the vicinity of the electric water heater 1 in this case as well, the user can accept these inputs in advance. In such a case, no operation is performed to prompt the user to display or input using the display input unit 15, and therefore step S15 is skipped. At this moment, when the reduced amount of water to be boiled and the electricity rate incurred to boil the reduced amount of water to be boiled are computed, the control determination unit 11 causes the user to use the display input unit 15 to previously choose whether or not to accept the reduced amount of water to be boiled and the electricity rate incurred to boil the reduced amount of water to be boiled, and then stores information indicating the resultant acceptance or rejection.

The control determination unit 11 then determines whether the current time acquired from the clock 12 reaches the lowest electricity rate time slot described in the time-slot differentiated electricity rate information (step S17). Here, when it is determined that the current time has not yet reached the lowest electricity rate time slot (NO in step S17), the control determination unit 11 returns to step S2 and carries out the steps subsequent to step S2.

When, on the other hand, it is determined that the current time reaches the lowest electricity rate time slot (YES in step S17), the control determination unit 11 instructs the boiling unit 10 to start boiling the reduced amount of water to be boiled (step S18). The control determination unit 11 then determines whether the boiling is ended or not (step S19). When it is determined that the boiling is not yet ended (NO in step S19), the boiling is continued until the end thereof.

When it is determined that the boiling is ended (YES in step S19), the control determination unit 11 instructs the feeder 13 to start charging the on-board battery 23 (step S20). Subsequently, the control determination unit 11 determines whether the charging of the on-board battery 23 is ended or not (step S21). When it is determined that the charging of the on-board battery 23 is not yet ended (NO in step S21), the feeder 13 continues to charge the on-board battery 23 until the end thereof. When it is determined that the charging of the on-board battery 23 is ended (YES in step S21), the control determination unit 11 ends the series of boiling and battery charging processes.

FIG. 5 is a diagram showing the relationship among the time-slot differentiated electricity rate information, the boiling time period, and the charging time period for charging the on-board battery 23, the relationship being obtained when economics are given priority. In this case, because the reduced amount of water is boiled, both the boiling time period and the charging time period fall within the lowest electricity rate time slot described in the time-slot differentiated electricity rate information.

Next, FIGS. 3 and 6 are used for describing a case in which the user chooses to prioritize convenience over economics in step S13.

When it is determined that the user chooses not to prioritize economics, or when the user chooses to give priority to convenience (NO in step S13), the control determination unit 11 computes a boiling start time for boiling the entire amount of water, instead of keeping the total time frame of the boiling time frame and the charging time frame within the lowest electricity rate power time slot (step S22). At this moment, the control determination unit 11 computes the boiling start time as a time at which the boiling time frame starts, which is obtained when the end of the charging time frame in which the charging is performed subsequent to the boiling, matches an ending time of the lowest electricity rate power time slot.

Next, the control determination unit 11 determines whether the current time acquired from the clock 12 reaches the boiling start time or not (step S23). When it is determined that the current time has not yet reached the boiling start time (NO in step S23), the control determination unit 11 returns to step S2 and carries out the steps subsequent to step S2. As described above, repeating the steps subsequent to step S2 of FIG. 2 allows the control determination unit 11 to constantly deal with the latest information on the on-board battery 23.

When it is determined that the current time reaches the boiling start time (YES in step S23), the control determination unit 11 instructs the boiling unit 10 to start boiling the entire amount of water that is not reduced in amount (step S24). Thereafter, steps S19 to S21 are performed.

FIG. 6 shows the relationship among the time-slot differentiated electricity rate information, the boiling time period, and the charging time period for charging the on-board battery, the relationship being obtained when convenience is given priority and the entire amount of water is boiled outside the lowest electricity rate power time slot. In this case, as shown in the diagram, the boiling is started before the start of the lowest electricity rate time slot described in the time-slot differentiated electricity rate information, in order to boil the entire amount of water without reducing it, and then boiling the entire amount of water and charging the on-board battery 23 are ended.

As described above, because the boiling start time of the electric water heater 1 is brought forward in accordance with the remaining level of the on-board battery 23 that is obtained when the electric car 2 arrives home, it is possible to avoid the inconvenience in which the water in the electric water heater 1 is not yet boiled even after the lowest electricity rate time slot. It is also possible to avoid the inconvenience in which the on-board battery 23 is not charged enough that the electric car 2 cannot be moved or reach a destination.

The remaining level of the on-board battery 23 that is obtained when the electric car 2 arrives home can be understood more accurately than when acquiring the remaining level of the on-board battery 23 in real time. Therefore, more detailed control can be performed.

The above has described the control performed so as to always keep the charging of the on-board battery 23 within the lowest electricity rate time slot described in the time-slot differentiated electricity rate information. However, in actuality, this control might not be enough. For instance, when the electric car 2 is used before the lowest electricity rate time slot described in the time-slot differentiated electricity rate information ends, the on-board battery 23 might not be charged enough that the electric car 2 cannot be used. In this case, a time at which the charging should be ended is input through the display input unit 15, and then the control determination unit 11 performs the above-described operations using the time at which the charging should be ended, instead of using the ending time of the lowest electricity rate time slot described in the time-slot differentiated electricity rate information. Accordingly, the control determination unit 11 can be caused to perform the same operations as those described above, achieving the effects same as or better than those described above.

Moreover, the above has described the basic conditions where the on-board battery 23 is charged fully due to its characteristics, but this charging method is not necessarily preferred in terms of energy saving. For example, the user may predict a distance that the electric car 2 travels the following day (or a charge amount corresponding to the travel distance), input the travel distance of the next day (or the charge amount corresponding to the travel distance) by using the display input unit 15, and then charge the on-board battery 23 to a required level without charging it fully every time. This can reduce the amount of time required for the charging, and both the boiling and the charging can be ended within the lowest electricity rate time slot described in the time-slot differentiated electricity rate information For example, the on-board navigation device 25 accepts input of a following day's total travel plan from the user and computes the distance that the electric car 2 travels the following day (or the charge amount corresponding to the travel distance). The charge information detector 22 acquires, from the on-board navigation device 25, the following day's travel distance (or the charge amount corresponding to the travel distance), the information pertaining the current remaining level of the on-board battery 23, and the information pertaining to the distance between the current position and the house. The first communication unit 21 transmits the charge information that includes the remaining level of the on-board battery 23 that is obtained at the time of arrival at the house, and the following day's travel distance (or the charge amount corresponding to the travel distance), the charge information being detected by the charge information detector 22. On the basis of the following day's travel distance (or the charge amount corresponding to the travel distance) and the remaining level of the on-board battery 23 that is obtained at the time of arrival at the house, the control determination unit 11 determines the charge amount of the on-board battery 23 and adjusts the charging time frame for charging the on-board battery 23 and the boiling time frame of the electric water heater 1.

At the time of departure on a certain day, the user may previously store, in the on-board navigation device 25, routing information indicating a route from the house to a destination and routing information indicating a route from the destination to the house. Then, based on the outward routing information and the homeward routing information, the control determination unit 11 may estimate the amount of power that is scheduled to be consumed by the on-board battery 23 that day, and adjust the charging time frame for charging the on-board battery 23 and the boiling time frame of the electric water heater 1.

The above has described the competition between the electric water heater 1 and the on-board battery 23 over the power. However, the same control operations as those described above can be performed to achieve the same effects, not only in this competition but also in a competition between the on-board battery 23 and the electric device (e.g., a washer/dryer, a dish washer, etc.) that can be operated during the lowest electricity rate time slot described in the time-slot differentiated electricity rate information.

Moreover, in the present embodiment, it is most preferred that the first communication unit 21 communicate, at all times or on a regular basis, the information pertaining to the remaining level of the on-board battery 23 that changes every minute while the electric car 2 travels. The electric car 2 does not have to be in a travelling state to perform communication and no problem arises to communicate the information while the electric car 2 is parked. The first communication unit 21 may also communicate the information when the electric car 2 is started up (when getting on the car) or when the electric car 2 is stopped (when getting off the car).

The above has also described the example in which the electric water heater 1 is used as the electric device, but the electric device may be an electric boiler that boils water by using electric heat only.

Embodiment 3

The electric car 2 according to Embodiment 2 computes the remaining level of the on-board battery 23 that is obtained at the time of arrival of the electric car 2 at the installation location where the power control device 16 (the electric water heater 1) is installed. In Embodiment 3, on the other hand, a server device computes the remaining level of the on-board battery 23 that is obtained at the time of arrival of the electric car 2 at the installation location where the power control device 16 (the electric water heater 1) is installed.

Figure 8:
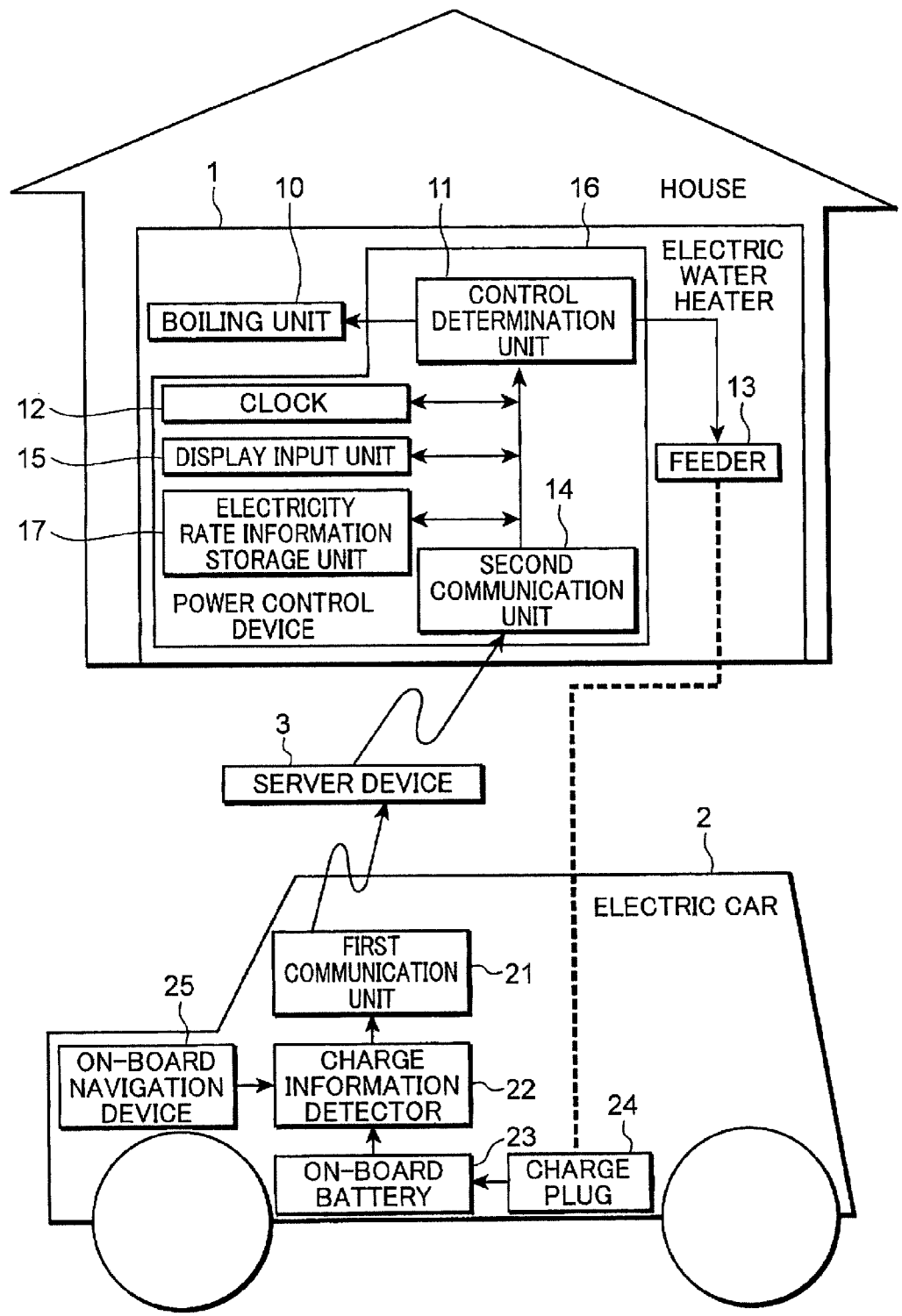
FIG. 8 is a diagram showing an example of a configuration of a power control system according to Embodiment 3 of the present invention.

FIG. 8 is a diagram showing an example of a configuration of a power control system according to Embodiment 3 of the present invention. Embodiment 3 is described with reference to FIG. 8.

The power control system shown in FIG. 8 has the electric water heater 1, the electric car 2, and a server device 3. The descriptions of the configurations according to Embodiment 3 that are the same as those of Embodiment 2 are omitted. The server device 3 mediates the communication between the electric car 2 and the power control device 16 (the electric water heater 1).

The on-board navigation device 25 acquires information on a current position of the electric car 2 and provides information pertaining to a distance between the current position and the house.

The charge information detector 22 acquires information pertaining to a current remaining level of the on-board battery 23 and the information pertaining to a distance between the current position of the electric car 2 and an installation location where the electric water heater 1 (the power control device 16) is installed (e.g., the house) from the on-board navigation device 25.

The first communication unit 21 transmits, to the server device 3, the charge information that includes the information pertaining to the current remaining level of the on-board battery 23, which is acquired by the charge information detector 22, and the information pertaining to the distance between the current position of the electric car 2 and the installation location where the electric water heater 1 (the power control device 16) is installed (e.g., the house).

Figure 9:
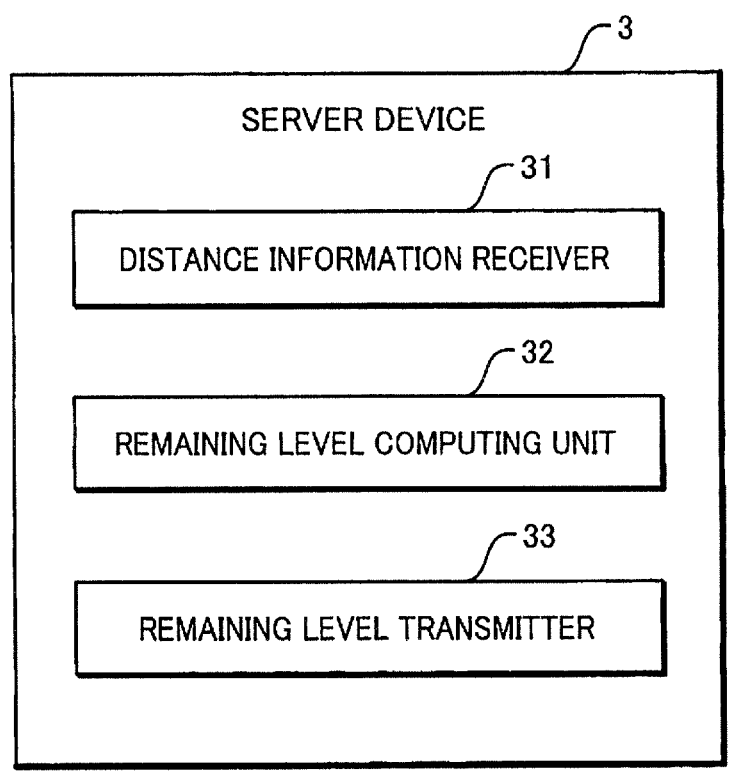
FIG. 9 is a diagram showing a configuration of a server device in FIG. 8.

FIG. 9 is a diagram showing a configuration of the server device 3 of FIG. 8. The server device 3 has a distance information receiver 31, a remaining level computing unit 32, and a remaining level transmitter 33.

The distance information receiver 31 receives, from the electric car 2, the charge information that includes the information pertaining to the current remaining level of the on-board battery 23 and the information pertaining to the distance between the current position of the electric car 2 and the installation location where the electric water heater 1 (the power control device 16) is installed (e.g., the house).

The remaining level computing unit 32 computes the remaining level of the on-board battery 23 obtained at the time of arrival at the house, on the basis of the received information pertaining to the current remaining level of the on-board battery 23 and the received information pertaining to the distance between the current position and the house. More specifically, the remaining level computing unit 32 computes the amount of power consumed by the on-board battery 23 prior to the arrival of the electric car 2 at the house, on the basis of the received information pertaining to the distance between the current position and the house. The remaining level computing unit 32 computes the remaining level of the on-board battery 23 obtained at the time of arrival at the house, by subtracting the computed amount of power consumed by the on-board battery 23 prior to the arrival of the electric car 2 at the house, from the received current remaining level of the on-board battery 23.

The remaining level transmitter 33 transmits, to the power control device 16, the charge information that includes the information pertaining to the remaining level of the on-board battery 23 obtained at the time of arrival at the house, the remaining level being computed by the remaining level computing unit 32.

Prior to the arrival of the electric car 2 at the location where power is supplied to the electric car 2, the second communication unit 14 of the power control device 16 receives the charge information transmitted by the remaining level transmitter 33.

Note that the processes performed by the control determination unit 11 are same as those described in Embodiment 2, thus the description thereof is omitted.

According to Embodiment 3, the remaining level of the on-board battery 23 obtained at the time of arrival of the electric car 2 at the installation location does not have to be computed in the electric car 2 or the power control device 16. Thus, the number of processes performed in the electric car 2 and the power control device 16 can be reduced.

Embodiment 4

A power control system according to Embodiment 4 of the present invention is described next. A configuration of the power control system according to Embodiment 4 is substantially the same as that of the power control system of Embodiment 2 shown in FIG. 7. Configurations different than those described Embodiment 2 are described hereinafter.

The on-board navigation device 25 acquires the information on the current position of the electric car 2, and provides the information pertaining to the distance between the current position and the house, and information pertaining to an estimated arrival time to the house. Note that the house is an example of the installation location where the electric water heater 1 (the power control device 16) is installed.

The charge information detector 22 acquires, from the on-board navigation device 25, the information pertaining to the current remaining level of the on-board battery 23, the information pertaining to the distance between the current position of the electric car 2 and the house, and the information pertaining to the estimated arrival time to the house.

The charge information detector 22 computes the remaining level of the on-board battery 23 obtained at the time of arrival of the electric car 2 at the house, on the basis of the acquired information pertaining to the current remaining level of the on-board battery 23 and the acquired information pertaining to the distance between the current position and the house.

The first communication unit 21 transmits charge information that includes the remaining level of the on-board battery 23 obtained at the time of arrival of the electric car 2 at the house, and the estimated arrival time to the house, the remaining level and the estimated arrival time being acquired by the charge information detector 22.

In response to the remaining level of the on-board battery 23 obtained at the time of arrival of the electric car 2 at the house, the control determination unit 11 computes a time frame (charging time frame) required to charge the on-board battery 23, and a time frame (boiling time frame) required to boil water in the electric water heater 1. The control determination unit 11 determines the power supply start time of supplying power to the electric water heater 1 and the charging start time of charging the on-board battery 23, on the basis of the computed charging time frame, the computed boiling time frame, and the estimated arrival time at which the electric car 2 is expected to arrive at the house.

Figure 10:
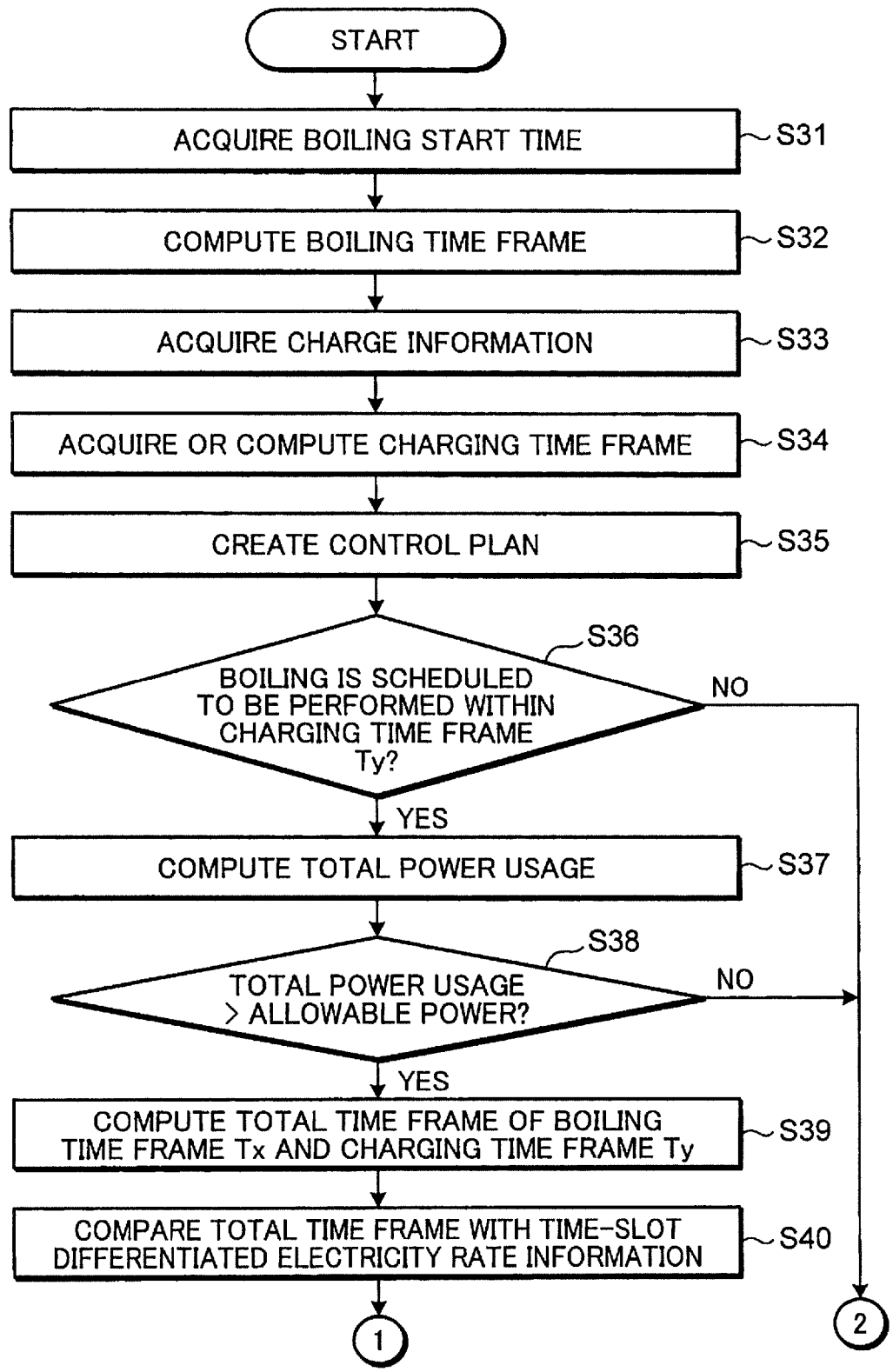
FIG. 10 is a first flowchart showing processes performed by a control determination unit 11 according to Embodiment 4 of the present invention.
Figure 11:
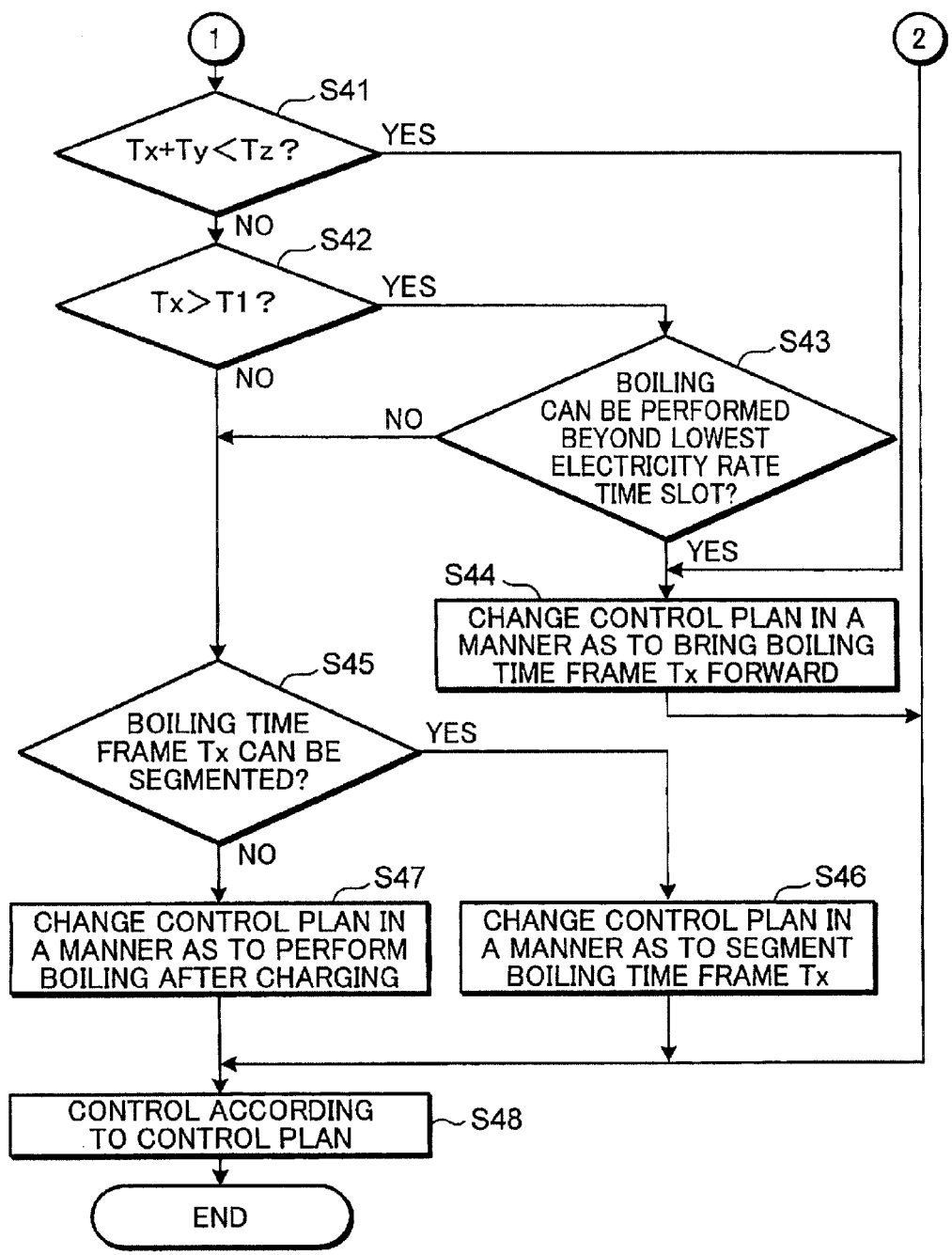
FIG. 11 is a second flowchart showing processes performed by the control determination unit 11 according to Embodiment 4 of the present invention.

FIGS. 10 and 11 are flowcharts, each showing processes performed by the control determination unit 11 according to Embodiment 4 of the present invention.

First, the control determination unit 11 acquires the boiling start time of the electric water heater 1 that is set in advance (step S31). The display input unit 15 accepts a setting of the boiling start time of the electric water heater 1 done by the user, and the control determination unit 11 stores the boiling start time set by the display input unit 15.

Next, the control determination unit 11 computes a time frame required for the electric water heater 1 to boil water (boiling time frame Tx) (step S32). The control determination unit 11 then acquires information pertaining to charging of the on-board battery 23 (charge information), via the second communication unit 14 (step S33). The control determination unit 11 then acquires or computes a time frame required to charge the on-board battery 23 (charging time frame Ty), on the basis of the acquired charge information (step S34). In Embodiment 4, the control determination unit 11 computes the charging time frame Ty based on the remaining level of the on-board battery 23 obtained at the time of arrival of the electric car 2 at the house.

Subsequently, the control determination unit 11 creates a control plan that includes the previously set boiling start time, a boiling ending time computed by adding up the boiling start time and the boiling time frame Tx, a charging start time that indicates the estimated arrival time of the electric car 2 included in the acquired charge information, and a charging ending time computed by adding up the charging start time and the charging time frame Ty (step S35).

The control determination unit 11 then refers to the created control plan to determine whether boiling is scheduled to be performed within the charging time frame Ty (step S36).

Figure 12:
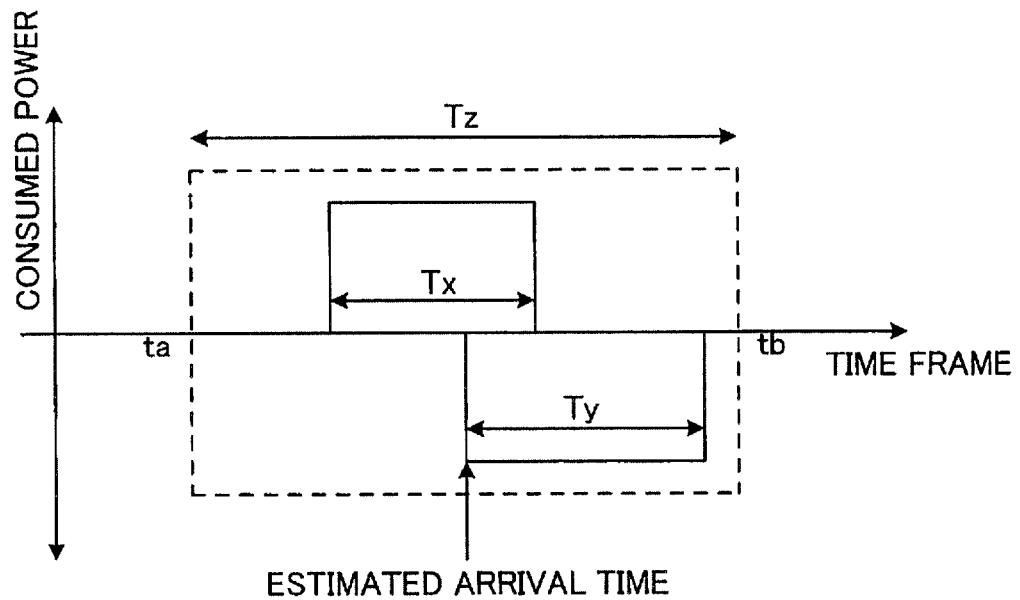
FIG. 12 is a diagram showing an example of a boiling time frame and a charging time frame according to Embodiment 4 of the present invention.

FIG. 12 is a diagram showing an example of the boiling time frame and the charging time frame according to Embodiment 4 of the present invention. As shown in FIG. 12, charging is started at the estimated arrival time to the house, and the boiling time frame Tx and the charging time frame Ty overlap with each other. The boiling time frame Tx and the charging time frame Ty fall within a lowest electricity rate power time slot Tz. The boiling start time is later than a start time to of the lowest electricity rate power time slot Tz, and the charging start time is when the charging is started as soon as the electric car 2 arrives at the house, and is same as the estimated arrival time. For example, the control determination unit 11 determines whether the boiling is scheduled to be performed within the charging time frame Ty, by determining whether or not the boiling ending time is later than the estimated arrival time.

Here, when it is determined that the boiling is not scheduled to be performed within the charging time frame Ty (NO in step S36), no changes need to be made to the created control plan. Thus, the control determination unit 11 moves to step S48.

When, on the other hand, it is determined that the boiling is scheduled to be performed within the charging time frame Ty (YES in step S36), the control determination unit 11 computes a total power usage, which is a total of the amount of power used in the boiling and the amount of power used in the charging of the on-board battery 23 (step S37).

Next, the control determination unit 11 determines whether the total power usage is greater than an allowable power or not (step S38). When it is determined that the total power usage is equal to or lower than the allowable power (NO in step S38), no changes need to be made to the created control plan. Thus, the control determination unit 11 moves to step S48.

When it is determined that the total power usage is greater than the allowable power (YES in step S37), the control determination unit 11 computes a total time frame by adding up the boiling time frame Tx and the charging time frame Ty (step S39). The control determination unit 11 then compares the computed total time frame with the time-slot differentiated electricity rate information (step S40).

Subsequently, the control determination unit 11 determines whether the total time frame falls within the lowest electricity rate power time slot Tz (step S41). When it is determined that the total time frame falls within the lowest electricity rate power time slot (YES in step S41), the control determination unit 11 changes the control plan in a manner as to bring the boiling time frame forward (step S44). In other words, the control determination unit 11 changes the control plan by inversely computing the charging time frame Ty and the boiling time frame Tx from an ending time tb of the lowest electricity rate power time slot to determine the boiling start time.

Figure 13:
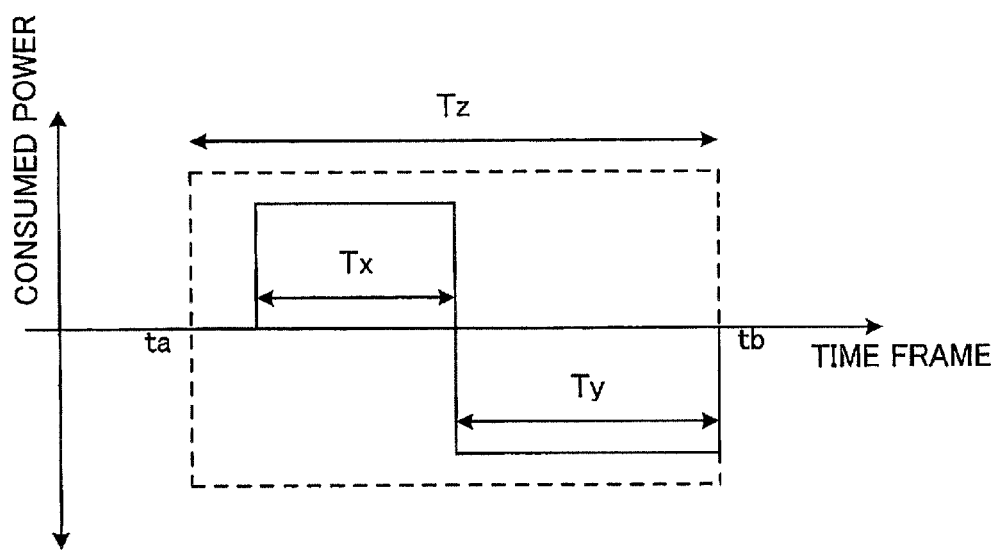
FIG. 13 is a diagram showing an example of the boiling time frame and the charging time frame obtained when the boiling time frame is brought forward.

FIG. 13 is a diagram showing an example of the boiling time frame and the charging time frame obtained when the boiling time frame is brought forward. As shown in FIG. 13, the charging is started after the end of the boiling, and the boiling time frame Tx and the charging time frame Ty do not overlap with each other. The boiling time frame Tx and the charging time frame Ty fall within the lowest electricity rate power time slot Tz. The boiling start time is later than the start time ta of the lowest electricity rate power time slot Tz, and the charging ending time is same as the ending time tb of the lowest electricity rate power time slot Tz.

Note in FIG. 13 that the charging ending time is same as the ending time tb of the lowest electricity rate time slot Tz, but the charging ending time may be brought forward such that the start time of the boiling time frame Tx becomes the same as the start time ta of the lowest electricity rate time slot Tz.

The control determination unit 11 determines the charging ending time in a manner as to match the charging ending time and the ending time tb of the lowest electricity rate power time slot, and determines the charging start time in accordance with the determined charging ending time. The control determination unit 11 also determines the boiling ending time such that the boiling is ended immediately prior to the determined charging start time, and determines the boiling start time in accordance with the determined boiling ending time.

However, when it is determined that the total time frame does not fall within the lowest electricity rate power time slot (NO in step S41), the control determination unit 11 determines whether or not the boiling time frame Tx is longer than a time frame T1 between a current time and the estimated arrival time (step S42). When it is determined that the boiling time frame Tx is longer than the time frame T1 between the current time and the estimated arrival time (YES in step S42), the control determination unit 11 determines whether or not the boiling can be performed outside the lowest electricity rate time slot (step S43). Note that the control determination unit 11 causes the user to previously use the display input unit 15 to select whether the boiling is possible outside the lowest electricity rate time slot, and then stores information indicating the results of the user's selection.

In addition, the control determination unit 11 may inquire the user whether the boiling is performed outside the lowest electricity rate time slot or not. In this case, the control determination unit 11 transmits, via the second communication unit 14 to the electric car 2, information for inquiring the user whether the boiling is performed outside the lowest electricity rate time slot. The on-board navigation device 25 then accepts a selection made by the user as to whether the boiling is performed outside the lowest electricity rate time slot or not, and transmits the accepted information via the first communication unit 21 to the power control device 16. Then, based on the information transmitted by the electric car 2, the control determination unit 11 then determines whether the boiling can be performed outside the lowest electricity rate time slot.

When it is determined that the boiling can be performed outside the lowest electricity rate time slot (YES in step S43), the control determination unit 11 changes the control plan in a manner as to bring the boiling time frame forward (step S44). In other words, the control determination unit 11 changes the control plan by inversely computing the charging time frame Ty and the boiling time frame Tx from the ending time tb of the lowest electricity rate power time slot to determine the boiling start time.

Figure 14:
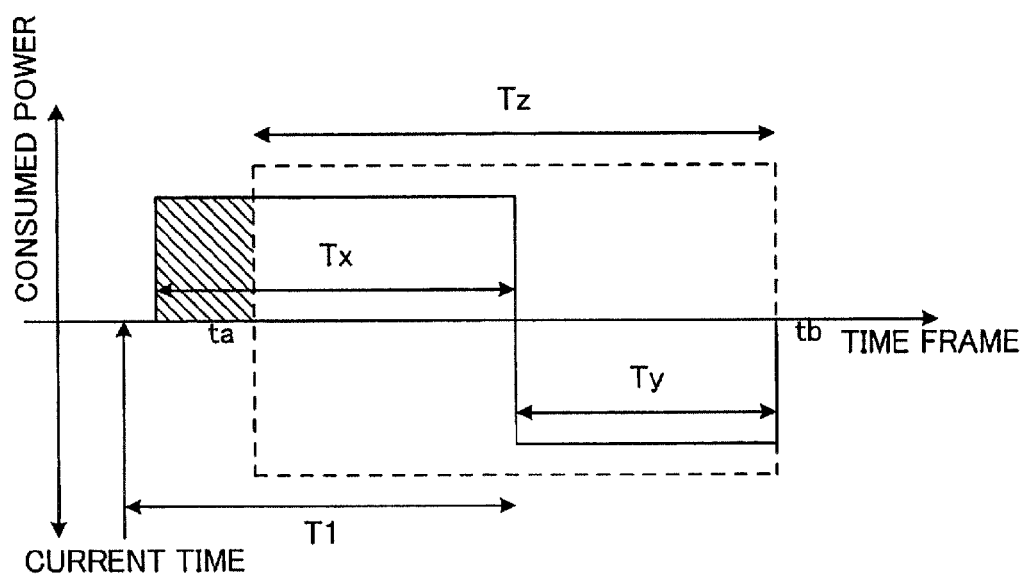
FIG. 14 is a diagram showing an example of the boiling time frame and the charging time frame obtained when the boiling time frame is brought forward and when boiling is performed outside the lowest electricity rate time slot.

FIG. 14 is a diagram showing an example of the boiling time frame and the charging time frame obtained when the boiling time frame is brought forward and when the boiling is performed outside the lowest electricity rate time slot. As shown in FIG. 14, the charging is started after the end of the boiling, and the boiling time frame Tx and the charging time frame Ty do not overlap with each other. The charging time frame Ty falls within the lowest electricity rate power time slot Tz, but the boiling time frame Tx exceeds the lowest electricity rate power time slot Tz. The boiling start time is sooner than the start time to of the lowest electricity rate power time slot Tz, and the charging ending time is same as the ending time tb of the lowest electricity rate power time slot Tz.

The control determination unit 11 determines the charging ending time in a manner as to match the charging ending time and the ending time tb of the lowest electricity rate power time slot, and determines the charging start time in accordance with the determined charging ending time. The control determination unit 11 also determines the boiling ending time such that the boiling is ended immediately prior to the determined charging start time, and determines the boiling start time in accordance with the determined boiling ending time.

When it is determined that the boiling time frame Tx is equal to or shorter than the time frame T1 between the current time and the estimated arrival time (NO in step S42), or when it is determined that the boiling cannot be performed outside the lowest electricity rate time slot (NO in step S43), the control determination unit 11 determines whether or not the boiling time frame Tx can be segmented (step S45). Note that the electric device include an electric device in which an operating time frame thereof can be segmented, and an electric device in which an operating time frame cannot be segmented. The control determination unit 11 determines whether the boiling time frame Tx can be segmented or not, by storing information pertaining to the possibility of segmentation of an operating time frame, with respect to each electric device.

When it is determined that the boiling time frame Tx can be segmented (YES in step S45), the control determination unit 11 changes the control plan in a manner as to segment the boiling time frame Tx (step S46). The control determination unit 11 segments the boiling time frame Tx into a first boiling time frame Tx1, which is prior to the charging start time and falls within the lowest electricity rate time slot Tz, and a second boiling time frame Tx2, which is after the charging ending time.

Figure 15:
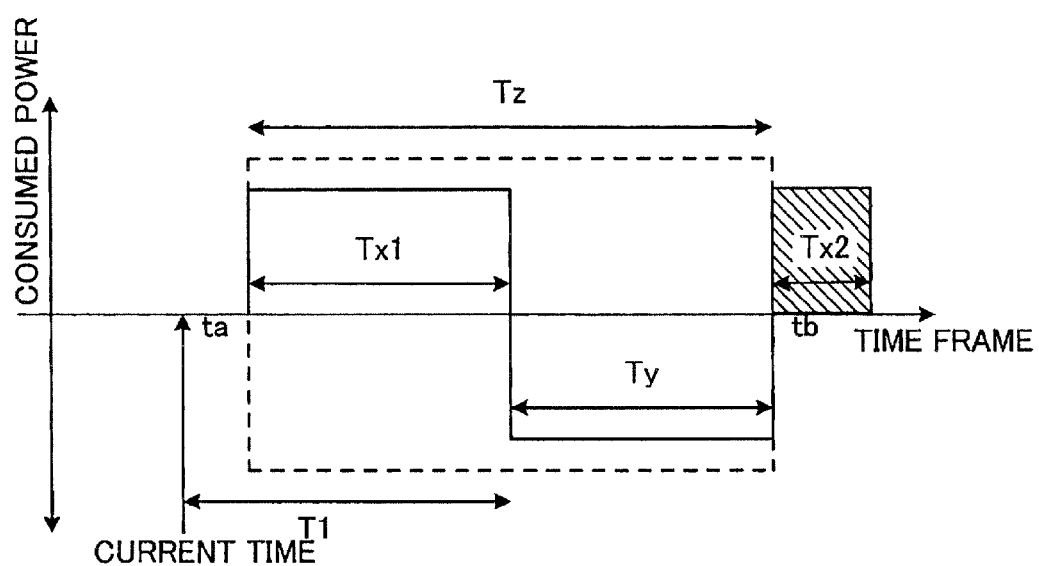
FIG. 15 is a diagram showing an example of the boiling time frame and the charging time frame obtained when the boiling time frame is segmented.

FIG. 15 is a diagram showing an example of the boiling time frame and the charging time frame obtained when the boiling time frame is segmented. As shown in FIG. 15, the charging is started after the end of the boiling, and the boiling is started again after the end of the charging. The boiling time frame Tx and the charging time frame Ty do not overlap with each other. The boiling time frame Tx is segmented into the first boiling time frame Tx1 and the second boiling time frame Tx2. The first boiling time frame Tx1 is prior to the charging start time and falls within the lowest electricity rate time slot Tz. The second boiling time frame Tx2 follows the charging ending time and exceeds the lowest electricity rate time slot Tz. The boiling start time of the first boiling time frame Tx1 is same as the start time to of the lowest electricity rate power time slot Tz, and the charging ending time of the first boiling time frame Tx1 is same as the ending time tb of the lowest electricity rate power time slot Tz. The boiling start time of the second boiling time frame Tx2 follows immediately after the ending time tb of the lowest electricity rate power time slot Tz.

The control determination unit 11 segments the boiling time frame Tx into the first boiling time frame Tx1 and the second boiling time frame Tx2 such that a total time frame obtained by adding up the first boiling time frame Tx1 and the charging time frame Ty falls within the lowest electricity rate power time slot Tz.

The control determination unit 11 determines the charging ending time in a manner as to match the charging ending time and the ending time tb of the lowest electricity rate power time slot, and determines the charging start time in accordance with the determined charging ending time. The control determination unit 11 also determines the boiling ending time of the first boiling time frame Tx1 such that the boiling is ended immediately prior to the determined charging start time, and determines the boiling start time of the first boiling time frame Tx1 in a manner as to match the boiling start time and the start time ta of the lowest electricity rate power time slot. The control determination unit 11 further determines the boiling start time of the second boiling time frame Tx2 such that the boiling starts again immediately after the charging ending time, and determines the boiling ending time of the second boiling time frame Tx2 in accordance with the determined boiling start time of the second boiling time frame Tx2.

When it is determined that the boiling time frame Tx cannot be segmented (NO in step S45), the control determination unit 11 changes the control plan such that the boiling is performed after the charging is performed (step S47).

Figure 16:
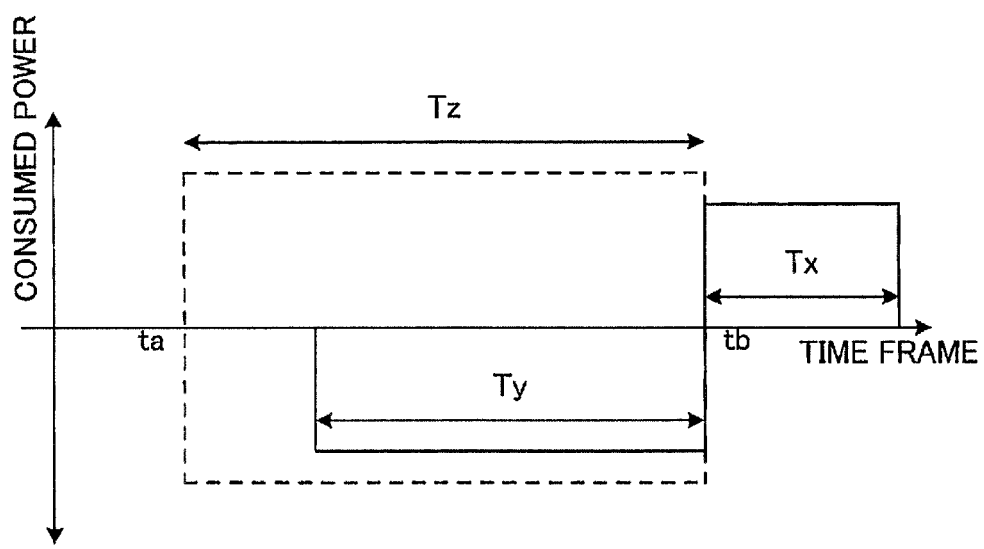
FIG. 16 is a diagram showing an example of the boiling time frame and the charging time frame obtained when the boiling is performed after charging is done.

FIG. 16 is a diagram showing an example of the boiling time frame and the charging time frame obtained when the boiling is performed after the charging is performed. As shown in FIG. 16, the boiling is started after the end of the charging, and the boiling time frame Tx and the charging time frame Ty do not overlap with each other. Although the charging time frame Ty falls within the lowest electricity rate power time slot Tz, the boiling time frame Tx exceeds the lowest electricity rate power time slot Tz. The charging ending time is same as the ending time tb of the lowest electricity rate power time slot Tz, and the boiling start time follows immediately after the charging ending time.

Note in FIG. 16 that the charging ending time is same as the ending time tb of the lowest electricity rate time slot Tz, but the charging ending time may be brought forward such that the start time of the boiling time frame Tx becomes the same as the start time ta of the lowest electricity rate time slot Tz.

The control determination unit 11 determines the charging ending time in a manner as to match the charging ending time and the ending time tb of the lowest electricity rate power time slot, and determines the charging start time in accordance with the determined charging ending time. The control determination unit 11 also determines the boiling start time such that the boiling is started immediately after the determined charging ending time, and determines the boiling ending time in accordance with the determined boiling start time.

Next, the control determination unit 11 controls the boiling of the electric water heater 1 and the charging of the on-board battery 23 in accordance with the control plan (step S48).

Note that, in the present embodiment, when the charging is not ended by the ending time of the lowest electricity rate time slot, the control determination unit 11 may display a charged amount or a remaining charging time frame on the display input unit 15 and causes the user to select whether or not to continue to charge the battery.

In FIGS. 4 to 6 and 12 to 16, the power consumed in the boiling and the power consumed in the charging are shown in rectangular shapes. In actuality, however, because these consumed powers change with time, they do not necessarily form rectangular shapes. When the power consumed by the electric water heater 1 (electric device) lowers and does not exceed the allowable power even when the boiling and the charging are performed simultaneously, the charging may be started prior to the end of the boiling.

Moreover, the lowest electricity rate time slot may be not only a predetermined time slot (e.g., 11 p.m. to 7 a.m.), but also a lowest electricity time slot of a certain day that is acquired from a server and provided by a power company.

When the power control system has a solar power generation system or a fuel cell, the lowest electricity rate time slot may be a time slot producing a surplus amount of generated power, which is, for example, between 9 a.m. and 4 p.m. on a sunny day.

As in the power control system of Embodiment 3 shown in FIG. 8, the flowcharts of FIGS. 10 and 11 may be shared by the server device and the power control device by using the server device in the power control system of Embodiment 4 of the present invention. For instance, allowing the server device to carry out the processes of steps S33 and S34 of FIG. 10 can eliminate the process of computing the arrival time to the installation location or the remaining level of the on-board battery 23 obtained at the time of arrival in the electric car 2 and the power control device 16. This reduces the number of processes performed in the electric car 2 and the power control device 16.

In addition, when the server device computes the arrival time of the electric car 2 and the remaining level of the on-board battery 23, traffic information on a road used by the electric car 2 and weather information can be acquired from another server device and referred to, so that the arrival time can be computed with a high degree of accuracy in the light of a delay in the arrival time caused due to a traffic jam, and so that the remaining level of the on-board battery 23 can be computed with a high degree of accuracy in the light of the amount of electricity consumed by the on-board battery as a result of using a windshield wiper in the rain or as a result of using air-conditioning equipment.

Moreover, in the power control system equipped with the server device, not only is it possible to cause the server device to compute the arrival time to the installation location and the remaining level of the on-board battery obtained at the time of arrival, but also the server device can be caused to perform a part or all of the processes described in the flowcharts of FIGS. 10 and 11.

Embodiment 5

Figure 17:
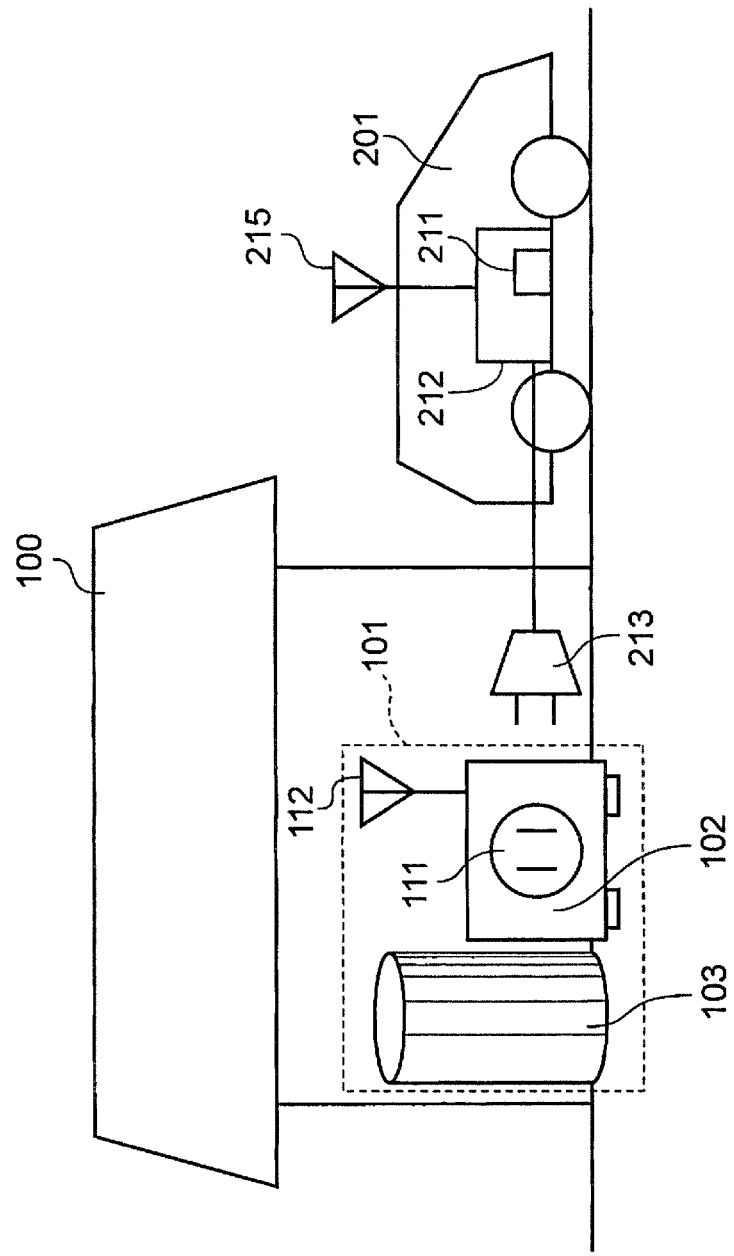
FIG. 17 is an overview showing an example of a configuration of a power control system according to Embodiment 5 of the present invention.

FIG. 17 is an overview showing an example of a configuration of a power control system according to Embodiment 5 of the present invention. The power control system has an electric device 101 and an electric car 201. The electric device 101 is disposed in an average residential house 100. The electric device 101 has a charger.

The charger may be a single device. In Embodiment 5, however, the charger (charging unit) is integrated with the electric device, and the electric device equipped with the charger has, outside the house, a connecting unit for charging the electric car 201.

Note that the present embodiment describes a case in which the charger is installed in the house to perform charging, but the charger may be installed in a bicycle parking lot or a car parking lot of a store, an office, a factory and other facilities to charge the electric car. In a commercial facility or a public facility, the electric device with the charger may be not only a household electric device but also an electric device installed outside, such as a user recognition device, an automatic fare-adjustment machine, and an automatic vending machine.

The electric car 201 is mounted with a rechargeable battery 211, and an on-board charging circuit 212 for charging the rechargeable battery 211. A user inserts a charge plug 213 of the electric car 201 into a connecting unit (outlet) 111, and controls current/voltage of thus obtained household AC power by means of the charging circuit 212, to charge the rechargeable battery 211.

In the present embodiment, an electric device that is partially installed in a yard of the residential house 100 or outside a garage is supposedly used as the electric device that is equipped with the charger for performing charging through the charge plug 213. The part of the electric device that is installed outside is, for example, an outdoor unit 102 or a storage tank 103 of an electric water heater, a compressor unit of an air conditioner, or lighting equipment installed in the garage or the like. Each of these devices is equipped with the charge connecting unit (outlet) 111. The electric car 201 can be charged easily by inserting the charge plug 213 into this connecting unit 111. Note that a part of the on-board charging circuit 212 may be provided in the electric device 101.

An advantage of providing the charger in the electric device 101 installed outside the house is that, by previously installing the electric device 101 having this charger, a newly purchased electric car or electric bicycle can be connected to the charger of the electric device 101 and charged in a car parking lot or a bicycle parking lot without any major electric construction (a construction for adding more distribution boards, a wiring construction between a distribution board and the outside the house, an installation construction for installing a charge outlet outside, etc.).

Note that the electric device 101 with the charger may be not only lighting equipment, air-conditioning equipment, an electric water heater or hot water storage equipment, but also other electric device having at least a part of an electric device main body function installed outside.

The electric car 201 has a navigation unit 214 (not shown) and a communication unit 215. The navigation unit 214 acquires positional information pertaining to a current position of the electric car 201 away from the house and a position of a destination, distance information pertaining to the distance between the current position and the destination, and time frame information pertaining to a drive time frame taken between the current position and the destination and an estimated arrival time to the destination. The navigation unit 214 acquires charge information pertaining to charging of the rechargeable battery 211.

When the destination is taken as the house where the charger is present, the navigation unit 214 measures the current position of the electric car 201, and computes the information pertaining to the estimated arrival time (an estimated return time), based on the distance between the current position and the house where the charger is present, and based on a moving speed and a current time.

Furthermore, the navigation unit 214 measures the current position of the electric car 201, and computes information pertaining to a necessary charge amount of the rechargeable battery that needs to be charged when the electric car 201 returns to the house, on the basis of the distance between the current position and the house where the charger is present, an electricity energy amount per travel distance, and a current charge amount of the rechargeable battery 211.

The communication unit 215 transmits, to a communication unit 112 equipped in the electric device 101, the information acquired by the navigation unit 214 (the positional information on the current position and the destination, the distance information on the distance between the current position and the destination (the point where the charger is present), the time frame information pertaining to a drive time frame taken between the current position and the destination (the point where the charger is present) and an estimated arrival time to the destination, and the information pertaining to the necessary charge amount of the rechargeable battery). In other words, the communication unit 215 transmits the charge information acquired by the navigation unit 214, prior to the arrival of the electric car 201 at a location where power is supplied to the electric car 201. As a result, the electric device 101 can understand the statuses of the electric car 201 and the rechargeable battery 211 away from the house. A cell-phone communication network or a data communication network is used in the communication.

In the present embodiment, calculation of the estimated arrival time and calculation of the necessary charge amount of the rechargeable battery 211 are performed by the electric vehicle (the electric car 201), and the results of the calculations are transmitted to the charger (the electric device 101). However, necessary information on the current position and the like may be transmitted from the electric vehicle to the charger, and then the charger may perform the calculations.

The power control system further has a server device for mediating the communication of the information between the charger and the electric vehicle. The information on the current position and the like may be transmitted from the electric vehicle to the server device, to allow the server device to perform the calculations. The results of the calculations may be transmitted to the charger.

The first communication unit 21 of the electric car 2 transmits current positional information on the electric car 2 and the positional information of the destination (the house) to the server device. The server device computes, on behalf of the on-board navigation device 25, the distance information pertaining to the distance between the current position and the destination (the point where the charger is present), and the time frame information pertaining to a drive time taken between the current position and the destination (the point where the charger is present) and the estimated arrival time to the destination. The computed information is transmitted to the communication unit 112 of the electric device 101.

Furthermore, the first communication unit 21 of the electric car 2 transmits the information on the current remaining level of the on-board battery 23 to the server device, and the server device, on behalf of the charge information detector 22, computes the remaining level of the on-board battery 23 obtained at the time of arrival of the electric car at the destination. The computed remaining level is transmitted to the communication unit 112 of the electric device 101.

Accordingly, the arrival time to the installation location and the remaining level of the on-board battery 23 obtained at the time of arrival, do not have to be computed in the electric car 2 or the power control device 16, reducing the number of processes performed in the electric car 2 and the power control device 16.

In addition, when the server device computes the arrival time of the electric car 2 and the remaining level of the on-board battery 23, traffic information on a road used by the electric car 2 and weather information can be acquired from another server device and referred to, so that the arrival time can be computed with a high degree of accuracy in the light of a delay in the arrival time caused due to a traffic jam, and so that the remaining level of the on-board battery 23 can be computed with a high degree of accuracy in the light of the amount of electricity consumed by the on-board battery as a result of using a windshield wiper in the rain or as a result of using air-conditioning equipment.

With regard to the estimated arrival time, a passenger may calculate the estimated arrival time and input the calculated estimated arrival time into the navigation unit 214.

Note that the point where the charger is present may not only be the house. The navigation unit 214 may search for the charger present in the vicinity of the current position of the electric car 201. Moreover, friends' houses or facilities where the battery can be charged may be previously registered in the navigation unit 214. In the present embodiment, the point where the charger is present is described as the house. The estimated arrival time is described as the estimated return time.

Figure 18:
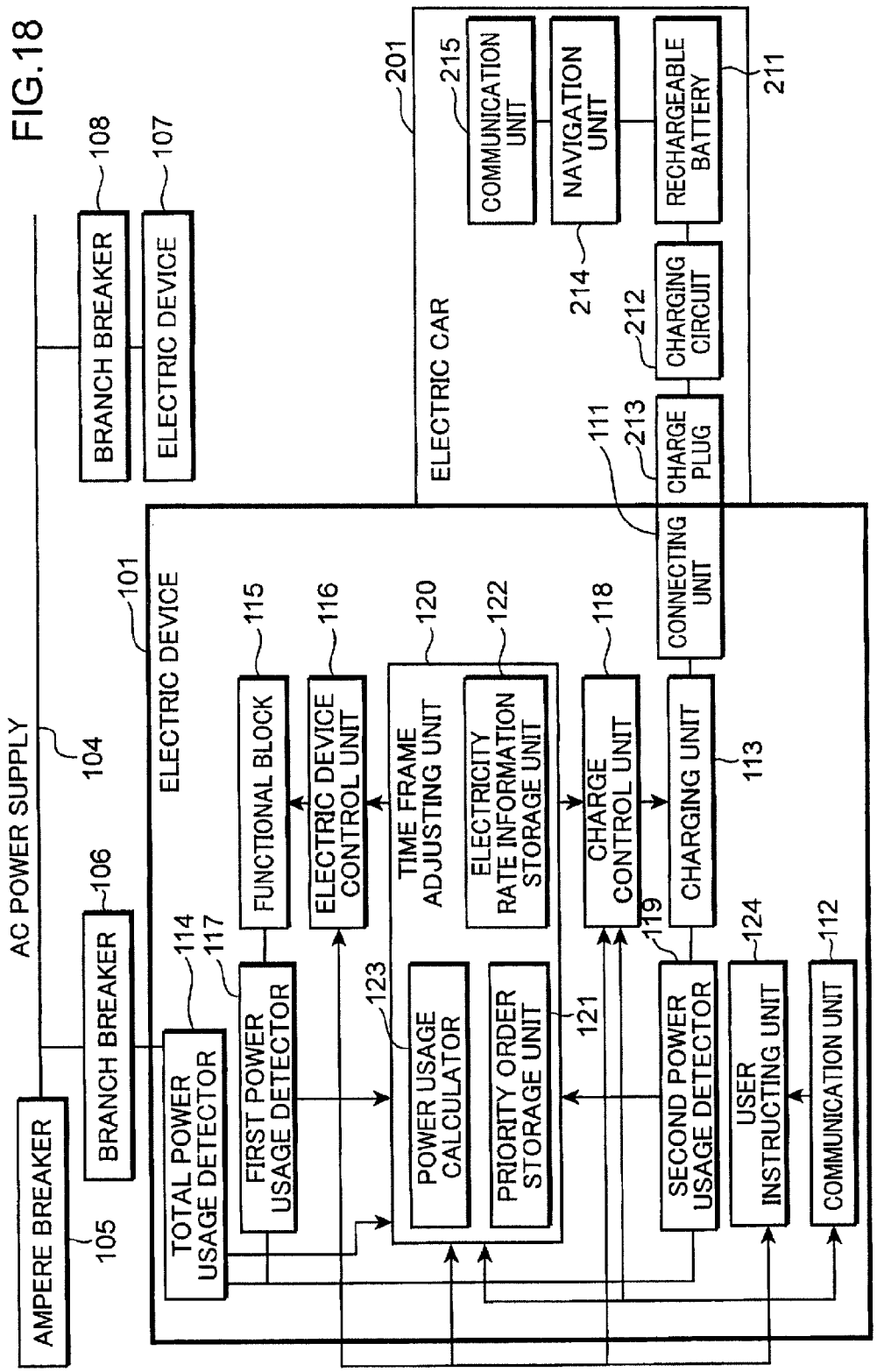
FIG. 18 is a block diagram showing an example of the configuration of the power control system according to Embodiment 5 of the present invention.

Next, the electric device of Embodiment 5 of the present invention and peripheral equipment thereof are described. FIG. 18 is a block diagram showing an example of the configuration of the power control system according to Embodiment 5 of the present invention. The same functions as those shown in FIG. 17 are denoted with the same reference numerals to describe FIG. 18.

The power control system shown in FIG. 18 has electric devices 101, 107, an ampere breaker 105, branch breakers 106, 108, and the electric car 201.

The ampere breaker 105 is disposed on the upstream side of an AC power supply 104 (100 V or 200 V in a household AC power supply), and, as in Patent Literature 2 described in Background Art, blocks supply of power when the amount of power used in the entire household exceeds a contract power capacity.

When supplying power from the AC power supply 104 to the electric device 101, the branch breaker 106 (supplying, for example, 20-A allowable current) is installed between the AC power supply 104 and the ampere breaker 105 in order not to supply overcurrent when the electric device 101 shorts out or operates abnormally. The electric device 107 and the branch breaker 108 are same as the electric device 101 and the branch breaker 106.

The electric device 101 has the connecting unit 111, the communication unit 112, a charging unit 113, a total power usage detector 114, a functional block 115 for the electric device, an electric device control unit 116, a first power usage detector 117, a charge control unit 118, a second power usage detector 119, a time frame adjusting unit 120, and a user instructing unit 124.

The electric device 101 of Embodiment 5 has the charging unit 113 outside the house, and uses the charging unit 113 to charge, outside the house, an electric vehicle mounted with the rechargeable battery 211, such as the electric car 201 and an electric bicycle.

The connecting unit 111 is, for example, a plug, and may be connected to a rechargeable battery of a device other than the electric vehicle, to charge the device. Note that the connecting unit 111 does not have to be a plug.

A configuration of the electric device 101 is described hereinafter in detail.

The total power usage detector 114 is, for example, a power meter for detecting a total power usage in the entire electric device 101, including the power supplied to the charging unit 113. Note that the total power usage detector 114 may be provided as a casing independent from the electric device 101, and configured as a plug-shaped adapter for communicating information on the detected total power usage to the electric device 101.

The original functions specific to the electric device 101 are realized by the functional block 115 of the electric device 101, and the electric device control unit 116 controlling the functional block 115. For example, the functional block 115 is an actuator such as a compressor or an inverter circuit, and serves as a hot-water supply function when the electric device 101 is an electric water heater, a hot water storage function when the electric device 101 is hot water storage equipment, an air-conditioning function when the electric device 101 is an air conditioner, and a lighting function when the electric device 101 is lighting equipment. The electric device control unit 116 is, for example, a microcomputer or a peripheral unit thereof, and controls the functional block 115 of the electric device 101.

The first power usage detector 117 is inserted into a power-supply line between the functional block 115 and the electric device control unit 116, to detect power used by the original functions of the electric device 101.

FIG. 19 is a diagram showing an example of power usage of the electric device 101 according to Embodiment 5 of the present invention. For example, an electric water heater uses a power of 1160 W to heat water during summer and 2000 W when heating water at high temperatures in winter. Also, an air conditioner uses, for example, a power of 85 to 1150 W for cooling, and 80 to 1980 W for heating. Moreover, for example, a lamp uses a power of 36 W. As shown in FIG. 19, the electric water heater or the air conditioner uses a power of 1000 to 2000 W at a maximum.

The electric device 101 has, as charging functions, the charging unit 113 for charging the rechargeable battery 211 of the electric car 201 connected to the connecting unit 111, and the charge control unit 118 for controlling the charging unit 113. The charging unit 113 has a voltage/current conversion function for producing voltage and current suitable for charging the rechargeable battery 211, depending on the condition of the rechargeable battery 211, and a charging status detection function for detecting a charging status of the rechargeable battery 211.

The second power usage detector 119 is inserted into a power-supply line between the charging unit 113 and the charge control unit 118, to detect power used by the charging unit 113.

For instance, it takes approximately eight hours to charge the rechargeable battery 211 of the electric car 201 by using a household 200 V-15 A power supply at 16 kWh. In other words, when the functional block 115, the electric device control unit 116, the charging unit 113 and the charge control unit 118 of the electric device 101 are operated simultaneously, the maximum power of 4000 to 5000 W is used. In this case, the branch breaker 106 blocks supply of power to the electric device 101.

The electric device 101 has the time frame adjusting unit 120 for preventing the branch breaker 106 from blocking the power supply. The time frame adjusting unit 120 understands the power used by the original functions of the electric device 101 and the power used by the charging functions, to operate these functions simultaneously, allocate the power used by these functions, or operate either the former or latter functions first, in accordance with an electricity rate computed based on the understood power. In this manner, the time frame adjusting unit 120 controls the power to be used and the time frames in which the power is used.

Specifically, based on the charge information received by the communication unit 112, the time frame adjusting unit 120 determines the power supply start time of supplying power to the electric device 101 and the charging start time of charging the rechargeable battery 211, such that the supply of power to the electric device 101 and the charging of the rechargeable battery 211 are ended by a predetermined time.

The charge information includes the estimated arrival time at which the electric car 201 arrives at an installation location where the electric device 101 is installed, the estimated arrival time being obtained based on the distance between the current position of the electric car 201 and the installation location where the electric device 101 is installed. The time frame adjusting unit 120 determines the power supply start time of supplying power to the electric device 101 and the charging start time of charging the rechargeable battery 211, such that the charging start time of charging the rechargeable battery 211 follows the estimated arrival time and that a total of power required to charge the rechargeable battery 211 and power used for operating the electric device 101 does not exceed a predetermined value.

Note that, in the following description, the operation of the electric device 101 means the operation of the functional block 115 of the electric device 101. For instance, when the electric device 101 is an electric water heater that has a boiling function for boiling water and a charging function for charging the rechargeable battery 211, the operation of the electric device 101 means that the boiling function, which is one of the original functions of the electric water heater, is executed.

Moreover, the charge information further includes information on the remaining level of the rechargeable battery 211 obtained at the time of arrival of the electric car 201 at the installation location where the electric device 101 is installed, the remaining level being obtained based on the distance between the current position of the electric car 201 and the installation location. The time frame adjusting unit 120 computes a time frame required to charge the rechargeable battery 211, in accordance with the remaining level of the rechargeable battery 211, and then determines the power supply start time of supplying power to the electric device 101 and the charging start time of charging the rechargeable battery 211, on the basis of the computed time frame required to charge the rechargeable battery 211 and the estimated arrival time.

The time frame adjusting unit 120 has a priority order storage unit 121, an electricity rate information storage unit 122, and a power usage calculator 123. The priority order storage unit 121 stores a priority order of the functions of the electric device 101 and the charging functions, which are operated preferentially. The electricity rate information storage unit 122 stores time-slot differentiated electricity rate information of the AC power supply 104. The power usage calculator 123 controls an operation of the electric device 101 and power supplied from the charging unit 113 to the rechargeable battery 211, such that a sum of the power used by the electric device 101 and the power used by the charging unit 113 is kept equal to or lower than a predetermined value (a supply capacity of the AC power supply 104).

Although not shown, the time frame adjusting unit 120 has a clock for adjusting an operating time frame for operating the electric device 101 and a charging time frame for charging the charging unit 113.

The priority order storage unit 121 stores the priority order according to the power used by the electric device 101, the charging status of the rechargeable battery 211, and the time-slot differentiated electricity rate information. The priority order storage unit 121 also sets a priority order convenient for the user. The priority order storage unit 121 may learn in accordance with the use conditions of the electric device 101 and the rechargeable battery 211.

The electricity rate information storage unit 122 can previously store the time-slot differentiated electricity rate information or download (not shown) through a communication network the time-slot differentiated electricity rate information that changes depending on power demands. Another thing considered is that the electricity rates can be lowered when generating power from a solar power generation system or a fuel cell.

Based on the time-slot differentiated electricity rate information stored in the electricity rate information storage unit 122, the time frame adjusting unit 120 computes an electricity rate incurred when starting the operation of the electric device 101 prior to the charging start time and an electricity rate incurred when starting the operation of the electric device 101 after the charging ending time, and selects the lowest electricity rate out of the computed electricity rates.

FIG. 20 is a diagram showing an example of the time-slot differentiated electricity rate information according to Embodiment 5 of the present invention. FIG. 20 shows the time-slot differentiated electricity rate information of the time-slot differentiated electricity rate system used in an all-electric house that uses a 200-V power supply. The electricity rate here varies according to time slots. The electricity rate information storage unit 122 stores an electricity rate per 1 kWh for each time slot.

As shown in FIG. 20, the electricity rate is 9 yen/kWh between 11 p.m. and 7 a.m., and 23 yen/kWh between 7 a.m. and 10 a.m. The electricity rate between 10 a.m. and 5 p.m. is 33 yen/kWh during summer (from July to September) and 28 yen/kWh in the seasons other than summer. The electricity rate is 23 yen/kWh between 5 p.m. and 11 p.m.

The power usage calculator 123 acquires a power usage value of the functional block 115 of the electric device 101, which is detected by the first power usage detector 117, and a power supply value indicating power supplied from the charging unit 113 to the rechargeable battery 211, which is detected by the second power usage detector 119, and then calculates a sum of the power used by the electric device 101 and the power used by the charging unit 113. Alternatively, the power usage calculator 123 may use a power value measured by the total power usage detector 114, as the sum of the power used by the electric device 101 and the power used by the charging unit 113. Moreover, the power usage calculator 123 may learn the power usage value of the functional block 115 of the electric device 101 and the power usage value of the charging unit 113, and store the power used in each operating mode of the electric device 101 or each charging mode of the charging unit 113.

In this manner, the power usage calculating unit 123 obtains the entire power used by the electric device 101, including the power used in charging, to control the following three power supply operations such that the power used in the electric device 101 becomes equal to or lower than a predetermined value (allowable power).

(1) The power usage calculator 123 acquires the power used by the functional block 115 of the electric device 101 and the power used by the charging unit 113. When a margin of the total power usage is greater than the predetermined value, the power usage calculator 123 operates the functional block 115 and the charging unit 113 of the electric device 101 at the same time.

(2) The power usage calculator 123 acquires the power used by the functional block 115 of the electric device 101 and the power used by the charging unit 113. When the margin of the total power usage is less than the predetermined value, the power usage calculator 123 allocates the power used in the functional block 115 of the electric device 101 and the power used in the charging unit 113, and operates the functional block 115 and the charging unit 113 of the electric device 101 at the same time.

For example, when the electric device 101 is an electric water heater, the power usage of the electric water heater can be reduced temporarily by switching the operating mode thereof from a boiling mode to a heating mode. When the electric device 101 is an air conditioner, the power usage of the air conditioner can be reduced temporarily by changing the operating mode thereof, changing a set temperature thereof, or reducing the air volume. In addition, the charging unit 113 can reduce the amount of power (current or voltage) supplied to the rechargeable battery 211.

(3) The power usage calculator 123 acquires the power used by the functional block 115 of the electric device 101 and the power used by the charging unit 113. When the margin of the total power usage is less than the predetermined value, the power usage calculator 123 operates the functional block 115 and the charging unit 113 of the electric device 101 at different times, instead of operating the functional block 115 and the charging unit 113 at the same time.

The present embodiment mainly describes (3) mentioned above.

Note that a value substantially the same as the allowable current of the branch breaker 106, a value equal to or lower than the allowable current of the branch breaker 106, or a value slightly higher than the allowable current of the branch breaker 106, is initially set as the predetermined value, which is an upper limit of the total power usage.

The user instructing unit 124, a remote controller, for example, remotely displays an operating status of the electric device 101 and remotely controls the operation of the electric device 101. The user instructing unit 124 displays the statuses of the settings or operating statuses of the electric device control unit 116, the charge control unit 118 and the time frame adjusting unit 120, and accepts a setting operation and control operation on the operation of the electric device 101 by the user, and a setting operation and control operation on charging of the rechargeable battery 211 by the user. As a result, the user can set and control the operation of the electric device 101 and charging of the rechargeable battery 211.

Infrared communication, wireless communication (radio waves), wire communication, or electric lamp line communication, can be used as a communication medium between the electric device 101 and the user instructing unit 124. Furthermore, the user instructing unit 124 can be fixedly installed on a wall of a kitchen, as with a remote controller of an electric water heater, or carried by the user and used in a location selected by the user, as with a remote controller of an air conditioner.

The communication unit 112 receives the charge information pertaining to charging of the rechargeable battery 211 of the electric car 201 from the communication unit 215 of the electric car 201, prior to the arrival of the electric car 201 at the location where power is supplied to the electric car 201. The communication unit 112 outputs the received charge information to the user instructing unit 124, the charge control unit 118 and the time frame adjusting unit 120. The user instructing unit 124 displays the charge information received by the communication unit 112. At least the following three timings can be considered in the communication of the charge information between the communication unit 215 and the communication unit 112. Needless to say, the communication can be performed at all times or on a regular basis (ever several minutes, for example), as long as the communication environment allows.

(1) When the passenger of the electric car 201 manipulates the navigation unit 214 and sets the destination to the house (the location where the charger is present), the communication unit 215 transmits the charge information to the communication unit 112.

(2) When the electric car 201 moves toward the house, which is the destination, the communication unit 215 transmits the charge information to the communication unit 112.

(3) When a time at which the electricity rate changes is reached, or, in other words, when it is 7 a.m., 10 a.m., 5 p.m., or 11 p.m., the communication unit 215 transmits the charge information to the communication unit 112.

As described above, in the communication timings described in (1) and (2) above, the time frame adjusting unit 120 acquires the charge information (the positional information pertaining to the current position of the electric car 201, the distance information pertaining to the distance between the current position and the house, and the time frame information pertaining to a drive time frame taken between the current position and the destination and the estimated arrival time to the house), and uses the acquired estimated return time to create a time frame adjusting plan for the operation of the functional block 115 and the electric device 101 and the charging of the rechargeable battery 211, before the electric car 201 returns to the house.

Moreover, in the communication timing described in (3) above, the time frame adjusting unit 120 reviews a created plan showing a scheduled operation of the functional block 115 of the electric device 101 and scheduled charging of the rechargeable battery 211 when the electricity rate changes, by acquiring the latest condition (the latest charge information) of the electric car 201. For example, even when the destination is not set in the navigation unit 214, in the communication time described in (3) the time frame adjusting unit 120 can acquire the earliest estimated return time that is obtained assuming that the electric car 201 returns to the house directly from the current position thereof.

The charging status of the rechargeable battery 211 obtained by the charging unit 113, and control of voltage/current performed in accordance with the charging status, are now described with reference to FIG. 21.

Figure 21:
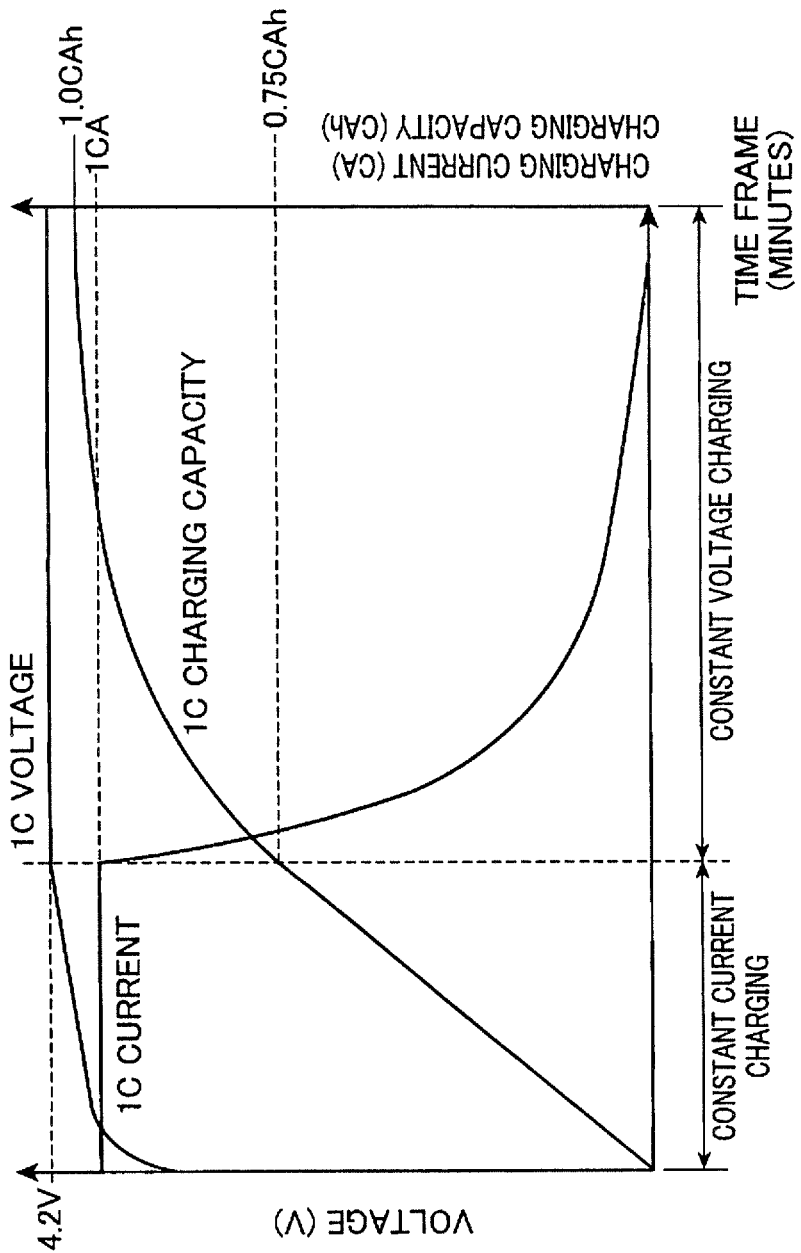
FIG. 21 is a diagram showing a charging sequence obtained when a rechargeable battery is a lithium battery.

FIG. 21 is a diagram showing a charging sequence obtained when the rechargeable battery is a lithium battery. In FIG. 21, the horizontal axis represents the charging time frame, the scales on the left vertical axis represent voltage, and the scales on the right vertical axis represent charging current and charging capacity. A reference numeral "1C" represents a unit of a current value at which constant current discharge is ended one hour after the constant current discharge of cells having the capacity indicated by a nominal capacity value.

As shown in FIG. 21, when charging is started when the charging status is close to 0 (the left side of the graph), at first the charging unit 113 starts charging at a constant current (1C current) (constant current charging mode). At this moment, the voltage increases as the charging continues, and the charging capacity is charged substantially in proportion to the time.

Then, when the charging capacity becomes equal to or greater than 75% (0.75 CAh) as shown in FIG. 21, the charging unit 113 performs charging at a constant voltage (1C voltage) of 4.2 V (constant voltage charging mode). At this moment, the current decreases as the charging continues, and the charging capacity gradually becomes fully charged (1.0 CAh).

In other words, a large amount of power is required in the constant current charging mode, but the amount of power required in the constant voltage charging decreases gradually.

The constant voltage charging mode requires time because the current is reduced while keeping the voltage constant, as shown in FIG. 21. Thus, the charging unit 113 may perform charging in a pulse charging mode in place of the constant voltage charging mode. In the pulse charging mode, the charging unit 113 increases the current to above 4.2 V for only a short period of time during the charging, and then stops the charging when the voltage becomes equal to or greater than 4.2 V. When the voltage is less than 4.2 V, the charging is performed again with a pulse of 4.2 V.

As described above, the charging unit 113 detects the charging status of the rechargeable battery 211 and controls the voltage and current used in the charging, in accordance with the charging status.

The present embodiment has described the example in which the charging unit 113 controls the voltage and current used in the charging. However, the on-board charging circuit 212 of the electric car 201 may control the voltage and current. The on-board charging circuit 212 is connected to the charging unit 113 and the charge control unit 118 by the connecting unit 111, and the functions thereof are shared by the electric device 101 and the electric car 201. FIG. 18 is now used as an example to describe this configuration.

It should be noted in Embodiment 5 that the electric car 201 corresponds to an example of the electric vehicle, the rechargeable battery 211 to an example of the rechargeable battery, the electric device 101 to an example of the electric device and the power control device, the navigation unit 214 to an example of the charge information acquiring unit, the communication unit 215 to an example of the transmitter, the communication unit 112 to an example of the receiver, the time frame adjusting unit 120 to an example of the power control unit, and the electricity rate information storage unit 122 to an example of the electricity rate information storage unit.

Figure 22:
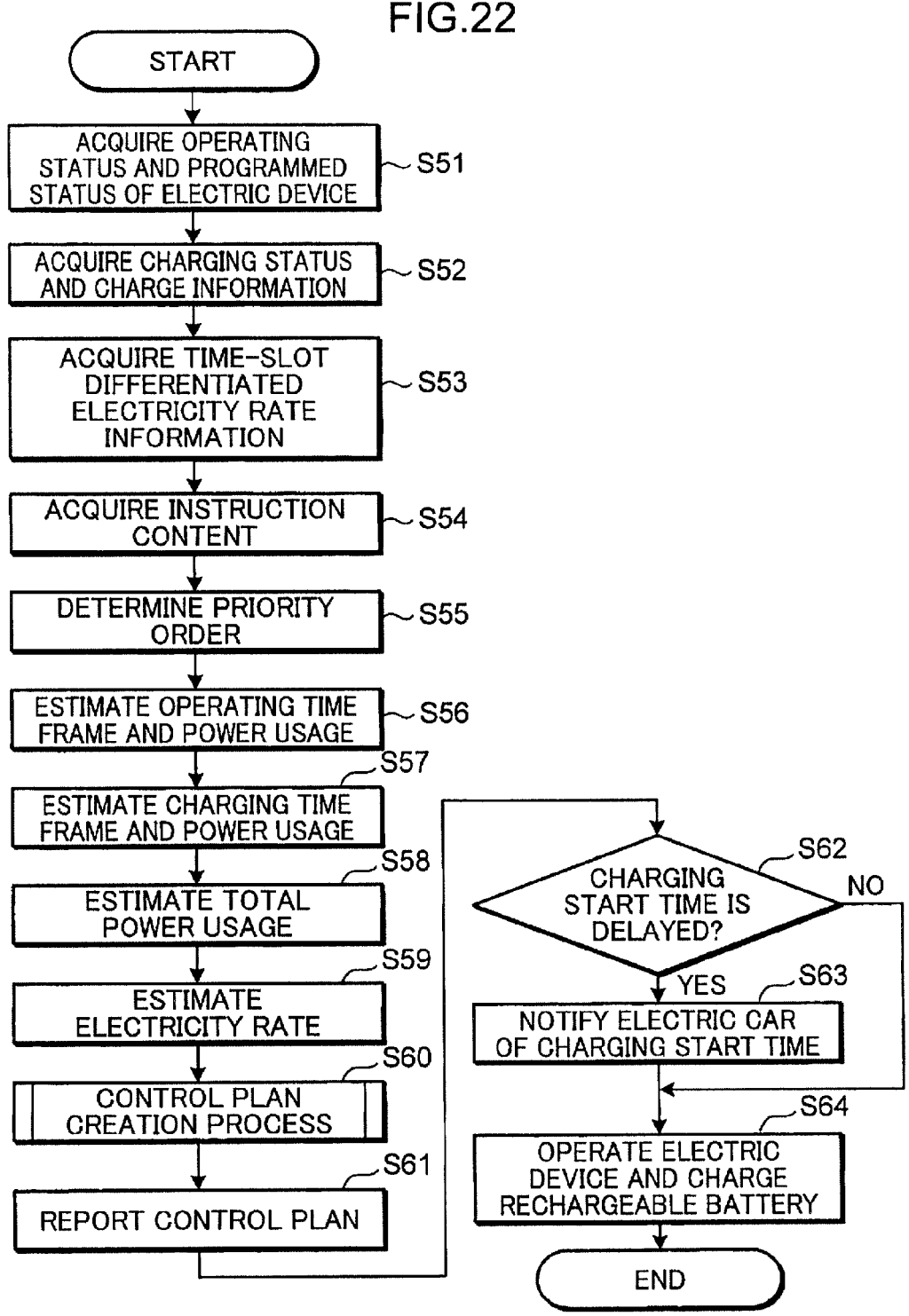
FIG. 22 is a flowchart for illustrating operations of the electric device according to Embodiment 5 of the present invention.

In the configuration described above, the operations of the electric device 101 according to Embodiment 5 are described using the flowchart of FIG. 22. FIG. 22 is a flowchart for illustrating the operations of the electric device according to Embodiment 5 of the present invention.

In the first step S51, the time frame adjusting unit 120 acquires, from the electric device control unit 116, a current operating status of the functional block 115 of the electric device 101 (operating mode and power used) and a programmed status of a timer operation (scheduled operation start time, scheduled operation ending time, and power used between the scheduled operation start time and the scheduled operation ending time). Note that, if there is a programmed condition of a timer operation, the time frame adjusting unit 120 acquires it from the electric device control unit 116. The operating status and the programmed condition may be acquired from the user instructing unit 124 (remote controller).

The value detected by the first power usage detector 117 or a current value that is previously stored for each operating mode of the functional block 115 of the electric device 101, may be used for computing the power used by the functional block 115 of the electric device 101.

In the subsequent step S52, the time frame adjusting unit 120 acquires the charge information that includes at least the charging status of the rechargeable battery 211, the estimated return time of the electric car 201 and the necessary charge amount of the rechargeable battery 211. The time frame adjusting unit 120 acquires, from the charge control unit 118, the charging status of the rechargeable battery 211 that indicates whether the rechargeable battery 211 is charged in the constant current charging mode, the constant voltage charging mode, or the pulse charging mode. The communication unit 112 receives the charge information transmitted by the communication unit 215 of the electric car 201 and outputs the received charge information to the time frame adjusting unit 120.

Note that, in the present embodiment, although the estimated return time of the electric car 201 is acquired from the electric car 201, the present invention is not limited to such a configuration. The estimated return time (estimated arrival time) of the electric car 201 may be computed by the charge control unit 118 by acquiring the positional information of the electric car 201 received by the communication unit 112, the distance information on the distance to the house, and the time frame information on the time frame required for the electric car 201 to return to the house.

In the subsequent step S53, the time frame adjusting unit 120 acquires the time-slot differentiated electricity rate information from the electricity rate information storage unit 122. In the next step S54, the time frame adjusting unit 120 acquires a user instruction content from the user instructing unit 124. Note that there might be no user instructions.

In the subsequent step S55, the time frame adjusting unit 120 acquires a priority order for the operation of the functional block 115 of the electric device 101 and the charging of the rechargeable battery 211 of the electric car 201, from the priority order storage unit 121. The time frame adjusting unit 120 then determines a priority order on the basis of the power used by the functional block 115 of the electric device 101 that is acquired in step S51, the charging status of the rechargeable battery 211 acquired in step S52, and the time-slot differentiated electricity rate information acquired in step S53. In other words, the time frame adjusting unit 120 determines which operation to prioritize, the operation of the functional block 115 of the electric device 101 or the charging of the charging unit 113.

FIG. 23 is a diagram showing an example of the priority orders according to Embodiment 5 of the present invention. The time frame adjusting unit 120 determines any one of priority orders (a) to (d), on the basis of the charging status of the rechargeable battery 211 and the time-slot differentiated electricity rate information.

According to the priority order (a) and the priority order (b), the charging status is in the constant current charging mode (in which the charging capacity is equal to or lower than 75% as shown in FIG. 21), and a large amount of power is used in the charging.

Here, when the time frame adjusting unit 120 refers to the time-slot differentiated electricity rate information and the time slot is the lowest electricity rate time slot, the time frame adjusting unit 120 determines the priority order (a) to prioritize the charging of the rechargeable battery 211. As a result, when the rechargeable battery 211 can be charged in the lowest electricity rate time slot, the rechargeable battery 211 is charged, and the electric device 101 is operated concurrently if possible.

When the charging status is in the constant current charging mode and the time slot is outside the lowest electricity rate time slot, the time frame adjusting unit 120 determines the priority order (b) to prioritize the operation of the electric device 101. As a result, the use of the electric device 101 is given priority during a main living time slot, and the charging capacity is left unused during the living-hour time slot so that the rechargeable battery 211 can be charged at night.

In the priority order (c) and the priority order (d), the charging status is in the constant voltage charging mode or the pulse charging mode (in which the charging capacity is equal to or greater then 75% as shown in FIG. 21), and a small amount of power is used. When the charging status is in the constant voltage charging mode or the pulse charging mode and the time slot is the lowest electricity rate time slot, the time frame adjusting unit 120 determines the priority order (c) to prioritize the operation of the electric device 101. Furthermore, when the charging status is in the constant voltage charging mode or the pulse charging mode and the time slot is outside the lowest electricity rate time slot, the time frame adjusting unit 120 determines the priority order (d) to prioritize the operation of the electric device 101.

When the charging status is in the constant voltage charging mode or the pulse charging mode, operating the electric device 101 is given priority, regardless of the time-slot differentiated electricity rate information, and the charging unit 113 performs charging using a small required amount of power, if possible.

The control steps shown in FIG. 22 are described hereinafter on the basis of the priority orders described above.

In step S56, the time frame adjusting unit 120 estimates an operating time frame for operating the functional block 115 of the electric device 101 and power used for operating the functional block 115. The time frame adjusting unit 120 computes the operating time for operating the functional block 115 of the electric device 101 and computes the power used for operating the functional block 115, on the basis of the scheduled operation start time and the scheduled operation ending time acquired from the electric device control unit 116.

In the subsequent step S57, the time frame adjusting unit 120 estimates a charging time frame for charging the rechargeable battery 211 of the electric car 201 and power used for charging the rechargeable battery 211. The time frame adjusting unit 120 computes the charging time frame for charging the rechargeable battery 211 of the electric car 201 and the power used for charging the rechargeable battery 211, on the basis of the estimated return time of the electric car 201 and the necessary charging amount of the rechargeable battery 211 obtained when the electric car 201 returns to the house, which are acquired from the electric car 201. More specifically, the time frame adjusting unit 120 computes the charging time frame required for charging the necessary charge amount, based on the charging start time, which is the estimated return time of the electric car 201 acquired from the electric car 201. The time frame adjusting unit 120 also computes the power required for charging the necessary charge amount.

In the subsequent step S58, the time frame adjusting unit 120 estimates a total power usage that is obtained by adding up the power used for operating the functional block 115 of the electric device 101 and the power used for charging the rechargeable battery 211.

In the next step S59, the time frame adjusting unit 120 overlaps the operating time frame for operating the functional block 115 of the electric device 101 and the charging time frame for charging the rechargeable battery 211, and estimates an electricity rate that is incurred when operating the functional block 115 and charging the rechargeable battery 211.

In the subsequent step S60, the time frame adjusting unit 120 creates a control plan for the operation of the functional block 115 of the electric device 101 and the charging performed on the rechargeable battery 211. The time frame adjusting unit 120 compares the total power usage with the allowable power, which is the predetermined value. When there exists a time frame in which the total power usage is greater than the allowable power, the time frame adjusting unit 120 reviews the control plan. For instance, the time frame adjusting unit 120 performs adjustment by shifting the operating time frame and the charging time frame. The time frame adjusting unit 120 also adjusts the operating time frame and the charging time frame by shifting, forward and backward, the operating time frame between the scheduled operation start time of the functional block 115 of the electric device 101 and the scheduled operation ending time of the same, and the charging time frame between the charging start time of the rechargeable battery 211 and the charging ending time of the same, such that the operating time frame and the charging time frame fall within the lowest electricity rate time slot as much as possible. This time frame adjustment is described in detail with reference to the drawings.

In the present embodiment, the time frame adjusting unit 120 obtains the estimated return time in step S52. Therefore, the time frame adjusting unit 120 can stop operations of the other electric device at the estimated return time to secure available power to charge the rechargeable battery 211, and start operating the other electric device once the charging of the rechargeable battery 211 is ended.

Moreover, the present embodiment can realize the estimated return time of the electric car 201 alone. However, by accumulating a current rechargeable amount of the rechargeable battery 211 of the electric car 201, the time frame adjusting unit 120 can compute a predicted rechargeable amount or the amount of power required for charging (necessary charge amount), when the electric car returns to the house, on the basis of the current rechargeable amount, the positional information and the distance information.

The charge control unit 118 can refer to the graph of FIG. 21 shown in the charging capacity and the charging time frame to acquire the time frame required for charging the rechargeable battery and to predict the charging ending time when the charging is started immediately after the electric car returns to the house at the estimated return time.

In other words, once the predicted rechargeable amount of the rechargeable battery 211 is obtained, a rechargeable status of the time of the return of the electric car can be understood beforehand. For this reason, the time frame adjusting unit 120 can use the predicted rechargeable amount to determine which one to prioritize when the charging of the rechargeable battery 211 overlaps with the operation of the functional block 115 of the electric device 101. For example, when the predicted rechargeable amount is equal to or lower than the predetermined value (e.g., equal to or lower than 75% of the fully charged state), the time frame adjusting unit 120 gives priority to the charging of the rechargeable battery 211 over the operation of the functional block 115 of the electric device 101. When the predicted rechargeable amount is equal to or greater than the predetermined value, the time frame adjusting unit 120 can give priority to the operation of the functional block 115 of the electric device 101 over the charging of the rechargeable battery 211.

In addition, a time at which the charging is ended (the charging ending time) can be predicted once the time for starting the charging is determined. Thus, when the charging of the rechargeable battery 211 is prioritized over the operation of the functional block 115 of the electric device 101, the time frame adjusting unit 120 can plan when to start and end operating the functional block 115 of the electric device 101.

When the control plan is created in step S60, in step S61 the time frame adjusting unit 120 uses the user instructing unit (remote controller) 26 or the like to inform the user of the control plan that includes an operation plan for operating the functional block 115 of the electric device 101 (the operating time, the operating content, and the amount of power used), and a charge plan for charging the rechargeable battery 211 (the charging start time, the charging ending time, the charge amount, and the amount of power used). The time frame adjusting unit 120 not only displays the control plan on the user instructing unit 124 but also transmits the control plan to the electric car 201 via the communication unit 112 and causes the navigation unit 214 of the electric car 201 to display the control plan, thereby informing the passenger of the control plan.

Next, in step S62, the time frame adjusting unit 120 determines whether the charging start time gets behind the estimated return time by a predetermined time frame or more (e.g., 10 minutes or more) in the created control plan. When it is determined that the charging start time gets behind the estimated return time by the predetermined time frame or more (YES in step S62), in step S63 the time frame adjusting unit 120 transmits the charging start time to the electric car 201 via the communication unit 112, and notifies the passenger of the electric car 201 of the charging start time by displaying the charging start time on the navigation unit 214 of the electric car 201. As a result, the passenger can understand that the charging cannot be performed even after the electric car 201 returns to the house as scheduled, and can adjust the return time when there is enough time.

After notifying the passenger of the electric car 201 of the charging start time, or when it is determined that the charging start time gets behind the estimated return time by the predetermined time frame or more (NO in step S62), in step S64 the electric device control unit 116 and the charge control unit 118 operates the functional block 115 and charges the rechargeable battery 211 on the basis of the created control plan. Note that, although not shown, various information may be reacquired on a regular basis back in step S51, and the control plan may be reviewed using the latest information, during the execution of the control plan or while waiting for the control plan to be executed. Moreover, when the user instructing unit 124 interrupts the execution of the control plan, the control plan may be changed in response to the interruption.

The control plan for operating the functional block 115 of the electric device 101 and charging the rechargeable battery 211 is created by the flowcharts described above, and executed. This control plan is described using FIGS. 24A to 24D.

Figure 24A:
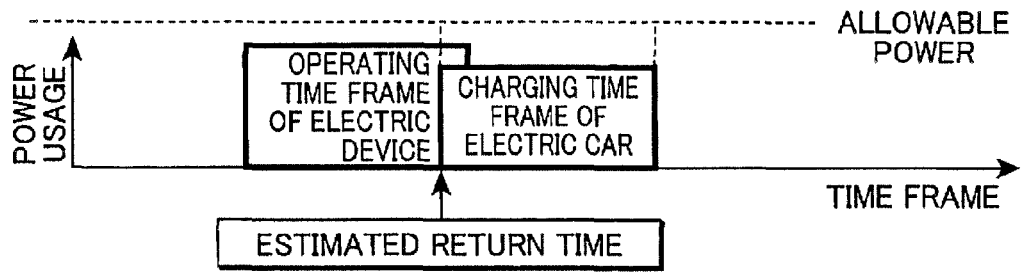
FIG. 24A is a diagram showing an example of a control plan obtained when a charging start time overlaps with an operating time frame.
Figure 24B:
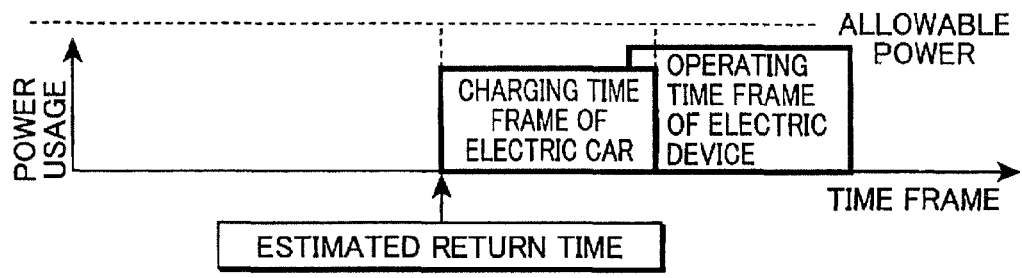
FIG. 24B is a diagram showing an example of a control plan obtained when a charging ending time overlaps with the operating time frame.
Figure 24C:
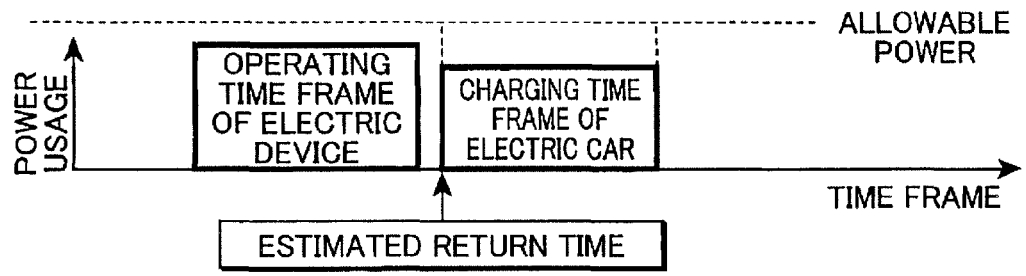
FIG. 24C is a diagram showing an example of a control plan obtained when the operating time frame is shifted forward to the front of the charging time frame.
Figure 24D:
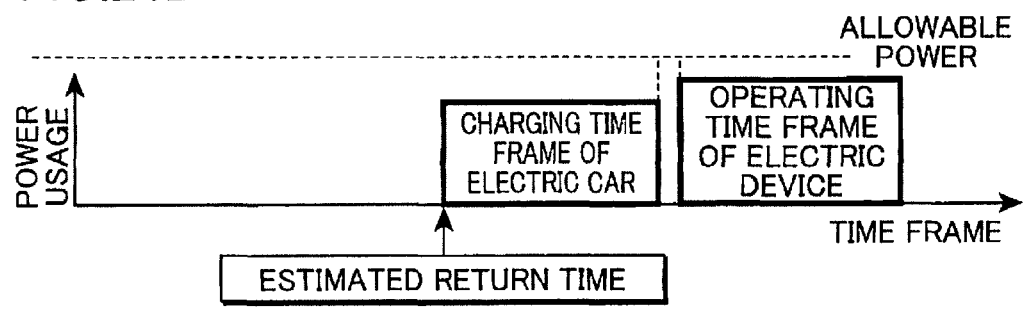
FIG. 24D is a diagram showing an example of a control plan obtained when the operating time frame is shifted behind the charging time frame.

FIG. 24A is a diagram showing an example of the control plan obtained when the charging start time overlaps with the operating time frame. FIG. 24B is a diagram showing an example of a control plan obtained when the charging ending time overlaps with the operating time frame. FIG. 24C is a diagram showing an example of a control plan obtained when the operating time frame is shifted forward in front of the charging time frame. FIG. 24D is a diagram showing an example of a control plan obtained when the operating time frame is shifted behind the charging time frame.

As shown in FIG. 24A, when the estimated return time of the electric car 201 is acquired as the charging start time of the electric car 201, in some cases the charging start time overlaps with the operating time slot in which the electric device 101 is scheduled to be operated. When a total of the power required to charge the rechargeable battery and the power used for operating the electric device 101 does not exceed the predetermined value (allowable power), charging of the rechargeable battery 211 and the operation of the electric device 101 can be performed at the same time. However, when the power required to charge the rechargeable battery 211 is so large that the total power usage exceeds the allowable power, the time frame adjustment needs to be performed.

As shown in FIG. 24B, the time frame required for charging the rechargeable battery, which is, in other words, the charging start time and the charging ending time, can be obtained by acquiring the information pertaining to the necessary charge amount of the rechargeable battery 211 along with the estimated return time of the electric car 201. In some cases the charging ending time overlaps with the operating time slot in which the electric device 101 is scheduled to be operated. As with FIG. 24A, when the total of the power required to charge the rechargeable battery and the power used for operating the electric device 101 does not exceed the predetermined value (allowable power), charging of the rechargeable battery 211 and the operation of the electric device 101 can be performed at the same time. However, when the power required to charge the rechargeable battery 211 is so large that the total power usage exceeds the allowable power, the time frame adjustment needs to be performed.

When the priority for charging the electric car 201 is higher than the priority for operating the electric device 101, the time frame adjusting unit 120 shifts the operating time frame of the electric device 101 forward in front of the charging time frame of the rechargeable battery 211 so that the operating time frame of the electric device 101 does not overlap with the charging time frame, as shown in FIG. 24C.

Furthermore, the time frame adjusting unit 120 shifts the operating time frame of the electric device 101 behind the charging time frame of the rechargeable battery 211 so that the operating time frame of the electric device 101 does not overlap with the charging time frame, as shown in FIG. 24D.

On the other hand, although not illustrated in the diagrams, when the priority for operating the electric device 101 is higher than the priority for charging the electric car 201, the time frame adjusting unit 120 shifts the charging start time so that the electric car 201 is charged after the end of the operation of the electric device 101.

In some cases a programmed operation of the electric device 101 is performed during the lowest electricity rate time slot. This means that the control plans shown in FIGS. 24C and 24D need to take the time-slot differentiated electricity rate information into consideration. These control plans are described with reference to FIGS. 25A to 25C.

Figure 25A:
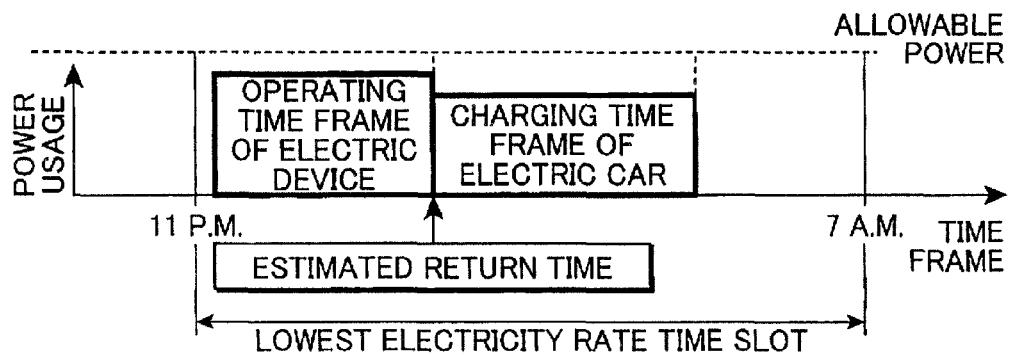
FIG. 25A is a diagram showing an example of a control plan obtained when the operating time frame is shifted forward to the front of the charging time frame.
Figure 25B:
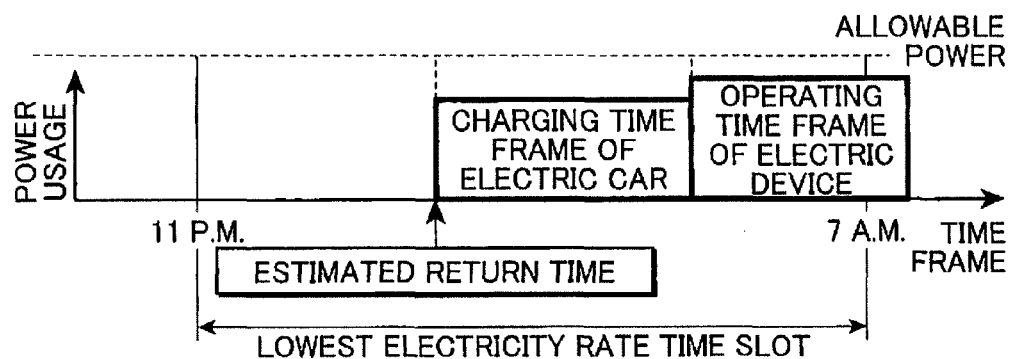
FIG. 25B is a diagram showing an example of a control plan obtained when the operating time frame is shifted behind the charging time frame.
Figure 25C:
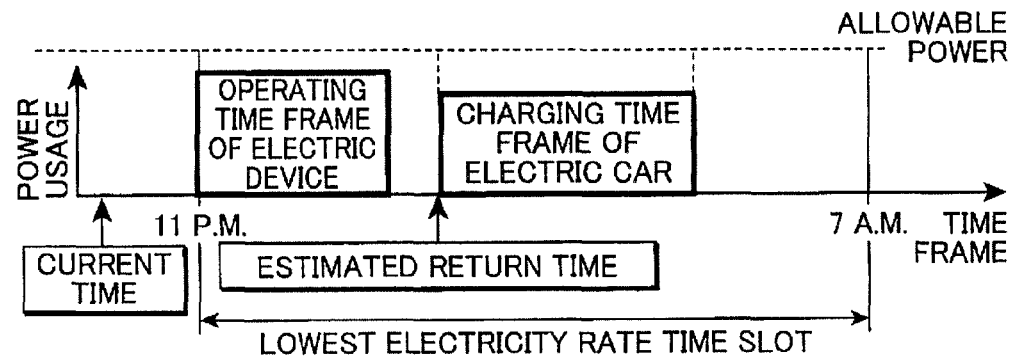
FIG. 25C is a diagram showing an example of a control plan obtained when operation of the electric device is started at a start time of the lowest electricity rate time slot and ended prior to the charging time frame.

FIG. 25A is a diagram showing an example of a control plan obtained when the operating time frame is shifted forward to the front of the charging time frame. FIG. 25B is a diagram showing an example of a control plan obtained when the operating time frame is shifted behind the charging time frame. FIG. 25C is a diagram showing an example of a control plan obtained when operation of the electric device is started at a start time of the lowest electricity rate time slot and ended prior to the charging time frame.

In FIG. 25A, the operating time frame of the electric device 101 is shifted forward to the front of the charging time frame. However, the operating time frame of the electric device 101 and the charging time frame of the rechargeable battery 211 fall within the lowest electricity rate time slot. In FIG. 25B, on the other hand, the operating time frame of the electric device 101 is shifted behind the charging time frame, but the operating time frame of the electric device 101 is past the lowest electricity rate time slot. On the contrary, when the operating time frame of the electric device 101 is shifted forward to the front of the charging time frame, the operating time frame does not fall within the lowest electricity rate time slot. When the operating time frame of the electric device 101 is shifted behind the charging time frame, the operating time frame might fall within the lowest electricity rate time slot.

This is determined by the operating time frame of the electric device 101, and the charging time frame and the estimated return time of the electric car 201. In the past, the control plans for operating the electric car and charging the battery were created after the return of the electric car, because the estimated return time was not obtained. Therefore, the options in the past were to operate the electric device 101 after the electric car returns to the house and the charging is performed, or to charge the battery after the end of the operation of the electric device 101. In other words, there was no option where the electric device 101 is operated prior to the return of the electric car.

Moreover, the time frame adjusting unit 120 according to the present embodiment can create both of the control plans shown in FIGS. 25A and 25B and select the lowest electricity rate from these two control plans. This provides the effect of creating a control plan after the estimated return time is obtained.

In addition, as shown in FIG. 25C, the time frame adjusting unit 120 acquires the estimated return time at a current time prior to the start time (11 p.m.) of the lowest electricity rate time slot. When the operation of the electric device 101 can be started and ended between 11 p.m. and the return of the electric car, the time frame adjusting unit 120 shifts the scheduled operation start time of the electric device 101 such that the operation of the electric device 101 is started from 11 p.m. In this manner, because the operation of the electric device 101 is already ended by the time the electric car returns to the house, the current required to charge the rechargeable battery 211 or the charging time frame of the rechargeable battery 211 do not affect the operation of the electric device 101.

Figure 26A:
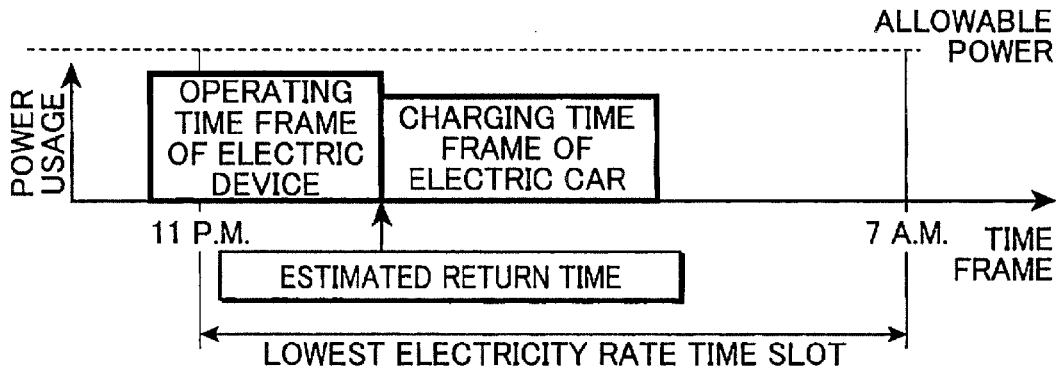
FIG. 26A is a diagram showing an example of a control plan obtained when the operating time frame of the electric device passes the lowest electricity rate time slot as a result of shifting the operating time frame forward to the front of the charging time frame.
Figure 26B:
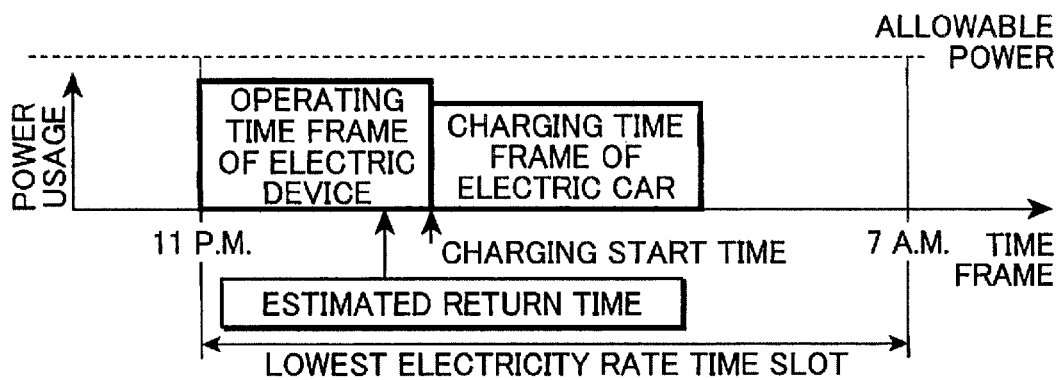
FIG. 26B is a diagram showing an example of a control plan obtained after the operating time frame and the charging time frame are shifted back from the state shown in FIG. 26A.
Figure 26C:
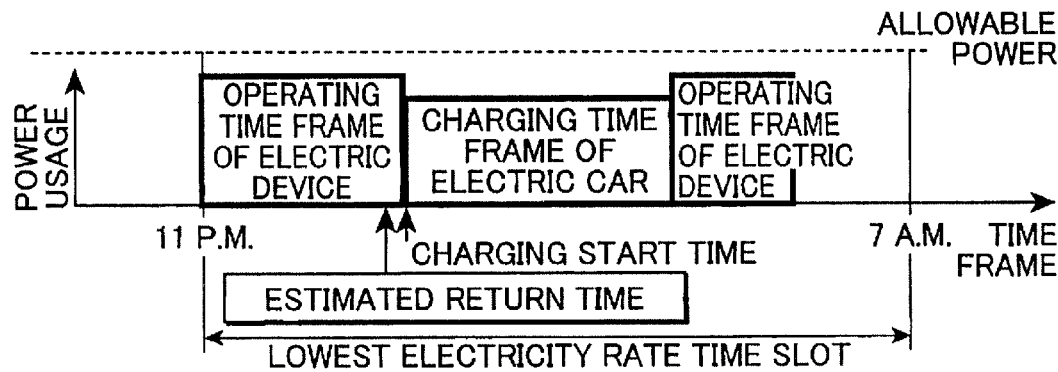
FIG. 26C is a diagram showing an example of a control plan obtained when the operating time frame of the electric device is segmented.

FIG. 26A is a diagram showing an example of a control plan obtained when the operating time frame of the electric device passes the lowest electricity rate time slot as a result of shifting the operating time frame forward to the front of the charging time frame. FIG. 26B is a diagram showing an example of a control plan obtained after the operating time frame and the charging time frame are shifted back from the state shown in FIG. 26A. FIG. 26C is a diagram showing an example of a control plan obtained when the operating time frame of the electric device is segmented.

As shown in FIG. 26A, when the operating time frame of the electric device 101 is shifted forward to the front of the charging time frame, the operation start time of the electric device 101 might protrude forward from the lowest electricity rate time slot. In such a case, as shown in FIG. 26B the time frame adjusting unit 120 shifts the operating time frame of the electric device 101 and the charging time frame of the rechargeable battery 211 backward in a manner as to wait for the start time of the lowest electricity rate time slot to start operating the electric device 101, and charge the rechargeable battery 211 after the end of the operation of the electric device 101. As a result, a low electricity rate can be obtained.

In other words, when the operation start time protrudes forward from the lowest electricity rate time slot as a result of shifting the operating time frame of the electric device 101 forward to the front of the charging time frame, the time frame adjusting unit 120 delays the operation start time by the length of the protruding time frame. Then, the time frame adjusting unit 120 determines whether or not the operating time frame between the operation start time and the operation ending time and the charging time frame between the charging start time and the charging ending time fall within the lowest electricity rate time slot, in a case where the operation of the electric device 101 is started at the start time of the lowest electricity rate time slot. When the operating time frame and the charging time frame fall within the lowest electricity rate time slot, the time frame adjusting unit 120 creates a control plan based on the operating time frame and the charging time frame.

Here, in some cases the operation end time of the electric device 101 is past the estimated return time. This delays the charging start time. Therefore, when the abovementioned time frame adjusting is performed, the time frame adjusting unit 120 notifies the passenger of the electric car 201 of the charging start time, by transmitting the charging start time to the communication unit 215 of the electric car 201 via the communication unit 112 and displaying the charging start time on the navigation unit 214 (step S63 of FIG. 22).

Although not illustrated, when the operating time frame between the operation start time and the operation ending time of the electric device 101 and the charging time frame between the charging start time and the charging ending time do not fall within the lowest electricity rate time slot even after the abovementioned time frame adjustment is performed, the time frame adjusting unit 120 may allow the passenger of the electric car 201 to confirm the operation start time, the operation ending time, the charging start time, and the charging ending time, by transmitting the operation start time of the electric device 101, the operation ending time of the electric device 101, the charging start time of the rechargeable battery 211 and the charging ending time of the rechargeable battery 211, to the communication unit 215 of the electric car 201 via the communication unit 112, and then displaying the operation start time, the operation ending time, the charging start time and the charging ending time, on the navigation unit 214.

Alternatively, the time frame adjusting unit 120 may create a plurality of control plans for the operation start time of the electric device 101, the operation ending time for the electric device 101, the charging start time of the rechargeable battery 211, and the charging ending time of the rechargeable battery 211, and allow the passenger of the electric car 201 to select any of the control plans, by transmitting the plurality of control plans to the communication unit 215 of the electric car 201 via the communication unit 112 and displaying the plurality of control plans on the navigation unit 214.

Moreover, as shown in FIG. 26C, the rechargeable battery 211 can be charged after temporarily stopping the operation of the electric device 101, and then the operation of the electric device 101 can be started again after the end of the charging. Not all types of the electric device 101 can be stopped temporarily. However, for example, when the electric device 101 is an electric water heater, the operation thereof can be stopped in the middle of its boiling operation. When the electric device 101 is a clothes washer/dryer, the operation thereof can be stopped after a drying process is performed to an extent after rinsing and spin processes.

As described above, the time frame adjusting unit 120 not only can create a control plan based on a unit of a time frame between the start and the end of the operation of the electric device 101, but also can create a control plan based on a unit of a time frame between the operation undergoing in the electric device 101 and operation at above the predetermined value.

For instance, when the electric device 101 is a clothes washer/dryer, a washing process, a rinsing process, a spin process, and a certain amount of drying process are performed in one unit of time frame, and the rest of the drying process is performed in one unit of time frame.

When the electric device 101 is, for example, a dish washer/dryer, a dish washing process and a rinsing process are performed as one unit of time frame, and a dish drying process is performed in one unit of time frame.

Regarding the charging of the rechargeable battery 211, a control plan thereof may be created in two steps of one unit time frame in which the rechargeable amount reaches the predetermined value (e.g., charging 75% when the constant current charging mode is completed) and one unit time frame in which the rechargeable amount is the remaining 25%, instead of creating a control plan with one unit time frame alone in which the rechargeable amount is 100%.

In this manner, when the operation of the electric device 101 can be started by the estimated return time and ended at the point above the predetermined value (e.g., in one unit or two units), the time frame adjusting unit 120 adjusts the operating time frame so that the operation of more than the predetermined value can be ended by the estimated arrival time. Accordingly, the operation of the electric device 101 can be segmented to make a control plan thereof, increasing the flexibility of the plan.

Note that, as shown in FIGS. 24C, 25A and 25C, when the operating time frame of the electric device 101 becomes longer than expected (e.g., when it takes longer to dry clothes in the clothes washer/dryer) as a result of shifting the operating time frame of the electric device 101 forward to the front of the charging time frame, the operation ending time of the electric device 101 becomes likely to pass the estimated return time, thereby delaying the charging start time. The time frame adjusting unit 120, therefore, inform the passenger of the electric car 201 of the charging start time by transmitting the charging start time to the communication unit 215 of the electric car 201 via the communication unit 112 and then displaying the charging start time on the navigation unit 214 (step S63 of FIG. 22).

Note that, as shown in FIGS. 25A to 25C and FIGS. 26A to 26C, a scheduled time of use of the electric car 201 or a scheduled time of use of the electric water heater may be provided independently from the lowest electricity rate time slot, and conditions of a completion time limit for completing the charging of the electric car 201 or the boiling of the electric water heater by the scheduled time of use may be added to the abovementioned control plan. The time frame adjusting unit 120 creates a control plan before the completion time limit. Furthermore, when there is a problem with the control plan, the user or the passenger is informed of the problem via the user instructing unit 124 or the navigation unit 214.

The control plan creation process of step S60 shown in FIG. 22 is further described next.

Figure 27:
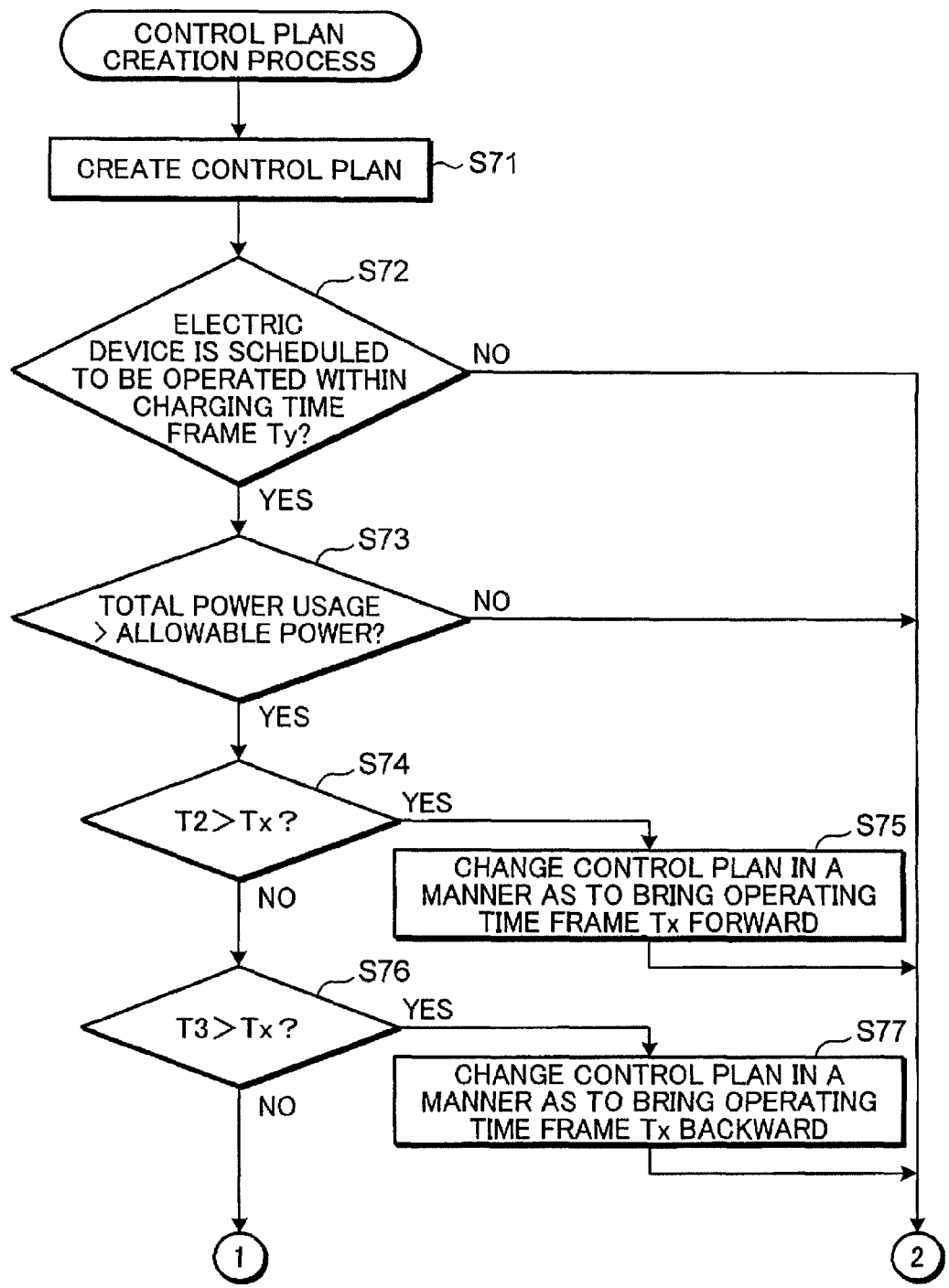
FIG. 27 is a first flowchart for illustrating a control plan creation process of step S60 shown in FIG. 22.
Figure 28:
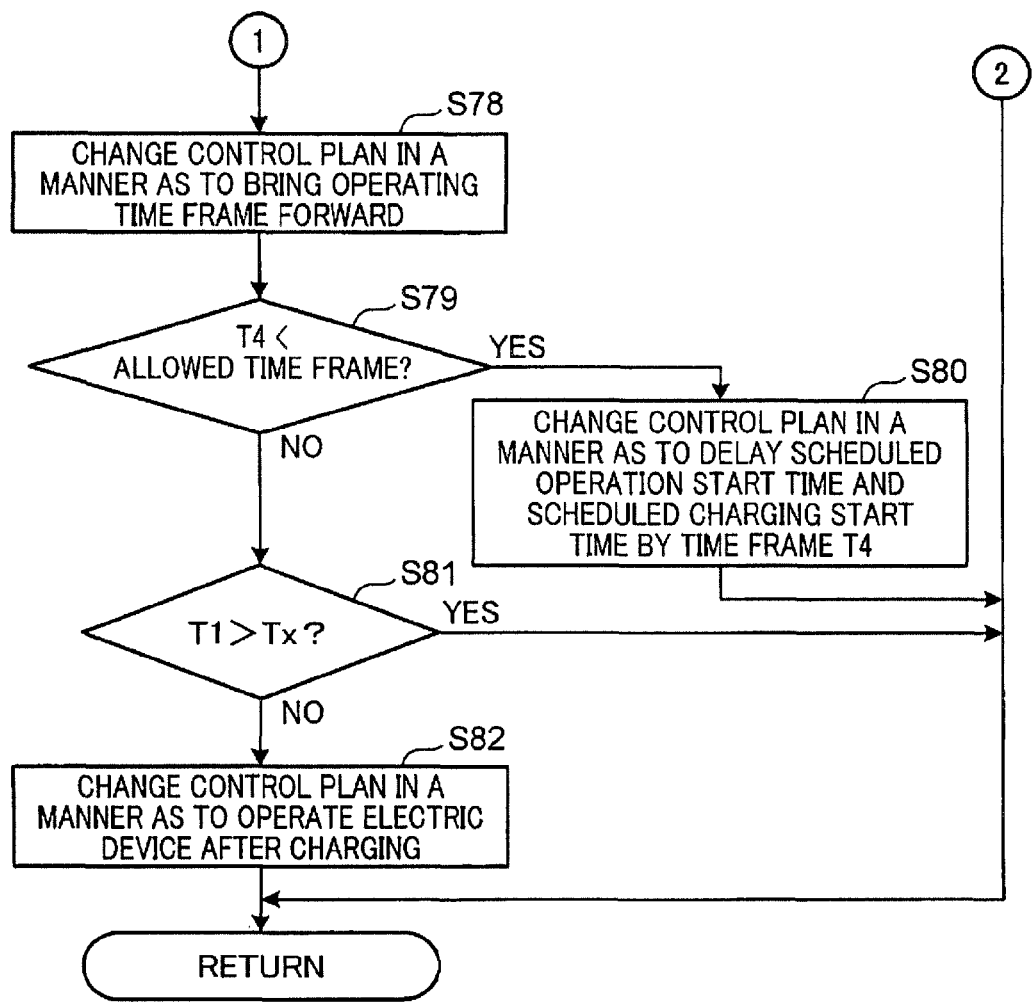
FIG. 28 is a second flowchart for illustrating the control plan creation process of step S60 shown in FIG. 22.

FIGS. 27 and 28 are flowcharts for illustrating the control plan creation process of step S60 shown in FIG. 22.

First, in step S71, the time frame adjusting unit 120 creates a control plan for operating the functional block 115 of the electric device 101 and for charging the rechargeable battery 211, on the basis of the acquired scheduled operation start time and scheduled operation ending time of the functional block 115 of the electric device 101 and the estimated return time and the necessary charge amount of the rechargeable battery 211 that needs to be charged at the time of return home, which are included in the acquired charge information. The time frame adjusting unit 120 takes the estimated return time as the charging start time, computes a charging time frame Ty required to charge the rechargeable battery 211, on the basis of the necessary charge amount of the rechargeable battery 211 that needs to be charged at the time of return home, and computes the charging ending time by adding the computed charging time frame to the charging start time.

In the subsequent step S72, the time frame adjusting unit 120 refers to the created control plan to determine whether or not the functional block 115 of the electric device 101 is scheduled to be operated within the charging time frame Ty.

Figure 29:
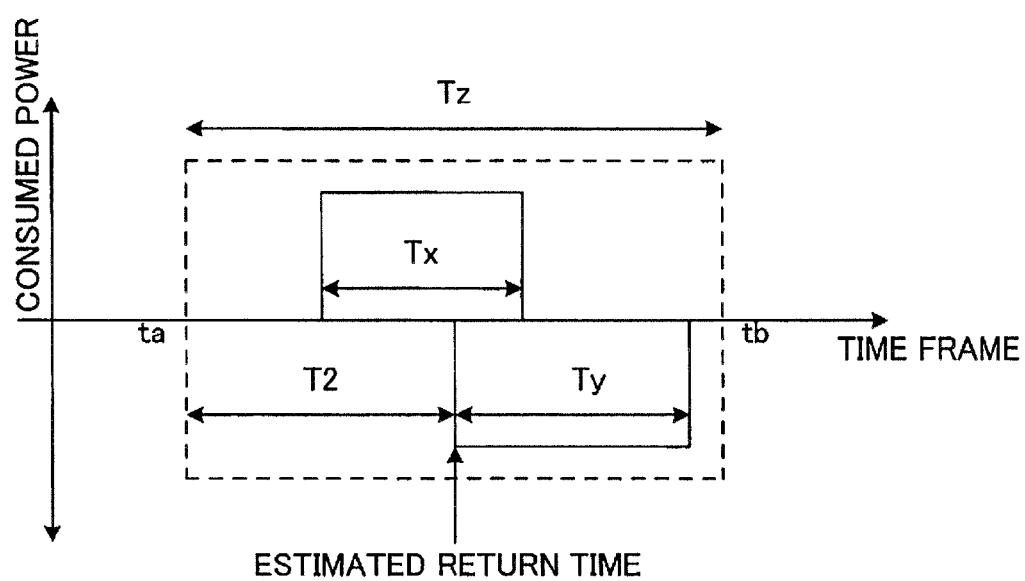
FIG. 29 is a diagram showing an example of an operating time frame and a charging time frame according to Embodiment 5 of the present invention.

FIG. 29 is a diagram showing an example of the operating time frame and the charging time frame according to Embodiment 5 of the present invention. As shown in FIG. 29, the charging is started at the estimated return time, and an operating time frame Tx and the charging time frame Ty of the functional block 115 of the electric device 101 overlap with each other. Moreover, the operating time frame Tx and the charging time frame Ty fall within a lowest electricity rate time slot Tz. The operation start time starts later than a start time to of the lowest electricity rate time slot Tz, and the charging ending time starts earlier than an ending time tb of the lowest electricity rate time slot Tz. For example, the time frame adjusting unit 120 determines whether or not the functional block 115 of the electric device 101 is scheduled to be operated within the charging time frame Ty, by determining whether the operation ending time starts later than the estimated return time or not.

When it is determined that the functional block 115 of the electric device 101 is scheduled to be operated within the charging time frame Ty (NO in step S72), no changes need to be made to the created control plan. Thus, the control plan creation process is ended, and the time frame adjusting unit 120 moves to step S61 shown in FIG. 22.

However, when it is determined that the functional block 115 of the electric device 101 is scheduled to be operated within the charging time frame Ty (YES in step S72), in step S73 the time frame adjusting unit 120 determines whether a total power usage of the power used for operating the functional block 115 of the electric device 101 and the power used for charging the rechargeable battery 211 is greater than the allowable power. Note that the total power usage is computed in step S58 shown in FIG. 22. When it is determined that the total power usage is equal to or lower than the allowable power (NO in step S73), no changes need to be made to the created control plan. Thus, the control plan creation process is ended, and the time frame adjusting unit 120 moves to step S61 shown in FIG. 22.

However, when it is determined that the total power usage is greater than the allowable power (YES in step S73), in step S74 the time frame adjusting unit 120 determines whether a time frame T2 between the start time ta of the lowest electricity rate time slot Tz and the estimated return time is longer than the operating time frame Tx. When it is determined that the time frame T2 between the start time ta of the lowest electricity rate time slot Tz and the estimated return time is longer than the operating time frame Tx (YES in step S74), in step S75 the time frame adjusting unit 120 changes the control plan in a manner as to bring the operating time frame Tx forward, such that the operating time frame Tx falls within the lowest electricity rate time slot Tz without overlapping with the charging time frame Ty. In other words, the time frame adjusting unit 120 brings the scheduled operation start time of the functional block 115 of the electric device 101 forward to the start time ta of the lowest electricity rate time slot Tz.

Figure 30:
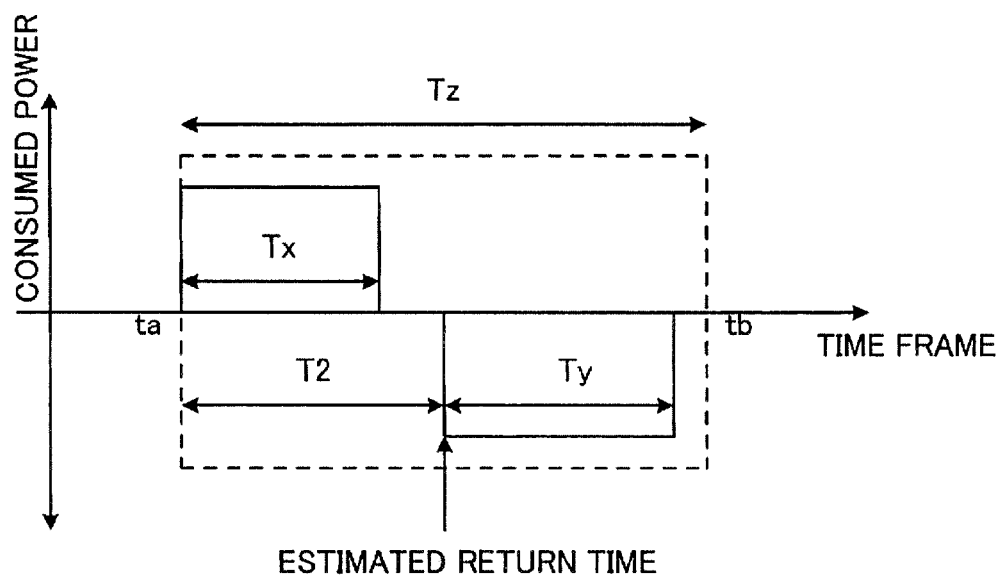
FIG. 30 is a diagram showing an example of the operating time frame and the charging time frame obtained when the operating time frame is brought forward.

FIG. 30 is a diagram showing an example of the operating time frame and the charging time frame obtained when the operating time frame is brought forward. As shown in FIG. 30, the operation of the functional block 115 of the electric device 101 is started at the start time ta of the lowest electricity rate time slot Tz, and the operating time frame Tx and the charging time frame Ty do not overlap with each other. Moreover, the operating time frame Tx and the charging time frame Ty fall within the lowest electricity rate time slot Tz.

Note that, in the present embodiment, the scheduled operation start time of the functional block 115 of the electric device 101 matches the start time ta of the lowest electricity rate time slot Tz, but the present invention is not limited to this configuration. The scheduled operation start time of the functional block 115 of the electric device 101 may start later than the start time ta of the lowest electricity rate time slot Tz, as long as the operating time frame Tx and the charging time frame Ty do not overlap with each other. For example, the time frame adjusting unit 120 may bring the operation start time forward, such that the scheduled operation ending time of the functional block 115 of the electric device 101 matches the estimated return time.

When it is determined that the time frame T2 between the start time ta of the lowest electricity rate time slot Tz and the estimated return time is equal to or shorter than the operating time frame Tx (NO in step S74), in step S76 the time frame adjusting unit 120 determines whether a time frame T3 between the charging ending time and the ending time tb of the lowest electricity rate time slot Tz is longer than the operating time frame Tx. When it is determined that the time frame T3 between the charging ending time and the ending time tb of the lowest electricity rate time slot Tz is longer than the operating time frame Tx (YES in step S76), in step S77 the time frame adjusting unit 120 changes the control plan in a manner as to bring the operating time frame Tx backward, such that the operating time frame Tx falls within the lowest electricity rate time slot Tz without overlapping with the charging time frame Ty. In other words, the time frame adjusting unit 120 brings the scheduled operation start time of the functional block 115 of the electric device 101 backward to the charging ending time. In this manner, the time frame adjusting unit 120 changes the control plan such that the functional block 115 of the electric device 101 is operated after the end of the charging.

Figure 31:
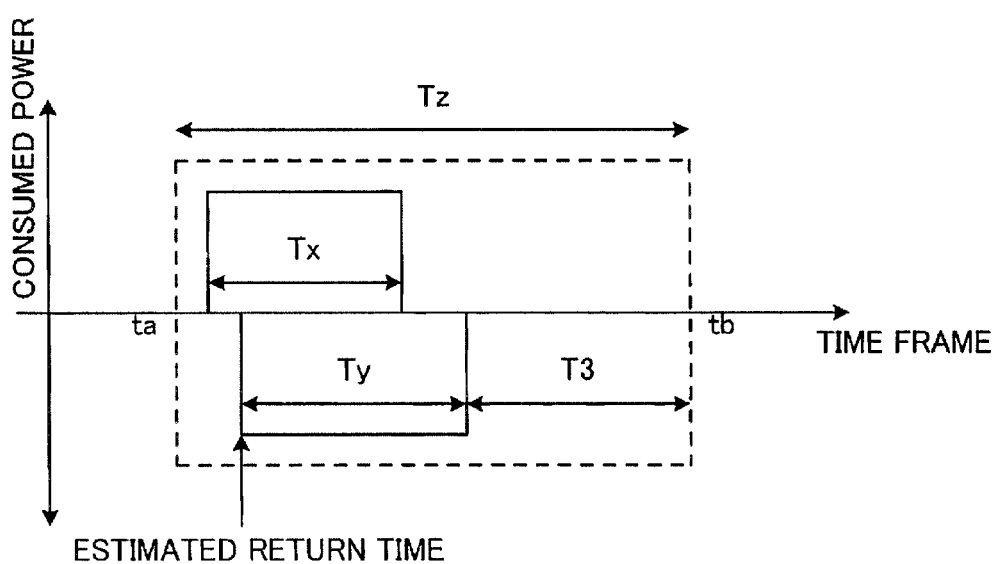
FIG. 31 is a diagram showing an example of the operating time frame and the charging time frame obtained before the operating time frame is brought backward.
Figure 32:
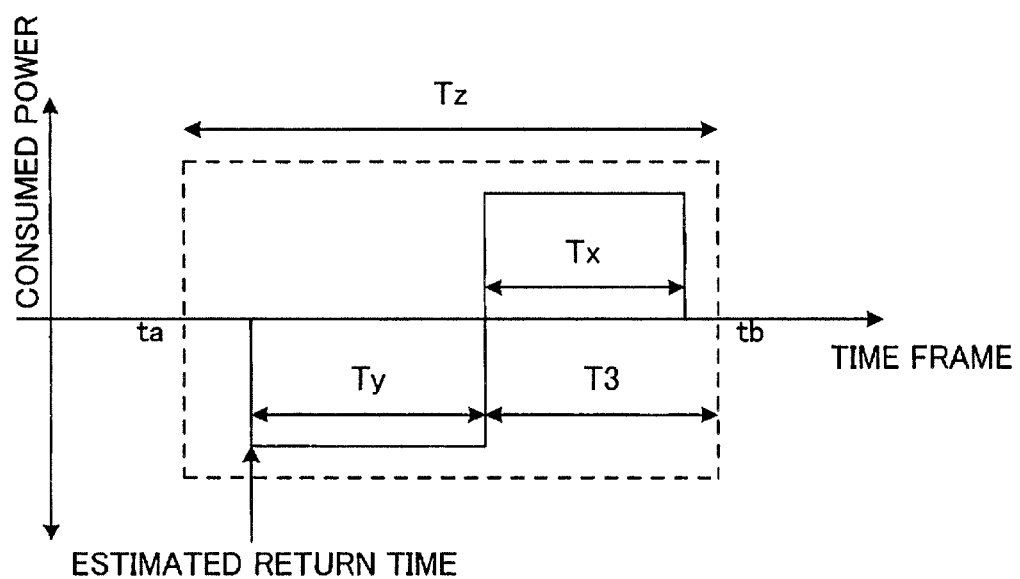
FIG. 32 is a diagram showing an example of the operating time frame and the charging time frame obtained after the operating time frame is brought backward.

FIG. 31 is a diagram showing an example of the operating time frame and the charging time frame obtained before the operating time frame is brought backward. FIG. 32 is a diagram showing an example of the operating time frame and the charging time frame obtained after the operating time frame is brought backward.

As shown in FIG. 31, the charging is started at the estimated return time, and the operating time frame Tx and the charging time frame Ty of the functional block 115 of the electric device 101 overlap with each other. The time frame T3 between the charging ending time and the ending time tb of the lowest electricity rate time slot Tz is longer than the operating time frame Tx.

Also, as shown in FIG. 32, the operation of the functional block 115 of the electric device 101 is started at the charging ending time, and the operating time frame Tx and the charging time frame Ty do not overlap with each other. The operating time frame Tx and the charging time frame Ty fall within the lowest electricity rate time slot Tz.

Note that, in the present embodiment, the scheduled operation start time of the functional block 115 of the electric device 101 matches the charging ending time, but the present invention is not limited to this configuration. The scheduled operation start time of the functional block 115 of the electric device 101 may start later than the charging ending time, as long as the operating time frame Tx falls within the lowest electricity rate time slot Tz without overlapping with the charging time frame Ty. For example, the time frame adjusting unit 120 may bring the operation start time backward, such that the scheduled operation ending time of the functional block 115 of the electric device 101 matches the ending time tb of the lowest electricity rate time slot Tz.

On the other hand, when it is determined that the time frame T3 between the charging ending time and the ending time tb of the lowest electricity rate time slot Tz is equal to or shorter than the operating time frame Tx (NO in step S76), in step S78 the time frame adjusting unit 120 changes the control plan in a manner as to bring the operating time frame Tx forward, so that the operating time frame Tx and the charging time frame Ty do not overlap with each other. In other words, the time frame adjusting unit 120 brings the operating time frame Tx forward such that the scheduled operation ending time of the functional block 115 of the electric device 101 matches the estimated return time.

Figure 33:
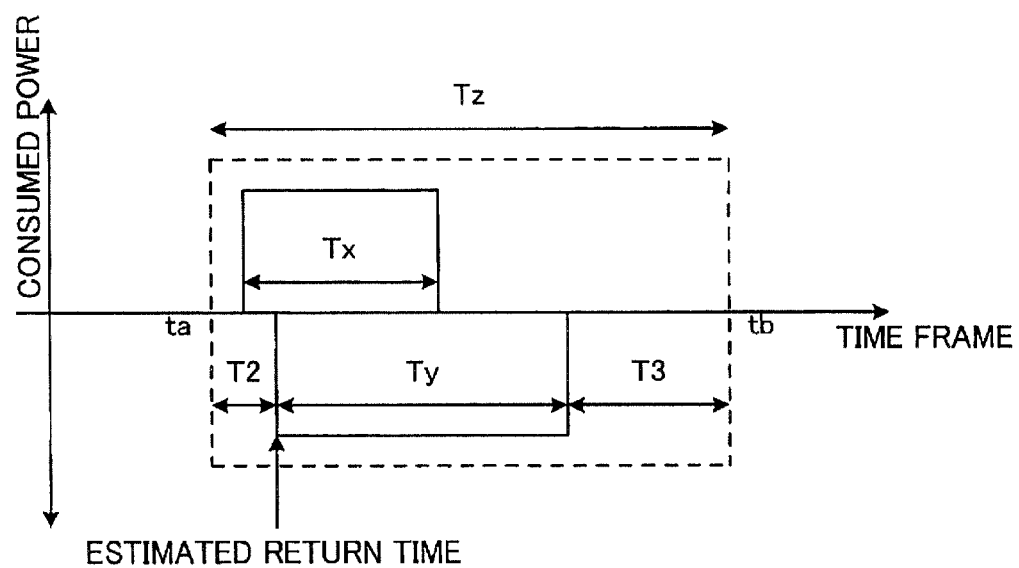
FIG. 33 is a diagram showing an example of the operating time frame and the charging time frame obtained before the operating time frame is brought forward.
Figure 34:
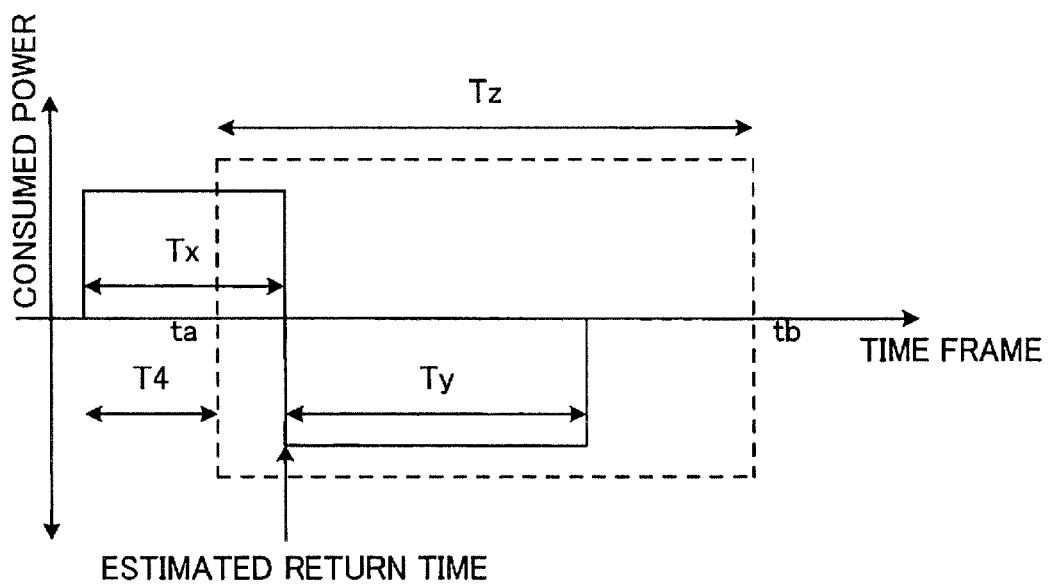
FIG. 34 is a diagram showing an example of the operating time frame and the charging time frame obtained after the operating time frame is brought forward.

FIG. 33 is a diagram showing an example of the operating time frame and the charging time frame obtained before the operating time frame is brought forward. FIG. 34 is a diagram showing an example of the operating time frame and the charging time frame obtained after the operating time frame is brought forward.

As shown in FIG. 33, the charging is started at the estimated return time, and the operating time frame Tx and the charging time frame Ty of the functional block 115 of the electric device 101 overlap with each other. Moreover, the time frame T2 between the start time to of the lowest electricity rate time slot Tz and the estimated return time is equal to or shorter then the operating time frame Tx, and the time frame T3 between the charging ending time and the ending time tb of the lowest electricity rate time slot Tz is equal to or shorter than the operating time frame Tx.

As shown in FIG. 34, the charging is started after the end of the operation of the functional block 115 of the electric device 101, and the operating time frame Tx and the charging time frame Ty do not overlap with each other. Furthermore, the charging time frame Ty falls within the lowest electricity rate time slot Tz, but the operating time frame Tx does not fall within the lowest electricity rate time slot Tz.

In the subsequent step S79, the time frame adjusting unit 120 determines whether or not a time frame T4 between the scheduled operation start time of the functional block 115 of the electric device 101 and the start time ta of the lowest electricity rate time slot Tz is shorter than a predetermined allowed time frame. Note that the allowed time frame is a time frame for waiting for the start of the charging after the electric car returns to the house, and is set previously by the user.

Here, when it is determined that the time frame T4 between the scheduled operation start time of the functional block 115 of the electric device 101 and the start time ta of the lowest electricity rate time slot Tz is shorter than the predetermined allowed time frame (YES in step S79), the time frame adjusting unit 120 changes the control plan in a manner as to delay the scheduled operation start time and the scheduled charging start time by the time frame T4.

Figure 35:
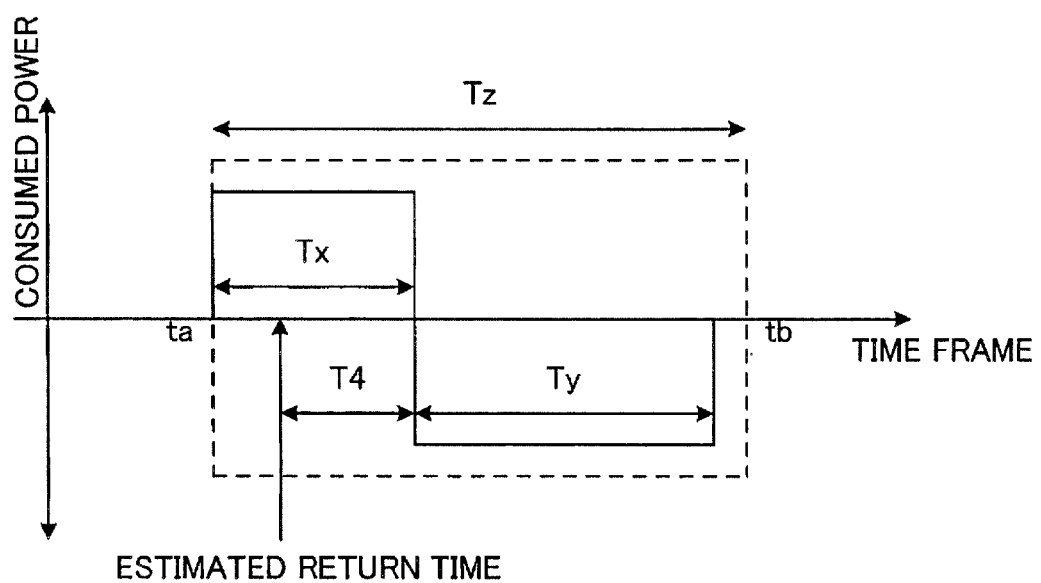
FIG. 35 is a diagram showing an example of the operating time frame and the charging time frame obtained after the operating time frame and the charging time frame are brought backward.

FIG. 35 is a diagram showing an example of the operating time frame and the charging time frame obtained after the operating time frame and the charging time frame are brought backward.

As shown in FIG. 35, the scheduled operation start time and the scheduled charging start time are brought backward by the time frame T4. Especially the scheduled charging start time is behind the estimated return time by the time frame T4. In other words, the operation of the functional block 115 of the electric device 101 is started at the start time ta of the lowest electricity rate time slot Tz, and the charging of the rechargeable battery 211 is started after the end of the operation of the functional block 115 of the electric device 101, the time frame T4 behind the estimated return time. The operating time frame Tx and the charging time frame Ty do not overlap with each other. The operating time frame Tx and the charging time frame Ty fall within the lowest electricity rate time slot Tz.

When it is determined that the time frame T4 between the scheduled operation start time of the functional block 115 of the electric device 101 and the start time ta of the lowest electricity rate time slot Tz is equal to or longer than the predetermined allowed time frame (NO in step S79), in step S81 the time frame adjusting unit 120 determines whether or not a time frame T1 between a current time and the estimated return time is longer than the operating time frame Tx.

When it is determined that the time frame T1 between the current time and the estimated return time is longer than the operating time frame Tx (YES in step S81), no changes need to be made to the control plan. Thus, the time frame adjusting unit 120 moves to step S61 shown in FIG. 22.

Figure 36:
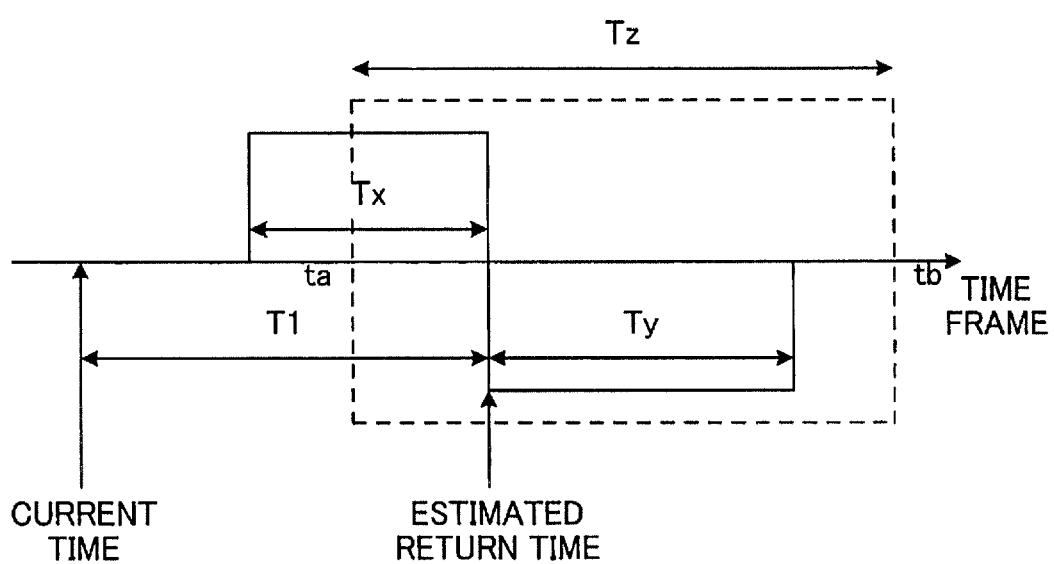
FIG. 36 is a diagram showing an example of the operating time frame and the charging time frame obtained when a time frame between a current time and an estimated return time is longer than the operating time frame after the operating time frame is brought forward.

FIG. 36 is a diagram showing an example of the operating time frame and the charging time frame obtained when the time frame T1 between the current time and the estimated return time is longer than the operating time frame Tx after the operating time frame is brought forward.

As shown in FIG. 36, the time frame T1 between the current time and the estimated return time is longer than the operating time frame Tx. The charging is started after the end of the operation of the functional block 115 of the electric device 101, and the operating time frame Tx and the charging time frame Ty do not overlap with each other. Moreover, the charging time frame Ty falls within the lowest electricity rate time slot Tz, but the operating time frame Tx does not fall within the lowest electricity rate time slot Tz.

In this case, the functional block 115 of the electric device 101 can utilize a part of the lowest electricity rate time slot Tz. In addition, because the operation of the functional block 115 of the electric device 101 is ended at the time of return home, the charging can be started immediately after the return home.

However, when it is determined that the time frame T1 between the current time and the estimated return time is equal to or shorter than the operating time frame Tx (NO in step S81), in step S82 the time frame adjusting unit 120 changes the control plan in a manner as to operate the functional block 115 of the electric device 101 after the charging. When the time frame T1 between the current time and the estimated return time is equal to or shorter than the operating time frame Tx, the functional block 115 of the electric device 101 cannot be operated prior to the start of the charging. Therefore, when the time frame T1 between the current time and the estimated return time is equal to or shorter than the operating time frame Tx, the functional block 115 of the electric device 101 is operated after the charging is performed.

Figure 37:
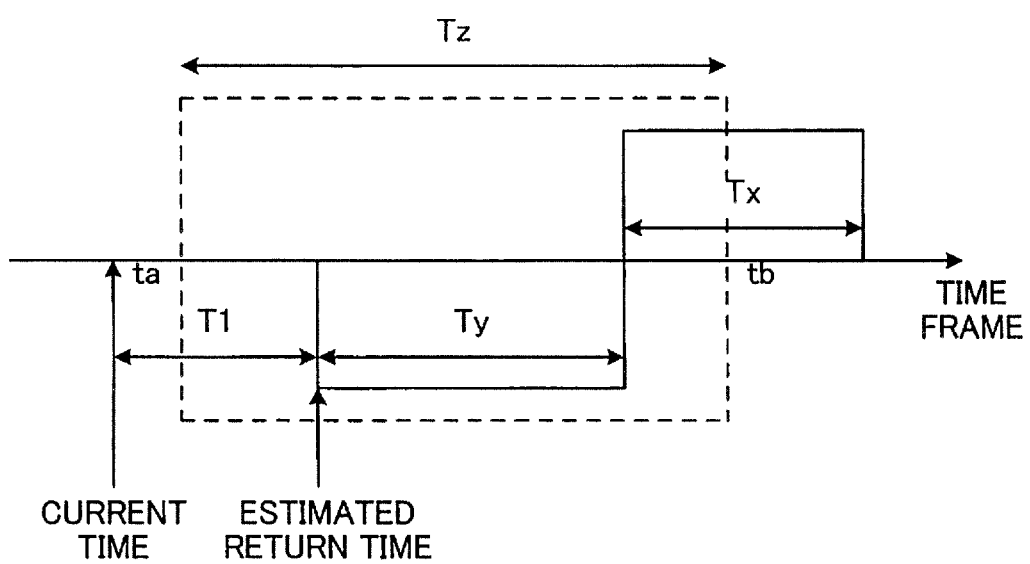
FIG. 37 is a diagram showing an example of the operating time frame and the charging time frame obtained when the time frame between the current time and the estimated return time is equal to or shorter than the operating time frame and when the operating time frame is brought backward.

FIG. 37 is a diagram showing an example of the operating time frame and the charging time frame obtained when the time frame T1 between the current time and the estimated return time is equal to or shorter than the operating time frame Tx and when the operating time frame is brought backward.

As shown in FIG. 37, the time frame T1 between the current time and the estimated return time is equal to or shorter than the operating time frame T1. The operation of the functional block 115 of the electric device 101 is started after the end of the charging of the rechargeable battery 211, and the operating time frame Tx and the charging time frame Ty do not overlap with each other. In addition, although the charging time frame Ty falls within the lowest electricity rate time slot Tz, the operating time frame Tx does not fall within the lowest electricity rate time slot Tz.

Note that, as shown in FIG. 37, when the functional block 115 of the electric device 101 is operated beyond the ending time tb of the of the lowest electricity rate time slot Tz, the time frame adjusting unit 120 may inquire whether to continue the operation or not.

Moreover, the time frame adjusting unit 120 may compare the length of the time frame between the start time to of the lowest electricity rate time slot Tz and the estimated return time, with the length of the time frame between the charging ending time and the ending time tb of the lowest electricity rate time slot Tz, to shift the operating time frame Tx toward the longer time frame.

In FIGS. 24 to 26 and FIGS. 29 to 37, the power consumed in the operation of the functional block 115 of the electric device 101 and the power consumed in the charging are shown in rectangular shapes. In actuality, however, because these consumed powers change with time, they do not necessarily form rectangular shapes. When the power consumed by the functional block 115 of the electric device 101 lowers and does not exceed the allowable power even when the operation of the functional block 115 of the electric device 101 is performed at the same time with the charging, the charging may be started prior to the end of the operation of the functional block 115 of the electric device 101.

Moreover, the lowest electricity rate time slot may be not only a predetermined time slot (e.g., 11 p.m. to 7 a.m.), but also a lowest electricity time slot of a certain day that is acquired from a server and provided by a power company.

When the power control system has a solar power generation system or a fuel cell, the lowest electricity rate time slot may be a time slot producing a surplus amount of generated power, which is, for example, between 9 a.m. and 4 p.m. on a sunny day.

In the present embodiment, the control plan is created in the lowest electricity rate time slot. However, when it is difficult to create the control plan within this time frame, the control plan is created in consideration of a second lowest electricity rate time slot as well. For instance, in FIG. 20, when it is difficult to create the control plan in the time slot between 11 p.m. and 7 a.m. (when the electricity rate is 9 yen or lower), a time slot between 7 a.m. and 10 a.m. and a time slot between 5 p.m. and 11 p.m. (when the electricity rate is 23 yen or lower) are included in the aforementioned time slot.

Generally, when a plurality of time slots (at least two) with different electricity rates are present, the control plan is created first in the lowest electricity rate time slot. When it is difficult to operate the electric device and charge the electric car during the lowest rate time slot, the control plan is created in consideration of the second lowest electricity rate time slot as well. When doing so is difficult, the control plan is created in a third lowest electricity rate time slot as well. Subsequently, the number of low electricity rate time slots is increased, and eventually the control plan is created in the highest electricity rate time slot.

In this manner, a predetermined value is set between the highest electricity rate and the lowest electricity rate, and time slot in which the electricity rate is equal to or lower than the predetermined value is selected, and then the power supply start time of supplying power to the electric device and the charging start time of charging the rechargeable battery are determined.

Note that the predetermined value can be (1) a value lower than the highest electricity rate, (2) a value that is equal to or lower than x % of the highest electricity rate, (3) a value lower than the top y of the rates from the highest electricity rate to the lowest electricity rate, etc.

When the electricity rates of the time slots fluctuate, the predetermined value is determined with reference to the electricity rates between the current electricity rate and future electricity rates (e.g., electricity rates obtained in 24 hours). When no future electricity rates are obtained, the predetermined value is determined with reference to the past electricity rates (e.g., the electricity rates obtained in the last 24 hours). Needless to say, the predetermined value may be determined with reference to both the future electricity rates and the past electricity rates.

Note that the present embodiment describes one electric device and one electric vehicle for the sake of explanatory convenience, but the effects of the present invention can be realized with the combinations described above, even with a plurality of electric devices to be operated and a plurality of rechargeable batteries to be charged. Moreover, the present embodiment describes the operation of the electric device and the charging of the electric vehicle, but the effects of the present invention can be realized when creating control plans using a plurality of electric vehicles without using the electric device.

In the power control system that has the server device for mediating the information communication between the charger and the electric vehicle, not only is it possible to cause the server device to compute the time of arrival at the location where the charger is present and the remaining level of the on-board battery, but also part or all of the flowcharts shown in FIGS. 22, 27 and 28 can be performed by the server device.

Embodiment 6

Next, Embodiment 6 of the present invention is described. Note that in Embodiment 6 the same configurations as those of Embodiment 5 are denoted with the same reference numerals as those of Embodiment 5, and, therefore, detailed descriptions thereof are omitted.

In Embodiment 5, the electric device has the charger, but the charger and the electric device are not necessarily integrated.

FIG. 38 is a block diagram showing an example of a configuration of a power control system according to Embodiment 6 of the present invention. The power control system shown in FIG. 38 has the electric device 107, the ampere breaker 105, the branch breakers 106, 108, the total power usage detector 114, the electric car 201, and a charger 131.

As shown in FIG. 38, the charger 131 has a charging functional block (the charging unit 113, the charge control unit 118, the second power usage detector 119 and the like shown in FIG. 18) and the time frame adjusting unit 120. The charger 131 has the connecting unit 111, the charging unit 113, the charge control unit 118, the second power usage detector 119, the time frame adjusting unit 120, the user instructing unit 124, the first communication unit 132, and the second communication unit 133. The electric device 107 has an equipment control block (the functional block 115, the electric device control unit 116, the first power usage detector 117 and the like shown in FIG. 18), which is not shown. The total power usage detector 114 is disposed on the downstream side of the ampere breaker 105.

The first communication unit 132 has the same functions as the communication unit 112 shown in FIG. 18.

The second communication unit 133 receives power usage values from the electric device 107 and the total power usage detector 114, and transmits a control signal for controlling operation of the electric device 107, from the charger 131 to the electric device 107. Note that the total power usage detector 114 has a communication unit for transmitting the power usage value to the charger 131. The electric device 107 has a communication unit that transmits the power usage value to the charger 131 and receives the control signal for controlling the operation of the electric device 107, from the charger 131.

Note that, in Embodiment 6, the electric device 107 corresponds to an example of the electric device, the charger 131 to an example of the power control device, and the first communication unit 132 to an example of the receiver.

In Embodiment 6, the charger 131 is operated based on the flowcharts shown in FIGS. 22, 27 and 28 described in Embodiment 5. Processes that are different than the processes shown in FIGS. 22, 27 and 28 of Embodiment 5 are described hereinafter.

In step S58, in a method for estimating a total power usage, the time frame adjusting unit 120 acquires, via the communication unit 133, a power usage value detected by the first power usage detector of the electric device 107 (or a past power usage value stored in the first power usage detector, or a power usage value predicted by the first power usage detector), and estimates a total power usage obtained by adding a power usage value detected by the second power usage detector 119 (or actual values of past power usage values stored in the second power usage detector 119, or a power usage value predicted by the second power usage detector 119) to the acquired power usage of the electric device 107 obtained during the operation thereof. The time frame adjusting unit 120 may acquire, through the communication unit 133, a power usage value detected by the total power usage detector 114 (or actual values of past power usage values stored in the total power usage detector 114, or a power usage value predicted by the total power usage detector 114), and use the acquired power usage value as a total power usage.

In step S65, the time frame adjusting unit 120 sends a created control plan to the charge control unit 118 and to the electric device control unit of the electric device 107 via the communication unit 133. The charge control unit 118 charges the rechargeable battery 211 based on the control plan, and the electric device control unit operates the electric device 107 based on the control plan.

In step S73, the time frame adjusting unit 120 takes power (contract power) of the ampere breaker 105 as allowable power and compares this allowable power with the total power usage.

In Embodiment 6, processes other than those described above are same as those of Embodiment 5.

Note that the present embodiment describes one electric device and one electric vehicle for the sake of explanatory convenience, but the effects of the present invention can be realized with the combinations described above, even with a plurality of electric devices to be operated and a plurality of rechargeable batteries to be charged. Moreover, the present embodiment describes the operation of the electric device and the charging of the electric vehicle, but the effects of the present invention can be realized when creating control plans using a plurality of electric vehicles without using the electric device.

Embodiments 5 and 6 have the Following Effects.

(1) The information pertaining to the estimated arrival time is acquired from the electric vehicle, and, because the operation start time of the electric device and the charging start time of the rechargeable battery are adjusted after the estimated arrival time such that the total of the power required to charge the rechargeable battery and the power used for operating the other electric device does not exceed the predetermined value, the control plan can be created prior to the arrival of the electric vehicle, and the created plan can be executed.

(2) The information pertaining to the estimated arrival time and the necessary charge amount of the rechargeable battery is acquired, and, because the operation start time of the electric device and the charging start time of the rechargeable battery are adjusted such that the total of the power required to charge the rechargeable battery and the power used for operating the other electric device does not exceed the predetermined value during a time frame between the charging start time and the charging ending time, the control plan can be created prior to the arrival of the electric vehicle, and the created plan can be executed.

(3) The time frame adjusting unit acquires the information pertaining to the necessary charge amount, determines whether to prioritize the charging of the rechargeable battery or to prioritize the operation of the electric device, and adjusts the operation start time of the electric device and the charging start time of the rechargeable battery. Therefore, prior to the arrival of the electric vehicle, the priority order of the rechargeable battery and the electric device is determined and the control plan is created, whereby the created control plan can be executed.

(4) The information pertaining to the estimated arrival time is computed after the current position of the electric vehicle is acquired and based on the distance between the acquired current position and the point where the charger is present, as well as the moving speed of the electric vehicle and the current time. Therefore, the information pertaining to the estimated arrival time can be calculated by acquiring the current position of the electric vehicle by using a GPS device or the navigation device mounted in the electric vehicle.

(5) The information pertaining to the necessary charge amount of the rechargeable battery obtained at the time of the arrival at the point where the charger is present, is computed after the current position of the electric vehicle is acquired and based on the distance between the acquired current position and the point where the charger is present, as well as the electricity energy amount used for moving the electric vehicle and the current charge amount of the rechargeable battery. Therefore, the information pertaining to the necessary charge amount of the rechargeable battery can be calculated by acquiring the current position of the electric vehicle by using the GPS device or the navigation device mounted in the electric vehicle.

(6) The timing when the charger acquires the information on the estimated arrival time from the electric vehicle includes at least one of: the time when the destination is set to the location where the charger is present (the location where power is supplied to the electric vehicle); the time when the electric vehicle starts moving toward the destination; and the time when the electricity rate changes. Since the estimated arrival time is transmitted to the charger at this timing, the control plan can be created at optimal timing, and the created control plan can be executed.

(7) Because the electric vehicle is informed of a delay of the charging start time, the passenger of the electric vehicle can adjust the arrival time.

(8) The electric device is operated in a plurality of operation units. When the electric device can be operated in a predetermined operation unit after the arrival of the electric vehicle and before the charging is started, the operation of the electric device in the predetermined operation unit can be ended prior to the end of the charging of the rechargeable battery.

(9) The control plan for the charging and the operation can be created such that the charging time frame and the operating time frame fall within the lowest electricity rate time slot, and the created control plan can be executed.

(10) The charging of the rechargeable battery and the operation of the electric device can be performed at a low electricity rate.

(11) When delaying the charging start time of the rechargeable battery in order to charge the rechargeable battery and operate the electric device at a low electricity rate, the electric vehicle is informed of such delay of the charging start time, which allows the passenger of the electric car to adjust the arrival time.

(12) When the operation ending time of the electric device gets behind the estimated arrival time, the electric vehicle is informed of the fact that the operation ending time (the charging start time) is delayed. Therefore, the passenger of the electric vehicle can adjust the arrival time.

(13) Because the connecting unit that connects the charger and the electric vehicle is provided outside the electric device, a charging facility can be established simply, without requiring any major electric construction (e.g., a construction for adding more distribution boards, a wiring construction between a distribution board and the outside, an installation construction for installing a charge outlet outside, etc.).

(14) The calculation of the estimated arrival time and the calculation of the necessary charge amount of the rechargeable battery are performed by the charger, the electric vehicle, or the server mediating the information communication between the charger and the electric vehicle. Therefore, the electric vehicle may calculate the estimated arrival time and the necessary charge amount of the rechargeable battery, and the result of the calculation may be transmitted to the charger. Moreover, the information on the current position and the like may be transmitted from the electric vehicle to the charger, and the charger may calculate the estimated arrival time and the necessary charge amount of the rechargeable battery. In addition, the information on the current position and the like may be transmitted from the electric vehicle to the server, and the server may calculate the estimated arrival time and the necessary charge amount of the rechargeable battery, and then the result of the calculation may be transmitted to the charger.

In the charger used in a household, a business office, or a factory, the control plan for operating the other electric device and charging the rechargeable battery can be created and executed prior to the arrival of the electric car, by acquiring the estimated arrival time from the electric car in use.

Note that Embodiments 1 to 6 describe the electric cars as the examples of the electric vehicle, but the present invention is not particularly limited to such embodiments. The electric vehicle may be a plug-in hybrid vehicle, a two-wheeled electric vehicle, an electric bicycle, or other vehicle that travels using electricity.

The specific embodiments described above mainly include the inventions having the following configurations.

A power control system according to one aspect of the present invention is a power control system that has an electric vehicle and a power control device that controls charging of a rechargeable battery of the electric vehicle and controls supply of power to an electric device, wherein the electric vehicle includes: the rechargeable battery; a charge information acquiring unit that acquires charge information pertaining to the charging of the rechargeable battery; and a transmitter that transmits the charge information acquired by the charge information acquiring unit, prior to the arrival of the electric vehicle at a location where power is supplied to the electric vehicle, and wherein the power control device includes: a receiver that receives the charge information transmitted by the transmitter, prior to the arrival of the electric vehicle at the location where power is supplied to the electric vehicle; and a power control unit that determines a power supply start time of supplying power to the electric device and a charging start time of charging the rechargeable battery, on the basis of the charge information received by the receiver, such that the supply of power to the electric device and the charging of the rechargeable battery are completed by a predetermined time.

A power control method according to another aspect of the present invention is a power control method for controlling charging of a rechargeable battery of an electric vehicle, and controlling supply of power to an electric device, the power control method having: a charge information acquisition step of acquiring charge information pertaining to the charging of the rechargeable battery; a transmitting step of transmitting the charge information acquired in the charge information acquisition step, prior to the arrival of the electric vehicle at a location where power is supplied to the electric vehicle; a receiving step of receiving the charge information transmitted in the transmitting step; and a power control step of determining a power supply start time of supplying power to the electric device and a charging start time of charging the rechargeable battery, on the basis of the charge information received in the receiving step, such that the supply of power to the electric device and the charging of the rechargeable battery are completed by a predetermined time.

According to these configurations, the power control system has an electric vehicle and a power control device that controls charging of a rechargeable battery of the electric vehicle and supply of power to an electric device. In the electric vehicle, charge information pertaining to the charging of the rechargeable battery is acquired, and the acquired charge information is transmitted prior to the arrival of the electric vehicle at a location where power is supplied to the electric vehicle. In the power control device, the charge information transmitted by the transmitter is received prior to the arrival of the electric vehicle at the location where power is supplied to the electric vehicle. On the basis of the received charge information, a power supply start time of supplying power to the electric device and a charging start time of charging the rechargeable battery are determined such that the supply of power to the electric device and the charging of the rechargeable battery are completed by a predetermined time.

Because the power supply start time of supplying power to the electric device and the charging start time of charging the rechargeable battery are determined such that the supply of power to the electric device and the charging of the rechargeable battery are completed by the predetermined time prior to the arrival of the electric vehicle at the location where power is supplied to the electric vehicle, the supply of power to the electric device and the charging of the electric vehicle can be performed efficiently.

In the power control system described above, it is preferred that the charge information include a current remaining level of the rechargeable battery, and that the power control unit compute a time frame required to charge the rechargeable battery, in accordance with the current remaining level of the rechargeable battery, and determine the power supply start time of supplying power to the electric device and the charging start time of charging the rechargeable battery, on the basis of the computed time frame required to charge the rechargeable battery.

According to this configuration, the charge information includes a current remaining level of the rechargeable battery. A time frame required to charge the rechargeable battery is computed in accordance with the remaining level of the rechargeable battery, and the power supply start time of supplying power to the electric device and the charging start time of charging the rechargeable battery are determined based on the computed time frame required to charge the rechargeable battery.

Therefore, the power supply start time of supplying power to the electric device and the charging start time of charging the rechargeable battery are determined based on the time frame required to charge the rechargeable battery, the time frame being computed in accordance with the current remaining level of the rechargeable battery. Accordingly the power supply start time of supplying power to the electric device can be brought forward or backward in accordance with the length of the time frame required to charge the rechargeable battery. As a result, the supply of power to the electric device and the charging of the rechargeable battery can be performed efficiently.

In the power control system described above, it is preferred that the charge information include information on a remaining level of the rechargeable battery that is obtained at the time of vehicle arrival at an installation location where the power control device is installed, the remaining level being obtained based on a distance between a current position of the electric vehicle and the installation location, and that the power control unit compute a time frame required to charge the rechargeable battery, in accordance with the remaining level of the rechargeable battery that is obtained at the time of vehicle arrival at the installation location, and determine the power supply start time of supplying power to the electric device and the charging start time of charging the rechargeable battery, on the basis of the computed time frame required to charge the rechargeable battery.

According to this configuration, the charge information includes information on a remaining level of the rechargeable battery that is obtained at the time of arrival at an installation location where the power control device is installed, the remaining level being obtained based on a distance between a current position of the electric vehicle and the installation location. Then, a time frame required to charge the rechargeable battery is computed in accordance with the remaining level of the rechargeable battery that is obtained at the time of arrival at the installation location, and the power supply start time of supplying power to the electric device and the charging start time of charging the rechargeable battery are determined on the basis of the computed time frame required to charge the rechargeable battery.

Therefore, the power supply start time of supplying power to the electric device and the charging start time of charging the rechargeable battery are determined on the basis of the time frame required to charge the rechargeable battery, the time frame being computed in accordance with the remaining level of the rechargeable battery that is obtained at the time of arrival at the installation location. As a result, the power supply start time of supplying power to the electric device and the charging start time of charging the rechargeable battery can be determined more accurately.

In the power control system described above, it is preferred that the charge information include an estimated arrival time at which the electric vehicle arrives at an installation location where the power control device is installed, the estimated arrival time being obtained based on a distance between a current position of the electric vehicle and the installation location, and that the power control unit determine the power supply start time of supplying power to the electric device and the charging start time of charging the rechargeable battery, such that the charging start time of charging the rechargeable battery follows the estimated arrival time and such that a total power of a power required to charge the rechargeable battery and a power used for operating the electric device does not exceed a predetermined value.

According to this configuration, the charge information includes a estimated arrival time at which the electric vehicle arrives at the installation location where the power control device is installed, the estimated arrival time being obtained based on the distance between the current position of the electric vehicle and the installation location. Then, the power supply start time of supplying power to the electric device and the charging start time of charging the rechargeable battery are determined such that the charging start time of charging the rechargeable battery follows the estimated arrival time and such that a total power of a power required to charge the rechargeable battery and a power used for operating the electric device does not exceed a predetermined value.

Therefore, the charging start time of charging the rechargeable battery can be determined more accurately on the basis of the estimated arrival time at which the electric vehicle arrives at the installation location where the power control device is installed. In addition, the operation of the electric device and the charging of the rechargeable battery are controlled such that the total power of the power required to charge the rechargeable battery and the power used for operating the electric device does not exceed the predetermined value.

In the power control system described above, it is preferred that the charge information further include information on a remaining level of the rechargeable battery that is obtained at the time of vehicle arrival at an installation location where the power control device is installed, the remaining level being obtained based on a distance between a current position of the electric vehicle and the installation location, and that the power control unit compute a time frame required to charge the rechargeable battery, in accordance with the remaining level of the rechargeable battery that is obtained at the time of vehicle arrival at the installation location, and determine the power supply start time of supplying power to the electric device and the charging start time of charging the rechargeable battery, on the basis of the computed time frame required to charge the rechargeable battery and the estimated arrival time.

According to this configuration, the charge information further includes information on a remaining level of the rechargeable battery that is obtained at the time of arrival at an installation location where the power control device is installed, the remaining level being obtained based on a distance between a current position of the electric vehicle and the installation location. Then, a time frame required to charge the rechargeable battery is computed in accordance with the remaining level of the rechargeable battery that is obtained at the time of arrival at the installation location, and the power supply start time of supplying power to the electric device and the charging start time of charging the rechargeable battery are determined based on the computed time frame required to charge the rechargeable battery and the estimated arrival time.

Therefore, the power supply start time of supplying power to the electric device and the charging start time of charging the rechargeable battery are determined based on the estimated arrival time and the time frame required to charge the rechargeable battery, which is computed in accordance with the remaining level of the rechargeable battery that is obtained at the time of arrival at the installation location. As a result, the power supply start time of supplying power to the electric device and the charging start time of charging the rechargeable battery can be determined more accurately.

In the power control system described above, it is preferred that the power control system further have a server device that mediates communication between the electric vehicle and the power control device, and that the server device include: a distance information receiver that receives, from the electric vehicle, the distance between the current position of the electric vehicle and the installation location where the power control device is installed; a remaining level computing unit that computes the remaining level of the rechargeable battery that is obtained at the time of vehicle arrival at the installation location, on the basis of the distance received by the distance information receiver; and a remaining level transmitter that transmits the remaining level of the rechargeable battery computed by the remaining level computing unit, to the power control device.

According to this configuration, the power control system further has a server device for mediating communication between the electric vehicle and the power control device. In the server device, the distance between the current position of the electric vehicle and the installation location where the power control device is installed is received from the electric vehicle, the remaining level of the rechargeable battery that is obtained at the time of arrival at the installation location is computed based on the received distance, and the computed remaining level of the rechargeable battery is transmitted to the power control device.

Therefore, the remaining level of the rechargeable battery obtained at the time of arrival at the installation location does not have to be computed in the electric vehicle or the power control device, reducing the number of processes performed in the electric vehicle and the power control device.

In the power control system described above, it is preferred that the power control device further have an electricity rate information storage unit that stores electricity rate information pertaining to an electricity rate that varies according to time slots, and that the power control unit refer to the electricity rate information stored in the electricity rate information storage unit, and determine the power supply start time of supplying power to the electric device and the charging start time of charging the rechargeable battery, such that the charging of the rechargeable battery is ended during a time slot in which the electricity rate becomes equal to or lower than a predetermined rate.

According to this configuration, the electricity rate information storage unit stores electricity rate information pertaining to an electricity rate that varies according to time slots. The electricity rate information stored in the electricity rate information storage unit is referred to, and the power supply start time of supplying power to the electric device and the charging start time of charging the rechargeable battery are determined such that the charging of the rechargeable battery is ended during a time slot in which the electricity rate becomes equal to or lower than a predetermined rate.

Because the charging of the rechargeable battery is ended during the time slot in which the electricity rate becomes equal to or lower than the predetermined rate, an electricity rate incurred when charging the rechargeable battery can be reduced.

In the power control system described above, it is preferred that the power control unit start charging the rechargeable battery after the end of the supply of power to the electric device, and supply power to the electric device only during the time slot in which the electricity rate becomes equal to or lower than the predetermined rate, in a case where the power supply start time of supplying power to the electric device does not fall within the time slot in which the electricity rate becomes equal to or lower than the predetermined rate.

According to this configuration, the charging of the rechargeable battery is started after the end of the supply of power to the electric device. When the power supply start time of supplying power to the electric device does not fall within the time slot in which the electricity rate becomes equal to or lower than the predetermined rate, power is supplied to the electric device only during the time slot in which the time slot in which the electricity rate becomes equal to or lower than the predetermined rate. Therefore, an electricity rate incurred when supplying power to the electric device can be reduced.

In the power control system described above, it is preferred that the power control unit start charging the rechargeable battery after the end of the supply of power to the electric device, and start the supply of power to the electric device in a time slot prior to the time slot in which the electricity rate becomes equal to or lower than the predetermined rate, in a case where the power supply start time of supplying power to the electric device does not fall within the time slot in which the electricity rate becomes equal to or lower than the predetermined rate.

According to this configuration, the charging of the rechargeable battery is started after the end of the supply of power to the electric device. When the power supply start time of supplying power to the electric device does not fall within the time slot in which the electricity rate becomes equal to or lower than the predetermined rate, the supply of power to the electric device is started in a time slot prior to the time in which the electricity rate becomes equal to or lower than the predetermined rate. Therefore, the operation of the electric device can be controlled in consideration of convenience rather than reducing the electricity rate.

In the power control system described above, it is preferred that the power control unit compute an electricity rate incurred when the operation of the electric device is started prior to the charging start time, and an electricity rate incurred when the operation of the electric device is started after charging ending time, on the basis of the electricity rate information stored in the electricity rate information storage unit, and then select the lower electricity rate out of the computed electricity rates.

According to this configuration, an electricity rate incurred when the operation of the electric device is started prior to the charging start time and an electricity rate incurred when the operation of the electric device is started after the charging ending time, are computed based on the electricity rate information stored in the electricity rate information storage unit. The lower electricity rate is selected out of the computed electricity rates.

Because the lower electricity rate is selected from the electricity rate incurred when the operation of the electric device is started prior to the charging start time and the electricity rate incurred when the operation of the electric device is started after the charging ending time, the electricity rate incurred when supplying power to the electric device can be reduced.

In the power control system described above, it is preferred that the electric device include an electric water heater that boils water and stores the boiled water.

According to this configuration, operation of the electric water heater that boils water and stores the boiled water can be controlled appropriately.

A power control device according to another aspect of the present invention is a power control device that controls charging of a rechargeable battery of an electric vehicle and controls supply of power to an electric device, the power control device having: a receiver that receives charge information pertaining to the charging of the rechargeable battery that is transmitted from the electric vehicle, prior to the arrival of the electric vehicle at a location where power is supplied to the electric vehicle; and a power control unit that determines a power supply start time of supplying power to the electric device and a charging start time of charging the rechargeable battery, on the basis of the charge information received by the receiver, such that the supply of power to the electric device and the charging of the rechargeable battery are completed by a predetermined time.

A power control program according to yet another aspect of the present invention is a power control program that controls charging of a rechargeable battery of an electric vehicle and controls supply of power to an electric device, the power control program causing a computer to function as: a receiver that receives charge information pertaining to the charging of the rechargeable battery that is transmitted from the electric vehicle, prior to the arrival of the electric vehicle at a location where power is supplied to the electric vehicle; and a power control unit that determines a power supply start time of supplying power to the electric device and a charging start time of charging the rechargeable battery, on the basis of the charge information received by the receiver, such that the supply of power to the electric device and the charging of the rechargeable battery are completed by a predetermined time.

According to these configurations, the charge information pertaining to the charging of the rechargeable battery that is transmitted from the electric vehicle is received prior to the arrival of the electric vehicle at the location where power is supplied to the electric vehicle. The power supply start time of supplying power to the electric device and the charging start time of charging the rechargeable battery are determined based on the received charge information, such that the supply of power to the electric device and the charging of the rechargeable battery are completed by the predetermined time.

Because the power supply start time of supplying power to the electric device and the charging start time of charging the rechargeable battery are determined such that the supply of power to the electric device and the charging of the rechargeable battery are completed by the predetermined time prior to the arrival of the electric vehicle at the location where power is supplied to the electric vehicle, the supply of power to the electric device and the charging of the electric vehicle can be performed efficiently.

The specific embodiments or examples provided in the chapter "Best Mode for Carrying Out the Invention" are merely to clarify the technical contents of the present invention, and the present invention should not be construed as being limited to such concrete examples. Various modifications may be made within the spirit of the present invention and the scope of the subjoined claims.

INDUSTRIAL APPLICABILITY

The power control system, the power control method, the power control device and the power control program according to the present invention are useful as a power control system, a power control method, a power control device and a power control program, which can efficiently supply power to an electric device, charge an electric vehicle, control charging of a rechargeable battery of the electric vehicle, and control supply of power to the electric device.

The invention claimed is:

1. A control device that controls charging of a rechargeable battery of an electric vehicle, and controls operation of an electric device that is different from a charger for charging the rechargeable battery of an electric vehicle, the control device comprising:

a receiver that receives charge information from a charge information acquiring unit that acquires charge information pertaining to the charging status of the rechargeable battery and that is wirelessly transmitted by the electric vehicle prior to an arrival of the electric vehicle at a location where power is supplied to the electric vehicle; and a control determination unit that determines an operation start time of starting the operation of the electric device on the basis of the charge information received by the receiver.

2. The control device according to claim 1, wherein the electric device comprises a device that is configured to start operation prior to the arrival of the electric vehicle.

3. The control device according to claim 1, wherein the electric device comprises a one of an electric heater or an electric boiler.

4. The control device according to claim 1, wherein the electric device comprises one of a washer/dryer or a dish washer.

5. A control method for controlling charging of a rechargeable battery of an electric vehicle, and controlling operation of an electric device that is different from a charger for charging the rechargeable battery of an electric vehicle, the control method comprising steps of:

receiving charge information from a charge information acquiring unit that acquires charge information pertaining to the charging of the rechargeable battery and wirelessly transmitted by the electric vehicle prior to an arrival of the electric vehicle at a location where power is supplied to the electric vehicle; and determining an operation start time of starting the operation of the electric device on the basis of the received charge information.

6. The control method according to claim 5, wherein the electric device comprises a device that is configured to start operation prior to the arrival of the electric vehicle.

7. The control method according to claim 5, wherein the electric device comprises one of an electric heater or an electric boiler.

8. The control method according to claim 5, wherein the electric device comprises one of a washer/dryer or a dish washer.

9. A non-transitory computer readable recording medium storing a control program that controls charging of a rechargeable battery of an electric vehicle and controls operation of an electric device that is different from a charger for charging the rechargeable battery of an electric vehicle, the control program causing a computer to function as at least:

a receiver that receives charge information from a charge information acquiring unit that acquires charge information pertaining to the charging status of the rechargeable battery and wirelessly transmitted by the electric vehicle prior to an arrival of the electric vehicle at a location where power is supplied to the electric vehicle; and a control determination unit that determines an operation start time of starting the operation of the electric device on the basis of the charge information received by the receiver.

10. The recording medium according to claim 9, wherein the electric device comprises a device that is configured to start operation prior to the arrival of the electric vehicle.

11. The recording medium according to claim 9, wherein the electric device comprises one of an electric heater or an electric boiler.

12. The recording medium according to claim 9, wherein the electric device comprises one of a washer/dryer or a dish washer.

13. A control system, comprising:

a receiver that receives charge information from a charge information acquiring unit that acquires charge information pertaining to the charging status of the rechargeable battery wirelessly transmitted by the electric vehicle prior to an arrival of the electric vehicle at a location where power is supplied to the electric vehicle; and a control determination unit that determines an operation start time of starting the operation of the electric device that is different from a charger for charging the rechargeable battery of an electric vehicle on the basis of the charge information.

14. The control system according to claim 13, wherein the electric device comprises a device that is configured to start operation prior to the arrival of the electric vehicle.

15. The control system according to claim 13, wherein the electric device comprises one of an electric heater or an electric boiler.

* * * * *